(12) United States Patent
Hiasa et al.

(10) Patent No.: US 11,884,754 B2
(45) Date of Patent: Jan. 30, 2024

(54) SULFONATED PULP FIBERS, DERIVATIVE PULP, SULFONATED FINE CELLULOSE FIBERS, METHOD FOR PRODUCING SULFONATED FINE CELLULOSE FIBERS, AND METHOD FOR PRODUCING SULFONATED PULP FIBERS

(71) Applicants: MARUSUMI PAPER CO., LTD., Ehime (JP); NATIONAL UNIVERSITY CORPORATION EHIME UNIVERSITY, Ehime (JP)

(72) Inventors: Shou Hiasa, Ehime (JP); Hiromi Uchimura, Ehime (JP); Tomoki Yabutani, Ehime (JP)

(73) Assignees: MARUSUMI PAPER CO., LTD., Ehime (JP); NATIONAL UNIVERSITY CORPORATION EHIME UNIVERSITY, Ehime (JP)

( * ) Notice: Subject to any disclaimer, the term of this patent is extended or adjusted under 35 U.S.C. 154(b) by 96 days.

(21) Appl. No.: 17/050,131

(22) PCT Filed: Apr. 24, 2019

(86) PCT No.: PCT/JP2019/017492
§ 371 (c)(1),
(2) Date: Oct. 23, 2020

(87) PCT Pub. No.: WO2019/208656
PCT Pub. Date: Oct. 31, 2019

(65) Prior Publication Data
US 2021/0139612 A1    May 13, 2021

(30) Foreign Application Priority Data

| Apr. 25, 2018 | (JP) | 2018-084214 |
| Apr. 25, 2018 | (JP) | 2018-084215 |
| Nov. 7, 2018 | (JP) | 2018-209556 |
| Nov. 7, 2018 | (JP) | 2018-209557 |

(51) Int. Cl.
*C08B 5/14* (2006.01)
*D21H 11/20* (2006.01)

(52) U.S. Cl.
CPC .............. *C08B 5/14* (2013.01); *D21H 11/20* (2013.01)

(58) Field of Classification Search
CPC ................................ C08B 5/14; D21H 11/20
See application file for complete search history.

(56) References Cited

U.S. PATENT DOCUMENTS

| 2,511,229 A | 6/1950 | Cunningham |  |
| 5,089,089 A * | 2/1992 | Beaulieu | D21C 9/004 |
|  |  |  | 162/234 |
| 2020/0190221 A1 | 6/2020 | Kitano et al. |  |
| 2021/0155716 A1* | 5/2021 | Pahimanolis | C08B 5/00 |

FOREIGN PATENT DOCUMENTS

| CN | 1126260 A * | 7/1996 | ............. C08B 15/00 |
| JP | 52-13585 A | 2/1977 |  |
| JP | 2003-313201 A | 11/2003 |  |
| JP | 2019-11411 A | 1/2019 |  |

OTHER PUBLICATIONS

PCT International Preliminary Report on Patentability (IPRP) and Written Opinion of the International Searching Authority dated Oct. 27, 2020 filed in PCT/JP2019/017492.
Extended European Search Report (EESR) dated Jan. 7, 2022 for corresponding European Patent Application No. 19793466.4.
Chinese Office Action (CNOA) dated Nov. 1, 2021 for corresponding Chinese Patent Application No. 201980026984.1 and its English translation.

* cited by examiner

*Primary Examiner* — Leigh C Maier
*Assistant Examiner* — Everett White
(74) *Attorney, Agent, or Firm* — RANKIN, HILL & CLARK LLP

(57) ABSTRACT

[Object] An object is to provide a sulfonated fine cellulose fiber having excellent transparency, a sulfonated pulp fiber suitable for the sulfonated fine cellulose fiber, a method for producing these fibers, and a derivative pulp containing the sulfonated pulp fiber.
[Means for achieving the object] The sulfonated pulp fiber of the present invention is a pulp fiber comprising a plurality of cellulose fibers, wherein a part of hydroxyl groups of the cellulose fibers of the pulp fiber is substituted with sulfo groups, an introduction amount of sulfur attributable to the sulfo groups is adjusted to be higher than 0.42 mmol/g while maintaining a fiber shape, and a water retention value of the pulp fiber is adjusted to 150% or more. Since the sulfonated pulp fiber has a predetermined water retaining property or more while maintaining the fiber shape, the degree of flexibility in handling can be improved.

5 Claims, 24 Drawing Sheets

FIG.2
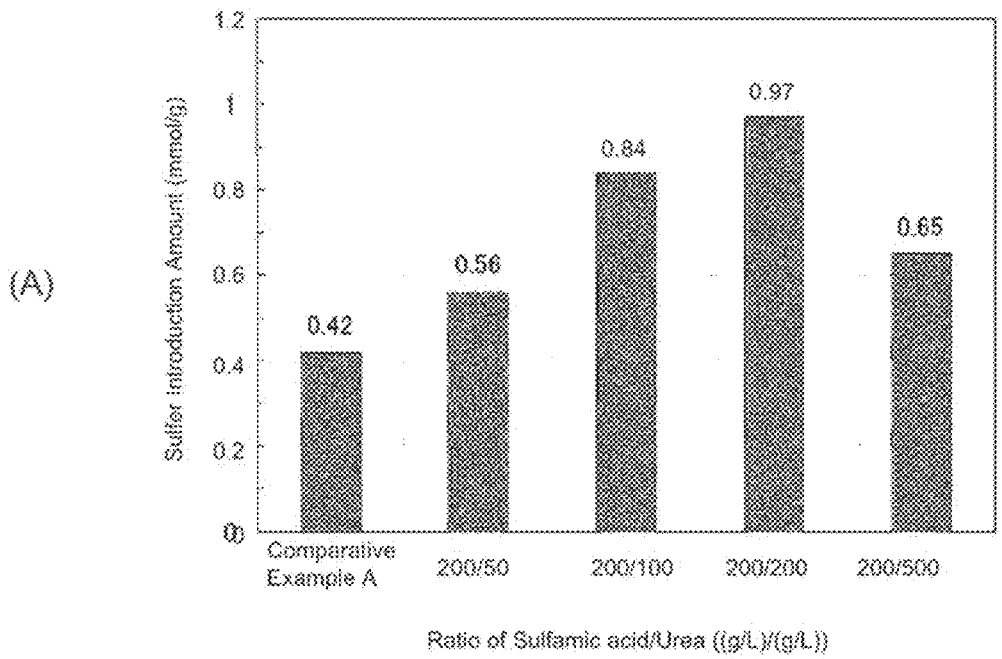
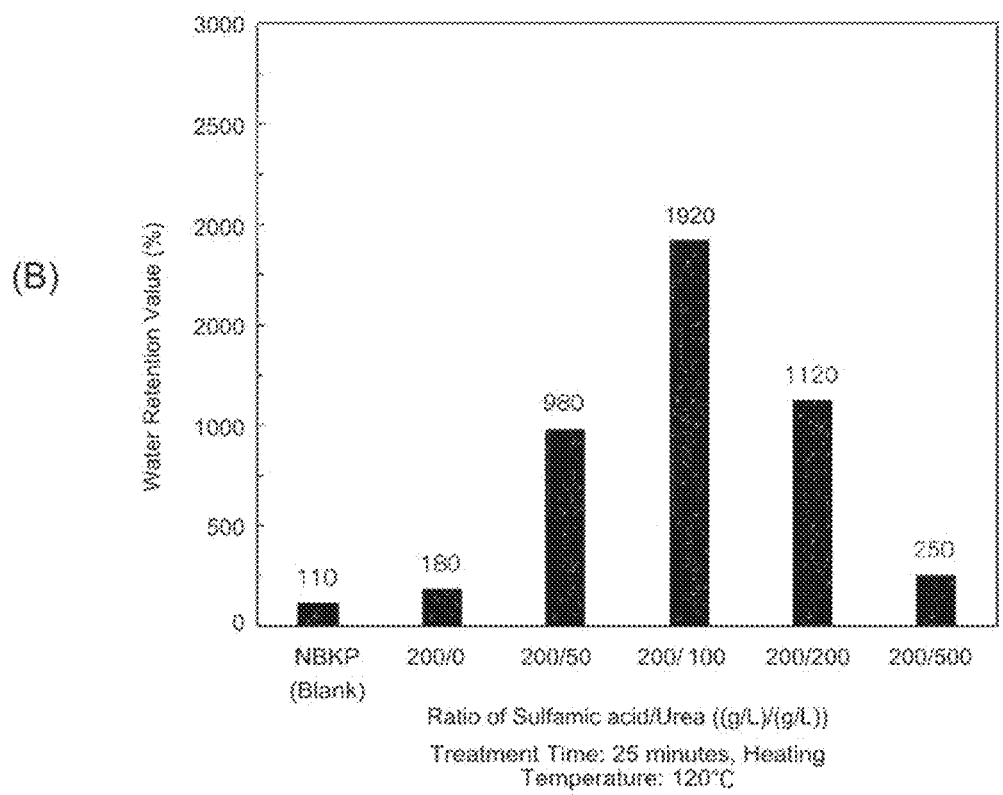

FIG.3
(A)
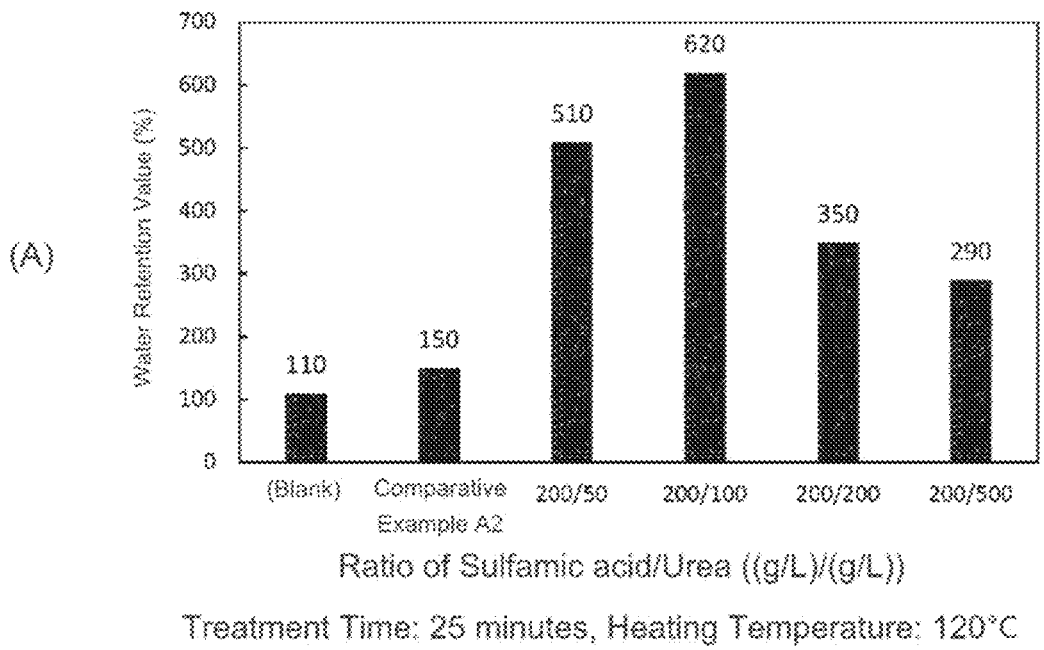
(B)
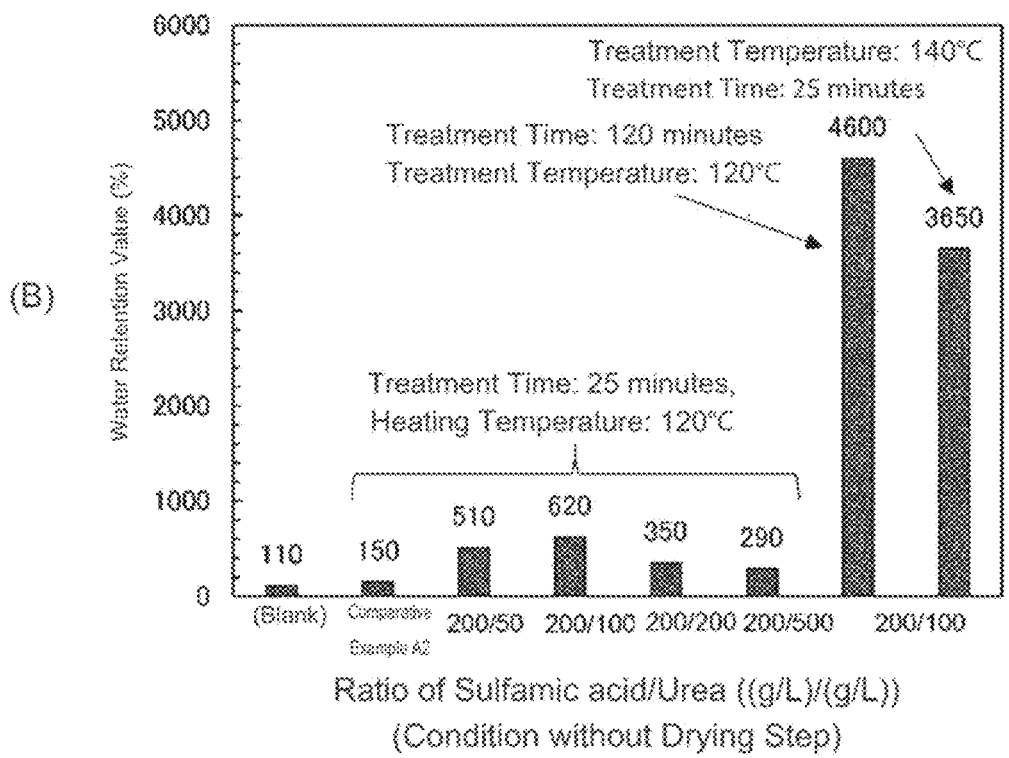

FIG.4
(A)
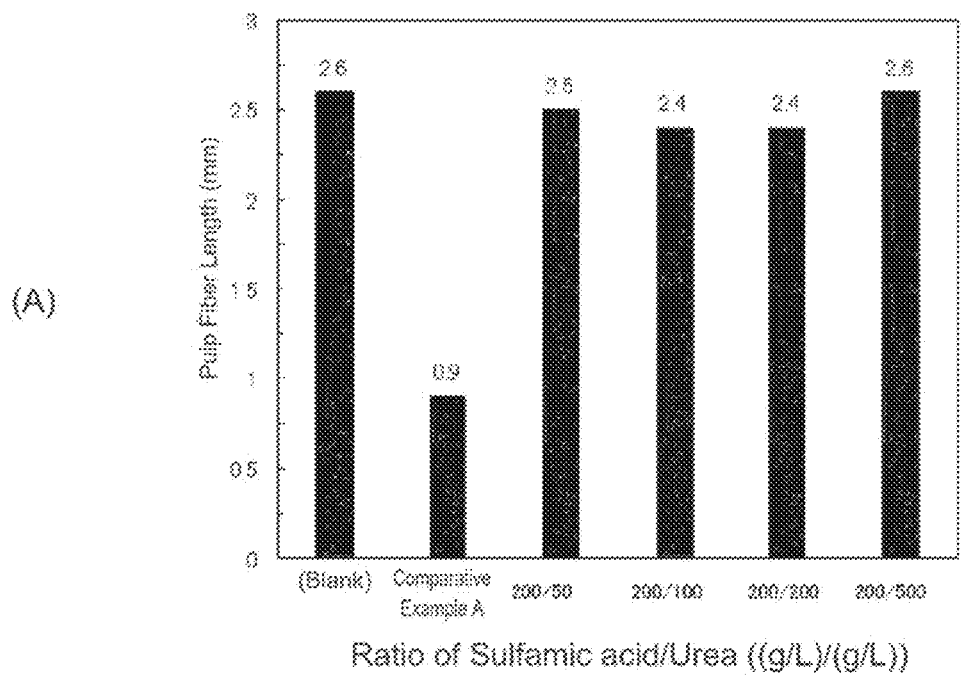
(B)
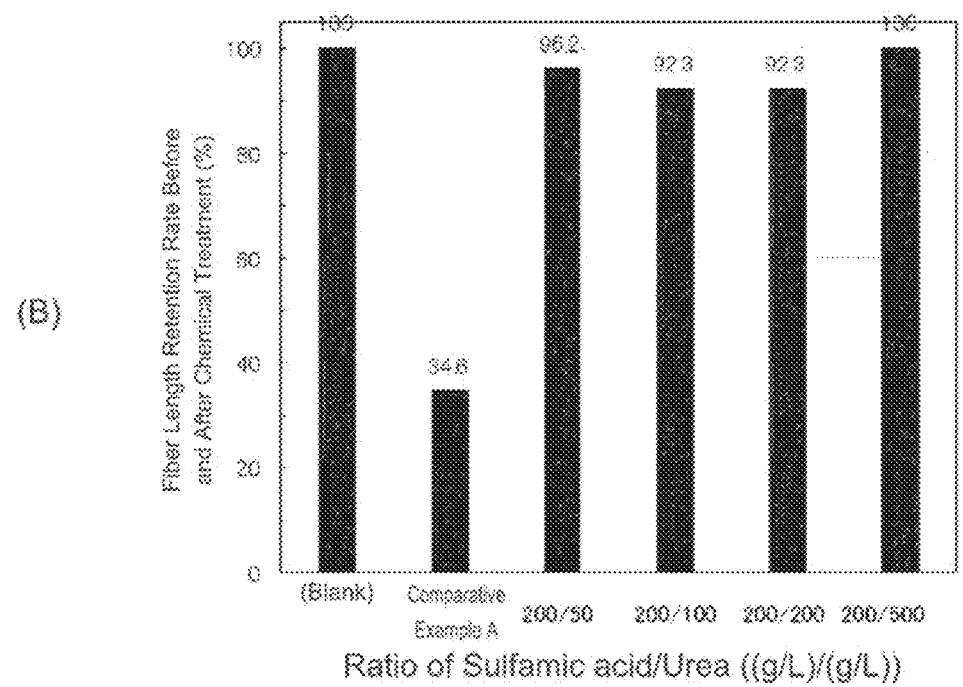
Treatment Time: 25 minutes,
Heating Temperature: 120°C
(Condition with Drying Step)

Sulfamic Acid/Urea ((200g/L)/(100g/L))
(Condition with Drying Step)

FIG.7

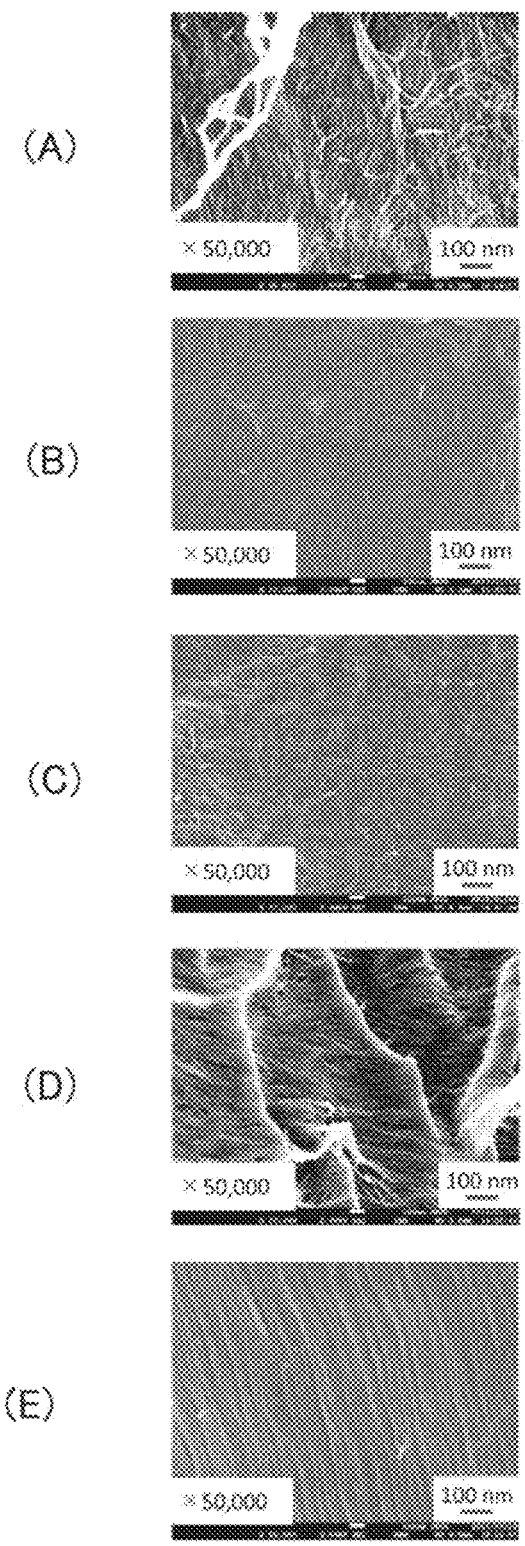

(A) FE-SEM Observation Image of Sulfamic Acid/Urea-treated Pulp Fiber
Treatment Condition (Ratio of Sulfamic Acid/Urea) = (200g/L)/(50g/L)

(B) FE-SEM Observation Image of Sulfamic Acid/Urea-treated Pulp Fiber
Treatment Condition (Ratio of Sulfamic Acid/Urea) = (200g/L)/(100g/L)

(C) FE-SEM Observation Image of Sulfamic Acid/Urea-treated Pulp Fiber
Treatment Condition (Ratio of Sulfamic Acid/Urea) = (200g/L)/(200g/L)

(D) FE-SEM Observation Image of Sulfamic Acid/Urea-treated Pulp Fiber
Treatment Condition (Ratio of Sulfamic Acid/Urea) = (200g/L)/(500g/L)

(E) FE-SEM Observation Image of NBKP Pulp Fiber

Treatment Time: 25 minutes, Heating Temperature: 120°C
(Condition with Drying Step)

FIG.9

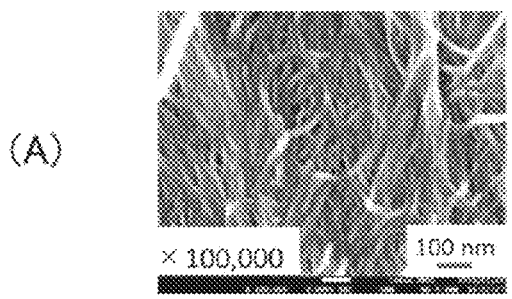

(A) FE-SEM Observation Image of Sulfamic Acid/Urea-treated Pulp Fiber
Treatment Condition (Ratio of Sulfamic Acid/Urea) = (200g/L)/(50g/L)

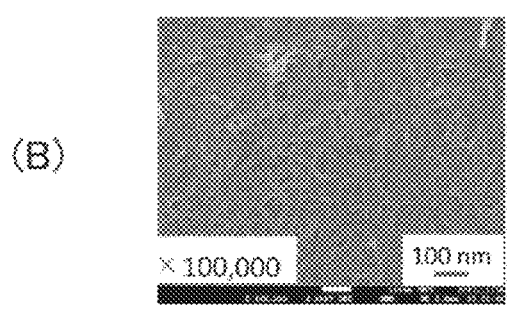

(B) FE-SEM Observation Image of Sulfamic Acid/Urea-treated Pulp Fiber
Treatment Condition (Ratio of Sulfamic Acid/Urea) = (200g/L)/(100g/L)

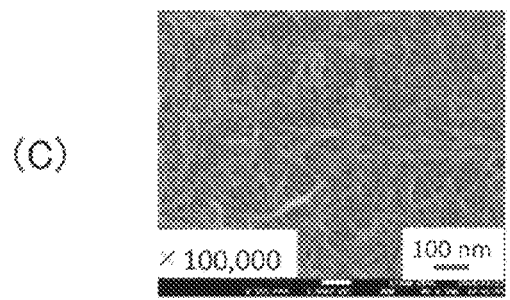

(C) FE-SEM Observation Image of Sulfamic Acid/Urea-treated Pulp Fiber
Treatment Condition (Ratio of Sulfamic Acid/Urea) = (200g/L)/(200g/L)

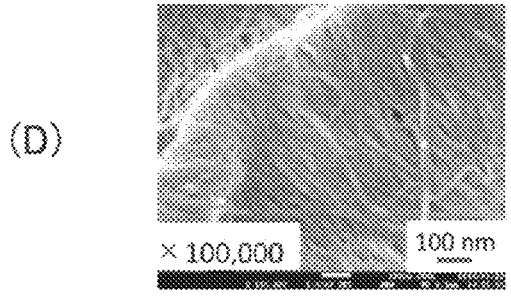

(D) FE-SEM Observation Image of Sulfamic Acid/Urea-treated Pulp Fiber
Treatment Condition (Ratio of Sulfamic Acid/Urea) = (200g/L)/(500g/L)

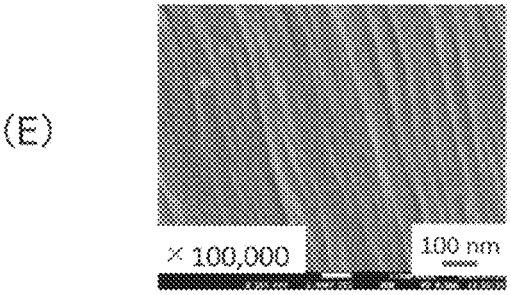

(E) FE-SEM Observation Image of NBKP Pulp Fiber

Treatment Time: 25 minutes, Heating Temperature: 120°C
(Condition with Drying Step)

| | Sample | Number of Fibrillations | Fiber Width |
|---|---|---|---|
| (A) | (Blank Test) | 20 Times or More | 30~50 nm |
| | Sulfamic Acid/Urea-treated NBKP | 3 Times | 20 nm or Less |

FE-SEM Observation Image
Sample Sulfamic Acid/Urea-treated NBKP After Fibrillation Treatment (left)
NBKP After Fibrillation Treatment (right)

Treatment Time: 25 minutes, Heating Temperature: 120°C
(Condition with Drying Step)

FIG.12
(A) 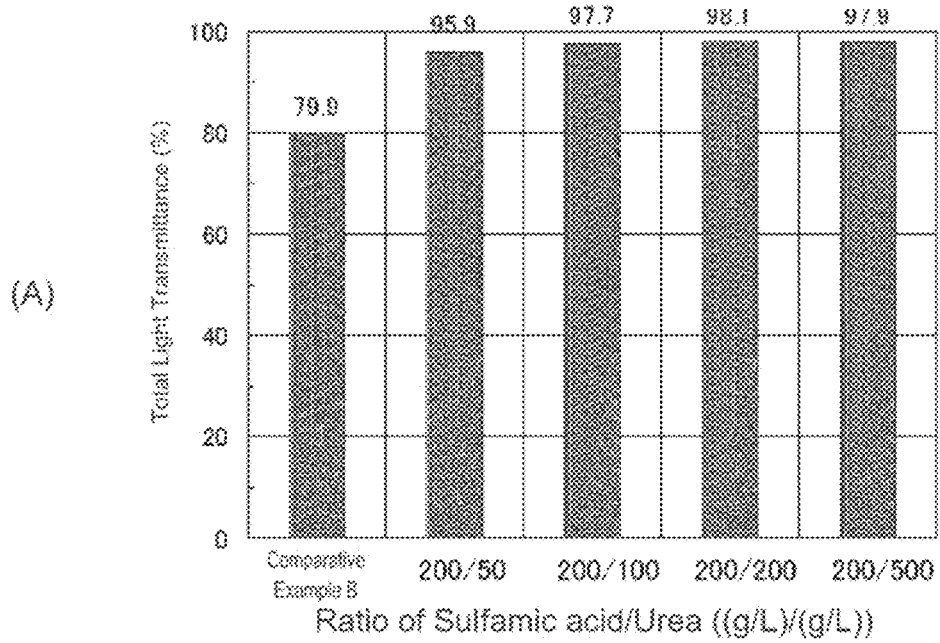
(B) 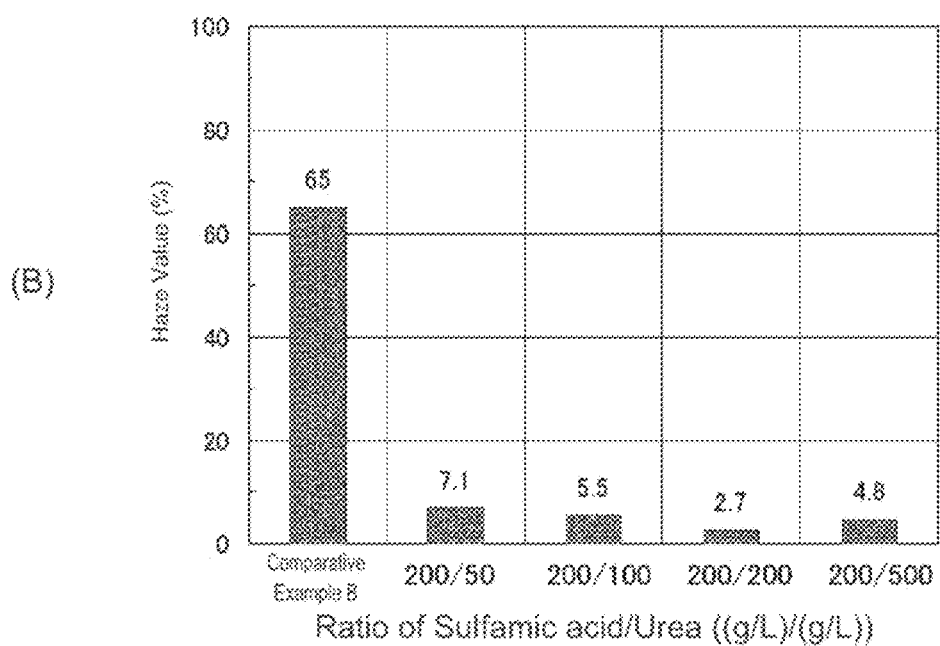
Treatment Time: 25 minutes, Heating Temperature: 120°C
(Condition with Drying Step)

FIG.13
(A) 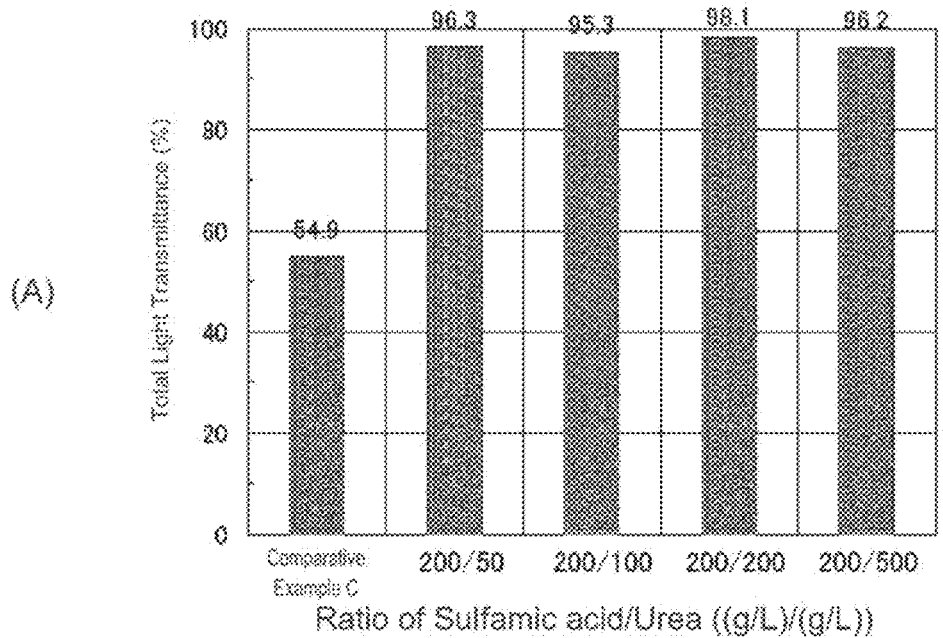
(B) 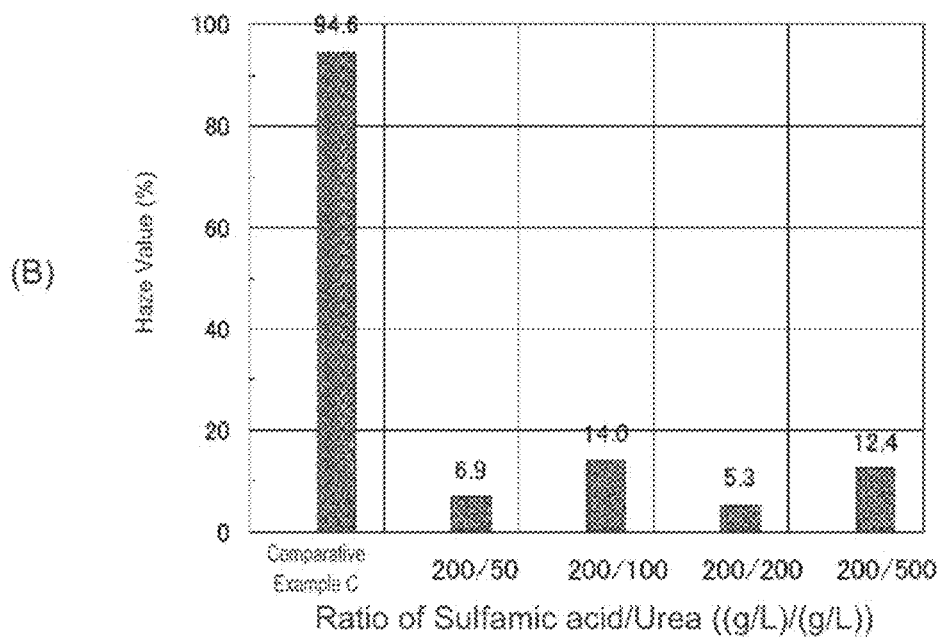
Treatment Time: 25 minutes, Heating Temperature: 120°C
(Condition without Drying Step)

(A)

| | Treatment Time (minutes) | Heating Temperature (°C) | Ratio of Sulfamic acid/Urea | Polymerization Degree |
|---|---|---|---|---|
| NBKP | — | — | — | — |
| Comparative Example 8 | 25 | 120 | (200 g/L)/(0 g/L) | 275 |
| Influence of Reagent Mixing Ratio | 25 | 120 | (200 g/L)/(50 g/L) | 408 |
| | | | (200 g/L)/(100 g/L) | 386 |
| | | | (200 g/L)/(200 g/L) | 404 |
| | | | (200 g/L)/(500 g/L) | 478 |

(B)

Treatment Time: 25 minutes, Heating Temperature: 120°C
(Condition without Drying Step)

Solid Concentration Supplied to High-Pressure Homogenizer : 0.2 % by mass
Fibrillation Pressure of High-Pressure Homogenize FIG.18
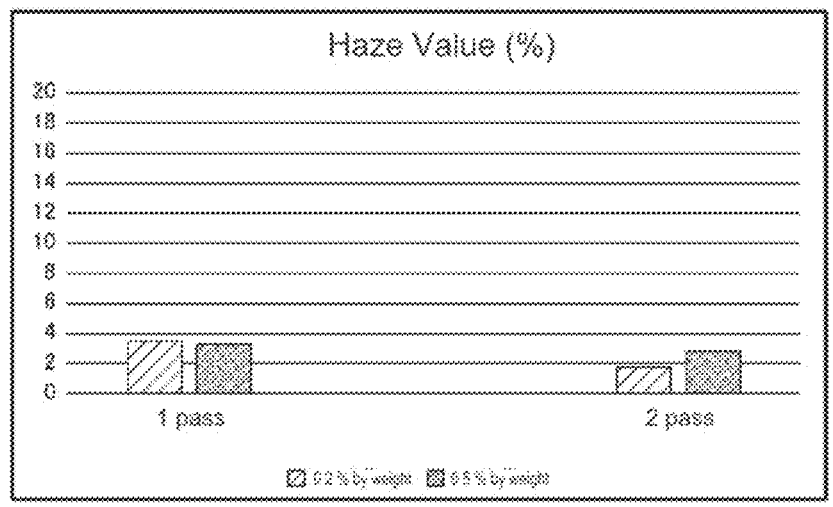
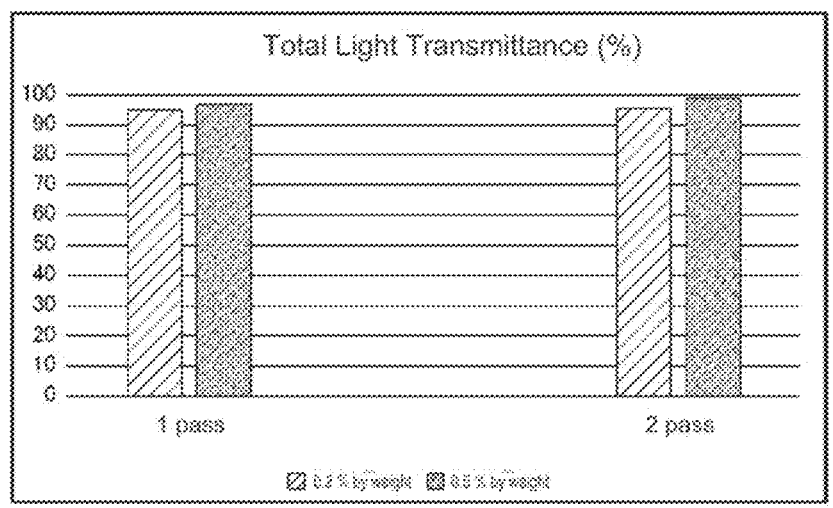
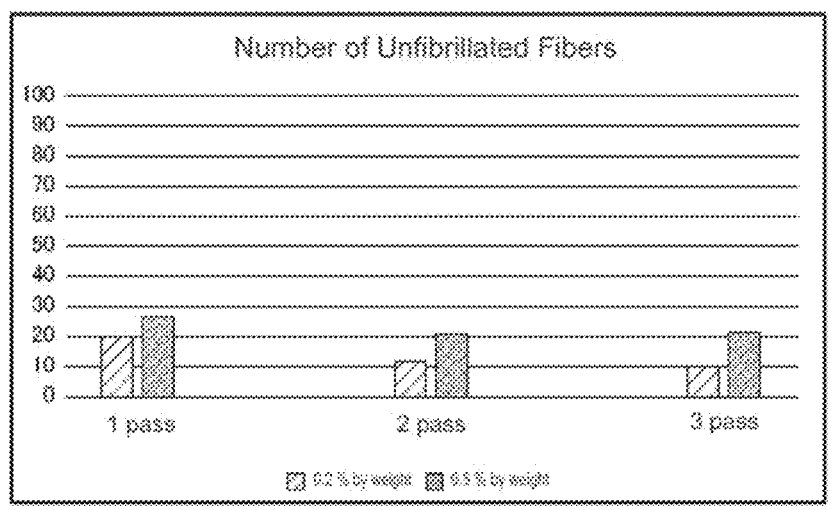

FIG.19
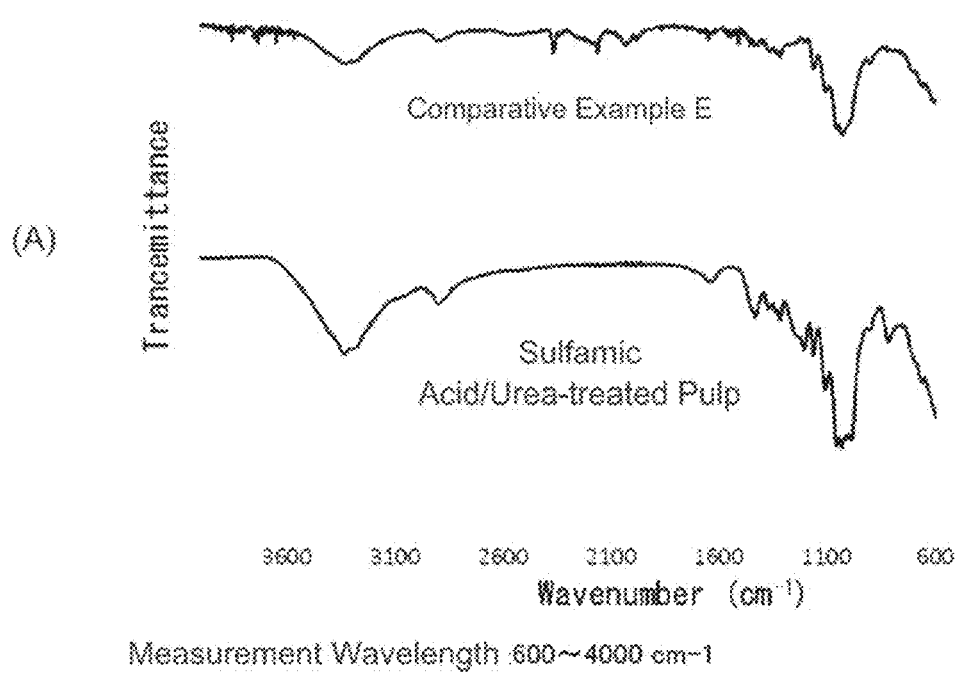
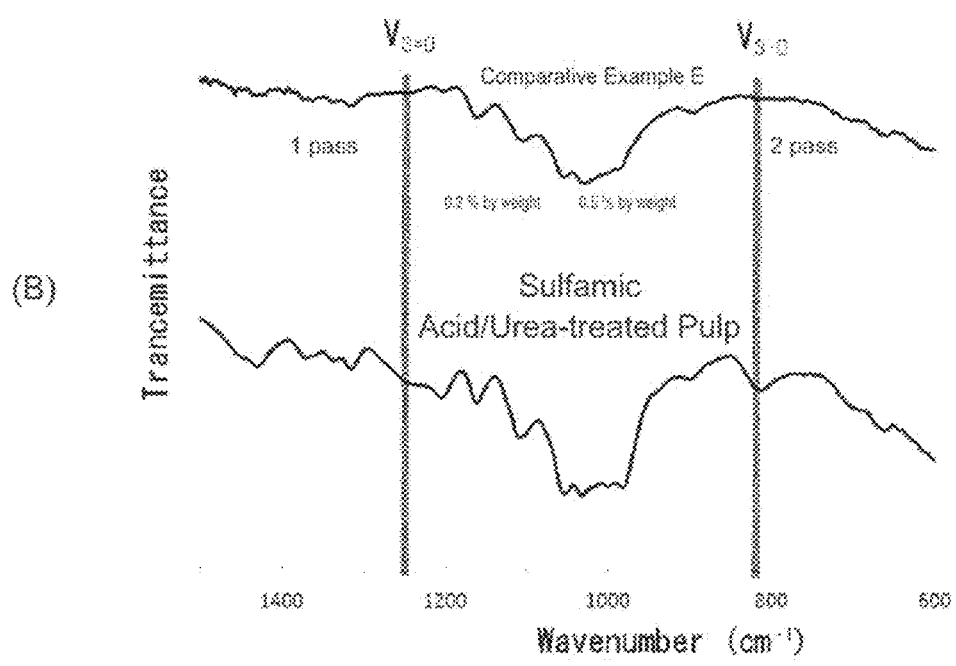
FT-IR Measurement Results

Electrical Conductivity Measurement Results

X-Ray Diffraction Results

X-Ray Diffraction Results

SPM Observation Image of Nanocellulose Fiber

SULFONATED PULP FIBERS, DERIVATIVE PULP, SULFONATED FINE CELLULOSE FIBERS, METHOD FOR PRODUCING SULFONATED FINE CELLULOSE FIBERS, AND METHOD FOR PRODUCING SULFONATED PULP FIBERS

TECHNICAL FIELD

The present invention relates to sulfonated pulp fibers, derivative pulp, sulfonated fine cellulose fibers, a method for producing sulfonated fine cellulose fibers, and a method for producing sulfonated pulp fibers.

BACKGROUND ART

Cellulose nanofibers (CNF) are microfibers having a fiber width of several nanometers to several 10 nanometers and a fiber length of several 100 nanometers and are obtained by subjecting plant-derived cellulose to a nanonization treatment (mechanical fibrillation, TEMPO-catalyzed oxidation, or the like). Since CNF has a light weight, high elasticity, high strength, and low linear thermal expansion, the use of composite materials containing CNF is expected not only in the industrial field but also in other various fields such as the food field and the medical field. More specifically, in the case of, for example, a wooden material, cellulose in wood forms highly crystalline microfibrils having an ultrafine width of about 3 nm containing 30 to 40 bundled cellulose molecules, thereby constituting a plant body. The cellulose nanofiber, which is an aggregate of cellulose fibers that maintain the structure of cellulose microfibrils, can exhibit the above characteristics. In particular, a cellulose nanofiber material having a fiber width as small as cellulose microfibril is expected to be developed for use in various applications due to its characteristics including an enormous specific surface area, a high aspect ratio, and high transparency.

When CNFs are mechanically fibrillated, since cellulose fibers are strongly bonded to each other by a hydrogen bond, a great energy has been required in obtaining CNFs. In addition, there has been a problem that the obtained CNFs had a uneven fiber length, and the like. Further, the minimum fiber width of nanocellulose obtained by performing only mechanical fibrillation using a high-pressure homogenizer or a disk mill is several 10 nanometers even when the treatment is repeated many times. Therefore, fibers with a fine width comparable to that of microfibril (about 3 nm in the case of wooden material) that constitutes plant fibers cannot be obtained; further, there has also been a problem that the characteristics such as high transparency, high aspect ratio, and the like cannot be exhibited.

Therefore, a production method has been developed in which a chemical treatment step is performed to allow cellulose fibers constituting pulp to come apart to some extent in advance before the mechanical fibrillation treatment step is performed (Patent Literatures 1 to 4). By using this method, CNF can be obtained with a smaller energy compared with a method in which pulp is directly subjected to a mechanical treatment. In addition, the method has an advantage that unevenness in size of the obtained CNFs can be reduced.

For example, Patent Literatures 1 to 3 disclose a production method in which pulp is chemically treated with a strong acid such as sulfuric acid, persulfuric acid, or a chlorine-based oxidizing agent, and then the obtained pulp slurry is supplied to a fibrillation device or the like to obtain CNF.

However, in the production methods disclosed in Patent Literatures 1 to 3, since the methods use sulfuric acid, persulfuric acid, or the like in the chemical treatment step, there are problems of, for example, the effluent treatment after the reaction, corrosion of the piping or the like of the facility, and the like, in addition to the problem of complicated handling.

Further, when a chlorine-based oxidizing agent is used, there is a concern of influence of chlorine, which is generated during the reaction, on the environment. Furthermore, it has not been clarified whether the nanocellulose obtained from the pulp subjected to these pretreatments has high transparency.

On the other hand, Patent Literature 4 discloses a production method in which pulp is chemically treated with phosphate and urea, and then the obtained pulp slurry is supplied to a fibrillation device or the like to obtain CNF. Using this production method can solve the drawbacks due to the use of strong acid, such as sulfuric acid, in the chemical treatment step. Moreover, according to the disclosure, since a phosphate ester can be introduced into a part of the hydroxyl groups on the surface of the obtained CNF, dispersibility in an aqueous solvent can be improved.

Further, Patent Literature 4 discloses that CNF having high transparency (having a haze value of 5 to 15%) can be produced by adjusting the solid concentration to 0.2% by mass.

CITATION LIST

Patent Literature

Patent Literature 1: Japanese Laid-Open Patent Publication No. 2017-43677
Patent Literature 2: Japanese Laid-Open Patent Publication No. 2017-8472
Patent Literature 3: Japanese Laid-Open Patent Publication No. 2017-25240
Patent Literature 4: Japanese Laid-Open Patent Publication No. 2017-25468

SUMMARY OF INVENTION

Technical Problem

However, in the technique of Patent Literature 4, although there is a description about transparency, it is a transparency at a solid concentration of 0.2% by mass. Further, Patent Literature 4 does not specifically describe the fiber length of the obtained CNF and also does not specifically describe the fibrillation property of the pulp after the chemical treatment. Further, it is also unclear to which part of the chemically treated pulp (cellulose or hemicellulose) the functional group is mainly introduced. More specifically, despite the fact that the efficient derivatization of cellulose to obtain nanocellulose having the above-described characteristics (small fiber width and high transparency) requires chemical modification of cellulose microfibril surfaces, in particular, chemical modification of the hydroxyl group at C6 position, Patent Literature 4 neither describes nor suggests such chemical modifications.

In view of the above circumstances, an object of the present invention is to provide sulfonated fine cellulose fibers having excellent transparency, sulfonated pulp fibers suitable for the sulfonated fine cellulose fibers, a method for producing these fibers, and derivative pulp containing the sulfonated pulp fibers.

Solution to Problem

The sulfonated pulp fiber of the present invention is a pulp fiber comprising a plurality of cellulose fibers wherein a part of the hydroxyl groups of the cellulose fibers of the pulp fiber is substituted with sulfo groups. An introduction amount of sulfur attributable to the sulfo groups is adjusted to be higher than 0.42 mmol/g while maintaining a fiber shape, and a water retention value of the pulp fiber is adjusted to 150% or more.

The sulfonated fine cellulose fiber of the present invention is a fine cellulose fiber obtained by fibrillating a cellulose fiber. A part of the hydroxyl groups of the fine cellulose fiber is substituted with sulfo groups, and an introduction amount of sulfur attributable to the sulfo groups is adjusted to be higher than 0.42 mmol/g, the fine cellulose fiber having an average fiber width of 30 nm or less, and a haze value of a dispersion liquid in which the fine cellulose fiber is dispersed in a water-soluble solvent so that the solid concentration is 0.2% by mass to 0.5% by mass is 30% or less.

The method for producing a sulfonated pulp fiber of the present invention is a method for producing the sulfonated pulp fiber of the present invention from pulp. The method comprises a chemical treatment step of chemically treating the pulp. The chemical treatment step comprises a contact step of bringing a reaction solution containing a sulfonating agent having sulfo groups and urea and/or a derivative thereof into contact with a pulp fiber constituting the pulp, and a reaction step of introducing sulfo groups into a part of hydroxyl groups of cellulose fibers constituting the pulp fiber after the contact step. The reaction step is a step of heating the pulp fiber in contact with the reaction solution after the contact step, thereby allowing a reaction to proceed wherein the reaction temperature is adjusted to 100° C. to 200° C., and the reaction time is adjusted to 1 minute or more.

The method for producing a sulfonated fine cellulose fiber of the present invention is a method for producing the sulfonated fine cellulose fiber of the present invention from pulp. The method sequentially performs a chemical treatment step of chemically treating the pulp and a fibrillation step of fibrillating the pulp obtained after the chemical treatment step. The pulp obtained after the chemical treatment step contains the sulfonated pulp fiber produced by the method for producing a sulfonated pulp fiber of the present invention. In the fibrillation step, the pulp containing the sulfonated pulp fiber is fibrillated in a state of being dispersed in a water-soluble solvent so that the solid concentration is 0.1% by mass to 20% by mass.

Advantageous Effects of Invention

Since the sulfonated pulp fiber of the present invention has a water retaining property of a predetermined value or more while maintaining the fiber shape, the degree of flexibility in handling can be improved.

Since the derivative pulp of the present invention has a long average fiber length and contains a pulp fiber having a water retaining property of a predetermined value or more, the degree of flexibility in handling can be improved.

According to the sulfonated fine cellulose fiber of the present invention, the dispersibility and the transparency in a state where the fine cellulose fiber is dispersed in a dispersion liquid can be improved.

The method for producing a sulfonated pulp fiber of the present invention makes it possible to produce sulfonated pulp fibers having an excellent handling property by bringing a sulfonating agent having sulfo groups and urea and/or a derivative thereof into contact with pulp so as to react them. It is also possible to appropriately introduce sulfo groups into the hydroxyl groups of the cellulose fiber even with a short reaction time.

The method for producing a sulfonated fine cellulose fiber of the present invention makes it possible to produce sulfonated fine cellulose fibers having an appropriate fiber length and transparency by bringing a sulfonating agent having sulfo groups and urea and/or a derivative thereof into contact with pulp so as to react them.

BRIEF DESCRIPTION OF DRAWINGS

FIG. 2 is a graph showing experimental results, showing a sulfur introduction amount and a water retention value.

FIG. 3 is a graph showing experimental results, showing a water retention value.

FIG. 4 is a graph showing experimental results, showing a fiber length.

FIG. 7 is a diagram showing experimental results and is an enlarged image of the fiber surface of sulfamic acid/urea-treated pulp fiber, which corresponds to the sulfonated pulp fiber of the present embodiment.

FIG. 9 is a diagram showing experimental results and is an enlarged image of the fiber surface of sulfamic acid/urea-treated pulp fiber, which corresponds to the sulfonated pulp fiber of the present embodiment.

FIG. 12 is a graph showing experimental results with regard to transparency.

FIG. 13 is a graph showing experimental results with regard to transparency.

FIG. 18 is a graph showing experimental results, showing a relationship between fibrillation and solid concentration upon fibrillation.

FIG. 19 is a diagram showing experimental results, showing the results of FT-IR measurement of sulfamic acid/urea-treated pulp fiber, which corresponds to the sulfonated pulp fiber of the present embodiment.

DESCRIPTION OF EMBODIMENTS

Figure 1:
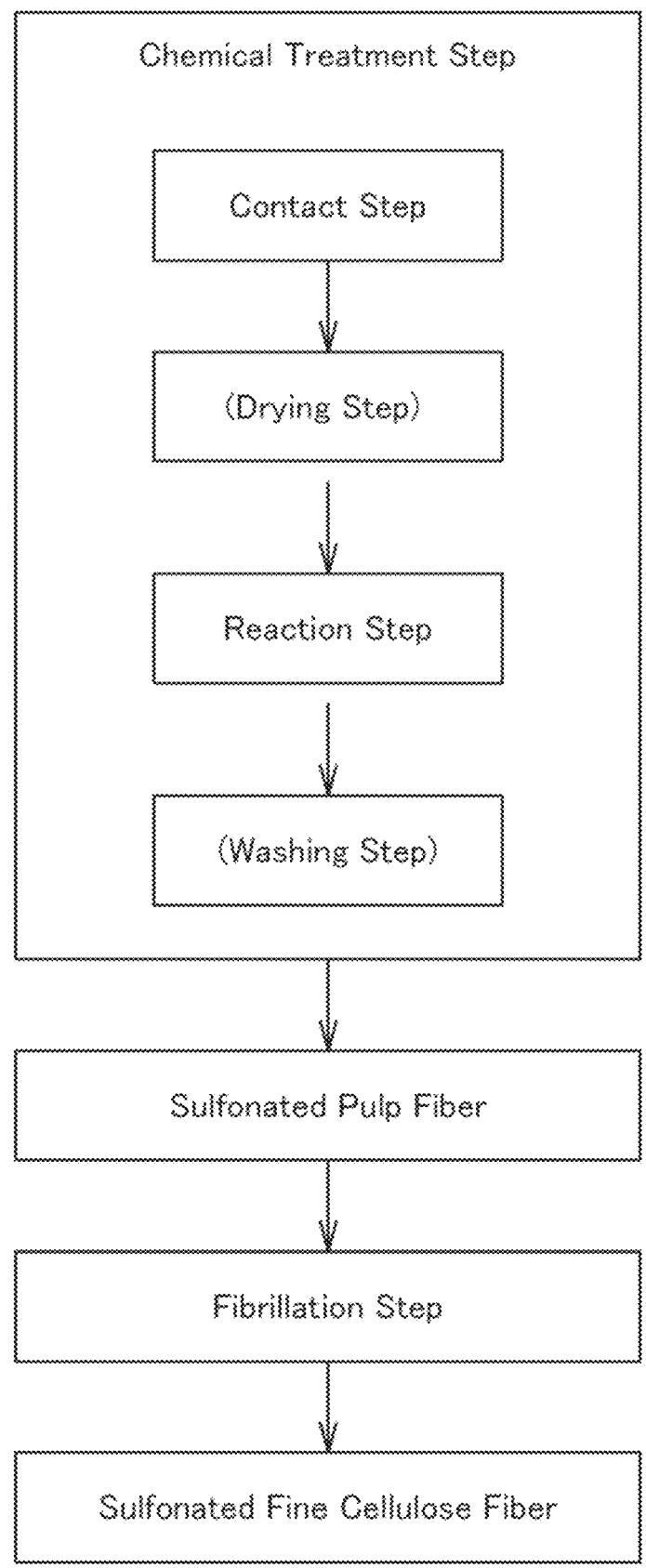
FIG. 1 is a schematic flow diagram illustrating a method for producing sulfonated fine cellulose fibers, sulfonated pulp fibers, and derivative pulp of the present embodiment.

Hereinbelow, embodiments of the present invention are described by referring to drawings.

The sulfonated pulp fiber and the derivative pulp of the present embodiment (hereinafter simply referred to as sulfonated pulp fiber and derivative pulp, respectively) are characterized by improved handling properties.

The sulfonated fine cellulose fiber of the present embodiment (hereinafter simply referred to as sulfonated fine cellulose fiber) is fine cellulose fiber manufactured by fibrillating cellulose fiber, and is characterized by excellent transparency.

The method for producing a sulfonated pulp fiber of the present embodiment (hereinafter referred to as a sulfonated pulp fiber production method) is characterized by its capability to produce a sulfonated pulp fiber having an excellent handling property.

The method for producing a sulfonated fine cellulose fiber of the present embodiment (hereinafter referred to as a sulfonated fine cellulose fiber production method) is characterized by its capability to efficiently produce a sulfonated fine cellulose fiber having an excellent transparency and improved entanglement between fibers.

In particular, the sulfonated fine cellulose fiber production method makes it possible to easily and appropriately produce fine cellulose fibers having desired properties by fibrillating sulfonated pulp fibers produced by the sulfonated pulp fiber production method.

Hereinbelow, embodiments of the sulfonated pulp fiber, the derivative pulp, and the sulfonated fine cellulose fiber are described first, followed by embodiments of the sulfonated pulp fiber production method and the sulfonated fine cellulose fiber production method.

Sulfonated Pulp Fiber

The sulfonated pulp fiber is pulp fiber formed of a plurality of cellulose fibers, in which at least a part of hydroxyl groups (—OH groups) of the cellulose (a chain polymer formed of β (1→4) glycosiclically-bonded D-glucose) constituting the cellulose fibers contained therein is sulfonated by the sulfo group represented by the following formula (1). That is, in the sulfonated pulp fiber, a part of the hydroxyl groups of the cellulose fiber is substituted with sulfo groups.

More specifically, the fibers of the sulfonated pulp fiber have improved hydrophilicity due to the sulfo groups introduced therein.

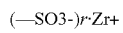  (1)

(wherein r is an independent natural number of 1 to 3; when r=1, Zr+ is at least one member selected from the group consisting of hydrogen ion, alkali metal cation, ammonium ion, aliphatic ammonium ion, and aromatic ammonium ion; when r=2 or 3, Zr+ is at least one member selected from the group consisting of cation of an alkaline earth metal or cation of a polyvalent metal.)

Since the hydrophilicity of the sulfonated pulp fiber is considered to affect the moisture content that the fibers can retain, it is assumed that there is a relationship between the amount of sulfo groups introduced into the sulfonated pulp fibers and the moisture content retainable by the sulfonated pulp fiber (i.e., the water retention value).

Amount of Sulfo Group Introduced into Sulfonated Pulp Fiber

As mentioned above, the fibers of the sulfonated pulp fiber have improved hydrophilicity due to the sulfo groups introduced therein. More specifically, the sulfonated pulp fiber have improved dispersibility in an aqueous solvent due to the sulfo groups introduced therein.

This amount of sulfo groups introduced into the sulfonated pulp fibers can be represented by the amount of sulfur attributable to the sulfo groups, and is not particularly limited insofar as the dispersibility can be imparted while keeping a long fiber state. Specifically, it is sufficient that dispersibility is imparted to the pulp fibers of the sulfonated pulp fibers and the amount of sulfo groups introduced therein is adjusted so that the average fiber length of the pulp fibers is 50% or more compared to that before substitution with sulfo groups.

For example, the amount of the introduced sulfur attributable to sulfo groups per 1 g (mass) of the sulfonated pulp fibers is adjusted to preferably more than 0.1 mmol/g, more preferably 0.2 mmol/g to 9.9 mmol/g, and further preferably 0.42 mmol/g to 9.9 mmol/g.

As the amount of the introduced sulfur attributable to sulfo groups per 1 g (mass) of the sulfonated pulp fibers becomes closer to 9.9 mmol/g, there is a concern that the crystallinity may decrease, and the cost for introducing sulfur tends to increase.

Therefore, the amount of sulfo groups introduced into the sulfonated pulp fibers, that is, the introduction amount of sulfur attributable to the sulfo group, is preferably adjusted to fall within the above range.

Since the number of sulfur atoms in the sulfo group is 1, the ratio of the amount of sulfur introduced to the amount of sulfo group introduced is 1:1, as in the case of the sulfonated fine cellulose fiber.

In particular, the amount of sulfo groups introduced into the sulfonated pulp fibers (the introduction amount of sulfur attributable to sulfo groups) is adjusted to preferably more than 0.42 mmol/g, more preferably 0.42 mmol/g to 9.9 mmol/g, further preferably more than 0.42 mmol/g and not more than 3.0 mmol/g, further more preferably more than 0.42 mmol/g and not more than 2.0 mmol/g, still more preferably more than 0.42 mmol/g and not more than 1.7 mmol/g, and more preferably more than 0.42 mmol/g and not more than 1.5 mmol/g, in view of allowing the sulfonated pulp fibers dispersed in an aqueous solvent to easily come apart.

When the introduction amount of sulfur attributable to sulfo groups per 1 g (mass) of the sulfonated pulp fibers is 0.42 mmol/g or less, the fine fibers constituting the sulfonated pulp fibers tend to maintain a strongly bonded state.

Therefore, in view of allowing the sulfonated pulp fibers to easily come apart, the amount of sulfo groups introduced into the sulfonated pulp fibers, that is, the introduction amount of sulfur attributable to sulfo groups, is preferably adjusted to fall within the above range.

The lower limit of the amount of sulfo groups introduced into the sulfonated pulp fibers may be adjusted to be more than 0.42 mmol/g. For example, the lower limit may be adjusted to 0.5 mmol/g or more or 0.6 mmol/g or more.

The expression "the fibers come apart" as used herein refers to a state in which a plurality of fine fibers constituting the sulfonated pulp fibers are naturally separated when the sulfonated pulp fibers are placed in an aqueous solvent, for example, a state in which the sulfonated pulp fibers can be separated into a plurality of fine fibers when they are stirred with a small force.

Method for Measuring the Amount of Sulfo Group Introduced

The amount of sulfo group introduced into the sulfonated pulp fibers can be evaluated by the introduction amount of sulfur attributable to sulfo groups. Specifically, the amount can be measured using the same measurement method as in the case of the sulfonated fine cellulose fibers. The measurement can specifically be performed by combusting a predetermined amount of sulfonated pulp fibers, and measuring the sulfur content in the combustion product according to IEC 62321 using a combustion-ion chromatography.

Water Retention Value of Sulfonated Pulp Fibers

The sulfonated pulp fibers are also characterized by having a predetermined water retention value, in addition to the introduction amount of sulfur attributable to sulfo groups described above. Specifically, the sulfonated pulp fibers are prepared so that the water retention value of the sulfonated pulp fibers, that is, the amount of moisture contained therein after centrifugal dehydration, satisfies a predetermined state.

The range of the water retention value of the sulfonated pulp fibers is not particularly limited insofar as it is appropriately adjusted according to the intended use and applications described later.

For example, the water retention value of the sulfonated pulp fibers is adjusted to preferably 150% or more, more preferably more than 200%, further preferably 220% or more, further more preferably 250%, further preferably 300% or more, and further more preferably 500% or more.

By increasing the water retention value of the sulfonated pulp fibers, the fibers will contain a large amount of moisture. In such a state, it is assumed that the moisture contained in the fibers affects the bonding strength between the fine fibers constituting the sulfonated pulp fibers.

More specifically, it is assumed that, in the sulfonated pulp fibers prepared to have a high water retention value, the bond between the fine fibers constituting the surface of the sulfonated pulp fibers is weakened and to thereby form a gap between the adjacent fine fibers; as a result, the fibers more easily retain moisture, as, for example, the water enters into the gap.

Therefore, by adjusting the water retention value of the sulfonated pulp fibers to fall within the above range, sulfonated pulp fibers suitable for the following intended use and applications can be prepared.

In View of Dehydration

For example, in view of the dehydration property of the sulfonated pulp fiber, the fibers may be prepared so that the amount of moisture in the fiber is small, that is, the water retention value is low.

By lowering the water retention value of the sulfonated pulp fibers, advantages such as reduction in the transportation costs at the time of conveyance, improved production efficiency and reduction in the costs upon the production of the sulfonated pulp fibers, can be ensured.

In View of Fibrillation

On the other hand, in view of fibrillation of the sulfonated pulp fibers (in other words, in view of allowing the fibers to easily come apart), the sulfonated pulp fibers may be prepared so that the amount of moisture in the fibers is large, that is, the water retention value is high. For example, in view of allowing the sulfonated pulp fibers to easily come apart (fibrillating the fibers), the water retention value of the sulfonated pulp fibers may be adjusted to be higher than 150% when the fibrillation pressure is 120 to 140 MPa.

The reason for this is that the bonding strength between the fine fibers constituting the sulfonated pulp fibers can be weakened by increasing the water retention value of the sulfonated pulp fibers. As a result, the surface of the sulfonated pulp fibers and inner portions close to the surface are more easily fibrillated. Further, by supplying the sulfonated pulp fibers in such a state to a fibrillation device or the like, the pulp fibers can be more easily fibrillated. More specifically, it is assumed that, since the sulfonated pulp fibers described later can easily come apart upon the fibrillation process, workability and efficiency upon the preparation of fibrillated cellulose fibers can be improved.

If the water retention value is too high when the sulfonated pulp fibers are fibrillated, the concentration of the fibrillated fibers tends to excessively decrease, or the yield tends to decrease. Therefore, in view of, for example, the yield, the concentration, and the like of the fine fibers obtained after the fibrillation of the sulfonated pulp fibers, the water retention value is preferably adjusted to a level that is not excessively high; for example, the water retention value is preferably adjusted to 10,000% or less. The details will be described later.

In the present specification, the expression "allowing the fibers to come apart" refers to, for example, applying energy to the sulfonated pulp fibers when the slurry of the sulfonated pulp fibers is fibrillated so that a plurality of fine fibers constituting the sulfonated pulp fibers are separated from each other.

Method for Measuring Water Retention Value

The water retention value of the sulfonated pulp fibers can be determined by a general water retention test for pulp fibers (for example, a method according to JAPAN TAPPI paper pulp test No. 26:2000).

Average Fiber Length of Sulfonated Pulp Fiber

As described above, the length of the sulfonated pulp fiber is not particularly limited insofar as it has an average fiber length with which the fiber shape is maintained.

Specifically, it is sufficient that a predetermined average fiber length is maintained before and after the sulfonation of the sulfonated pulp fibers. More specifically, the fibers are preferably prepared so that, in comparison between the average fiber length of the pulp fibers before the introduction of sulfo groups into the sulfonated pulp fibers and the average fiber length of the sulfonated pulp fibers after the introduction of sulfo groups into the sulfonated pulp fibers, the fiber length of the latter (i.e., the sulfonated pulp fibers) is 50% or more, more preferably 70% or more, and still more preferably 80% or more of that of the former. In other words, the sulfonated pulp fibers are prepared so that its average fiber length has a predetermined value or more both before and after the introduction of sulfo groups, regardless of the type of raw material of the pulp.

For example, when wood-based pulp fibers are used as the raw material, and the average fiber length thereof is 2.6 mm, the sulfonated pulp fibers are prepared so that the average fiber length is 50% or more of the average fiber length of the pulp fibers used as the raw material, namely, 1.3 mm or more.

When the average fiber length of the sulfonated pulp fibers is adjusted to fall within the above range, fibers having an excellent handling property can be obtained.

Specifically, it is possible to ensure advantages including improving the entanglement of the fibers, unifying the fibers to have a desired length while maintaining a certain fiber length, and, when the fibers are fibrillated, increasing the average fiber length of the fine fibers after the fibrillation.

Therefore, it becomes possible to provide sulfonated pulp fibers having an excellent flexibility according to the intended use and applications.

On the other hand, when the average fiber length is shorter than the above range, the flexibility tends to be limited because the influence when the sulfonated pulp fibers are hydrolyzed becomes more significant.

Therefore, the average fiber length of the sulfonated pulp fibers is preferably adjusted to fall within the above range.

Method for Measuring Average Fiber Length

The average fiber length of the sulfonated pulp fibers can be measured using a known fiber analyzer. Examples of known fiber analyzers include a fiber tester (manufactured by Lorentzen Wettre K. K.).

As described above, by adjusting the amount of sulfo groups introduced into the sulfonated pulp fiber of the present embodiment, the dispersibility can be improved while maintaining a long fiber length; as a result, the flexibility in handling the fibers can be improved.

In addition, the ease of fiber separation and the transparency of the fine cellulose fibers, which is described later, can be improved.

Further, by adjusting the water retention value of the sulfonated pulp fiber of the present embodiment, appropriate adjustment for the intended use and applications of the sulfonated pulp fibers as described above becomes possible. Therefore, it is possible to provide sulfonated pulp fibers having improved flexibility in handling.

Whiteness

The sulfonated pulp fibers are washed in a manner such that a plurality of sulfonated pulp fibers are dispersed in an aqueous solution, and then dried. It is preferable to adjust the whiteness after drying to fall within a predetermined range.

For example, the sulfonated pulp fibers may be prepared to have a whiteness of 30% or more, preferably 40% or more. When the whiteness is 30% or more, coloring becomes less noticeable, and thus the handling property can be improved.

The whiteness of the sulfonated pulp fibers can be determined using a known method. For example, the whiteness can be measured in accordance with JIS P 8148:2001 (paper, board, and pulps-ISO brightness (Diffuse Blue Reflectance Factor)).

Derivative Pulp

The derivative pulp is a pulp formed of a plurality of fibers, and is a pulp fiber prepared to contain a plurality of the sulfonated pulp fibers described above. More specifically, by assembling a plurality of sulfonated pulp fibers produced by the sulfonated pulp fiber production method, it is possible to produce a derivative pulp containing pulp fibers having sulfo groups introduced therein.

The derivative pulp may be an aggregate obtained by assembling only a plurality of sulfonated pulp fibers produced by the sulfonated pulp fiber production method, or may contain fibers made of a material other than cellulose (for example, synthetic fibers such as polyvinyl alcohol (PVA), polyester, or the like, natural fibers such as wool, or the like), other pulp fibers, and the like.

Adjustment to increase the content of the plurality of sulfonated pulp fibers produced by the sulfonated pulp fiber production method is preferable in order to ensure the same effects as those of the sulfonated pulp fibers described above.

Sulfonated Fine Cellulose Fiber

The sulfonated fine cellulose fiber is a fine cellulose fiber obtained by fibrillating a cellulose fiber, in which at least a part of hydroxyl groups (—OH groups) of the cellulose (a chain polymer formed of β (1→4) glycosiclically-bonded D-glucose) constituting the fine cellulose fiber is sulfonated by the sulfo group represented by the formula (1) above.

That is, in the sulfonated fine cellulose fiber, a part of the hydroxyl groups of the fine cellulose fiber is substituted with sulfo groups.

By containing sulfo groups therein, it becomes possible to improve the fiber hydrophilicity of the sulfonated fine cellulose fibers. That is, by introducing sulfo groups into the sulfonated fine cellulose fibers, the dispersibility of the sulfonated fine cellulose fibers when dispersed in a dispersion liquid can be improved. In addition, the state of being dispersed in a dispersion liquid can also be easily maintained due to the electronic repulsion of the sulfo groups introduced therein.

In addition, it is possible to impart a physiological activity derived from the sulfo group to the sulfonated fine cellulose fibers. For example, chondroitin sulfate, which is a kind of sulfated polysaccharide known as a heparin analogue, has hyaluronidase inhibitory activity and skin moisturizing effects, and thus applications thereof to xeroderma, asteatosis, and atopic dermatitis have been studied. Since the sulfonated fine cellulose fiber is also a kind of natural polysaccharide, it can be used in the medical field based on the physiological activity derived from the sulfo group.

The solvent of the dispersion liquid is not particularly limited insofar as it is an aqueous solvent. More specifically, the solvent used in the dispersion liquid may be a solvent soluble in water (water-soluble solvent). For example, in addition to water alone, alcohol, ketone, amine, carboxylic acid, ether, amide, or a mixture thereof may be used.

In addition, the sulfonated fine cellulose fiber may have other functional group(s) bonded thereto; in particular, the sulfonated fine cellulose fiber may contain a functional group (substituent) containing sulfur other than sulfo group.

The following describes a case where only sulfo groups are introduced with respect to the hydroxyl groups of the cellulose fibers constituting the sulfonated fine cellulose fibers as a representative example.

Amount of Sulfo Group Introduced Into Sulfonated Fine Cellulose Fiber

This amount of sulfo groups introduced into the sulfonated fine cellulose fibers can be represented by the amount of sulfur attributable to the sulfo groups, and is not particularly limited insofar as the transparency and the dispersibility can be retained to some extent.

For example, the introduction amount of sulfur attributable to sulfo groups per 1 g (mass) of the sulfonated fine cellulose fiber is adjusted to preferably more than 0.42 mmol/g, more preferably 0.42 mmol/g to 9.9 mmol/g, further preferably 0.5 mmol/g to 9.9 mmol/g, and further more preferably 0.6 mmol/g to 9.9 mmol/g.

Since the number of sulfur atoms in the sulfo group is 1, the ratio of the amount of sulfur introduced to the amount of sulfo group introduced is 1:1. For example, when the amount of sulfur introduced per 1 g (mass) of the sulfonated fine cellulose fibers is 0.42 mmol/g, the amount of sulfo group introduced is evidently 0.42 mmol/g.

When the introduction amount of sulfur attributable to sulfo group per 1 g (mass) of the sulfonated fine cellulose fibers is 0.42 mmol/g or less, the dispersibility tends to decrease because of the strong hydrogen bond between the fibers. In contrast, when the amount of the sulfur introduced is more than 0.42 mmol/g, the dispersibility can be easily improved; further, when the amount of the sulfur introduced is 0.5 mmol/g or more, the electronic repulsion can be further increased, and thus the dispersed state can be easily and stably maintained. On the other hand, as the amount of the sulfur introduced becomes closer to 9.9 mmol/g, there is a concern that the crystallinity may decrease, and the costs for introducing sulfur tends to increase.

Therefore, the amount of sulfo groups introduced into the sulfonated fine cellulose fibers, that is, the introduction amount of sulfur attributable to sulfo group, is preferably adjusted to fall within the above range.

In particular, in view of the dispersibility of the fine fibers constituting the sulfonated pulp fibers, the amount of sulfo groups introduced into the sulfonated fine cellulose fibers (the introduction amount of sulfur attributable to sulfo group) is adjusted to preferably more than 0.42 mmol/g and not more than 3.0 mmol/g, more preferably 0.5 mmol/g to 3.0 mmol/g, further preferably 0.5 mmol/g to 2.0 mmol/g, further more preferably 0.5 mmol/g to 1.7 mmol/g, and more preferably 0.5 mmol/g to 1.5 mmol/g.

Further, in view of the transparency of the sulfonated fine cellulose fibers, it is also preferable to adjust the amount to fall within the above range.

Method for Measuring the Amount of Sulfo Group Introduced

The amount of sulfo groups introduced into the sulfonated fine cellulose fibers can be evaluated by the introduction amount of sulfur attributable to sulfo group. Specifically, the measurement can specifically be performed by combusting a predetermined amount of sulfonated fine cellulose fibers, and measuring the sulfur content in the combustion product according to IEC 62321 using a combustion-ion chromatography.

When the sulfonated fine cellulose fibers are prepared from the sulfonated pulp fibers as described later, the amount of sulfo groups introduced may be determined from the amount of sulfur introduced into the sulfonated pulp fibers.

The average fiber length and the average fiber width of the sulfonated fine cellulose fibers are not particularly limited insofar as the fibers are easily entangled with each other and easily ensure desired transparency when dispersed in an aqueous solvent. For example, the average fiber length and the average fiber width may be adjusted as follows.

Average Fiber Length of Sulfonated Fine Cellulose Fiber

The average fiber length of the sulfonated fine cellulose fibers can be indirectly represented by a polymerization degree.

For example, the sulfonated fine cellulose fiber can be adjusted to have a polymerization degree of 280 or more. Specifically, the sulfonated fine cellulose fibers are prepared so as to have a polymerization degree of preferably 300 to 1,000, more preferably 300 to 600. When the polymerization degree of the sulfonated fine cellulose fibers is lower than 280, the fibers tend to be less entangled due to a decrease in fiber length.

Therefore, when the sulfonated fine cellulose fibers are defined by the polymerization degree, the polymerization degree is preferably adjusted to fall within the above range.

When the length of a single glucose molecule in the axis-wise direction is about 5 Å (about 0.5 nm) and the polymerization degree of the sulfonated fine cellulose fibers is 300, it is theoretically possible to prepare sulfonated fine cellulose fibers having a fiber length of about 150 nm (about 0.15 μm).

Method for Measuring Polymerization Degree

When the average fiber length of the sulfonated fine cellulose fibers is represented by the polymerization degree, the method for measuring the polymerization degree is not particularly limited.

For example, the polymerization degree may be measured by the copper-ethylenediamine method. More specifically, the polymerization degree of the sulfonated fine cellulose fibers can be measured by dissolving the sulfonated fine cellulose fibers in a 0.5M copper-ethylenediamine solution and measuring the viscosity of the resulting solution by a viscosity method.

Average Fiber Width of Sulfonated Fine Cellulose Fiber

The average fiber width of the sulfonated fine cellulose fibers is not particularly limited insofar as the fibers have a thickness that ensures desired transparency when dispersed in an aqueous solvent.

For example, the average fiber width of the sulfonated fine cellulose fibers is adjusted to preferably 1 nm to 1000 nm, more preferably 2 nm to 500 nm, further preferably 2 nm to 100 nm, further more preferably 2 nm to 30 nm, and even more preferably 2 nm to 20 nm when the fibers are observed with an electron microscope.

When the fiber width of the fine cellulose fibers is less than 1 nm, the fine cellulose fibers are similar to those dissolved in water as cellulose molecules; therefore, the physical properties (strength, rigidity, or dimensional stability) of the fine cellulose fibers become more difficult to exhibit. On the other hand, when the fiber width is more than 1000 nm, the cellulose fibers are no longer regarded as fine cellulose fibers; rather, the fibers are regarded simply as fibers contained in ordinary pulp. Therefore, the fibers become more difficult to ensure the physical properties (transparency, strength, rigidity, or dimensional stability) of fine cellulose fibers.

Therefore, the average fiber width of the sulfonated fine cellulose fiber is preferably adjusted to fall within the above range.

In particular, in view of the use requiring a certain handling property and transparency of the sulfonated fine cellulose fibers, it is more preferable to adjust the average fiber width within the following range.

When the average fiber width of the sulfonated fine cellulose fibers is more than 30 nm, the aspect ratio tends to decrease and the entanglement between fibers tends to decrease. Further, when the average fiber width is more than 30 nm, which is close to 1/10 of the wavelength of visible light, the refraction and scattering of visible light easily occur at the interface when the fibers are combined with a matrix material. As a result, due to the scattering of visible light, the transparency tends to decrease.

Therefore, the average fiber width of the sulfonated fine cellulose fibers is preferably 2 nm to 30 nm, more preferably 2 nm to 20 nm, and further preferably 2 nm to 10 nm in view of a handling property and transparency.

Further, in view of transparency, the average fiber width of the sulfonated fine cellulose fibers is preferably 20 nm or less, more preferably 10 nm or less. When the average fiber width is adjusted to 10 nm or less, scattering of visible light can be reduced; therefore, sulfonated fine cellulose fibers having high transparency can be obtained.

Method for Measuring Average Fiber Width

The average fiber width of the sulfonated fine cellulose fiber can be measured using a known technique.

For example, the sulfonated fine cellulose fibers are dispersed in a solvent such as pure water to prepare a mixed solution having a predetermined mass %. The mixed solution is spin-coated on a silica substrate coated with PEI (polyethyleneimine), and the sulfonated fine cellulose fibers on the silica substrate are observed.

As an observation method, for example, a scanning probe microscope (for example, SPM-9700 manufactured by Shimadzu Corporation) can be used. The average fiber width of the sulfonated fine cellulose fibers can be determined by randomly selecting 20 sulfonated fine cellulose fibers in the obtained observation image, measuring the individual fiber widths, and averaging the measured widths.

Haze Value

The transparency of the sulfonated fine cellulose fibers can be evaluated by the transparency in a dispersed state. Specifically, visually confirmed transparency of a dispersion liquid adjusted to have a predetermined solid concentration when the sulfonated fine cellulose fibers are dispersed therein can be evaluated using a haze value.

The solid concentration of the dispersion liquid in which the sulfonated fine cellulose fibers are dispersed is not particularly limited. For example, the dispersion liquid can be prepared by dispersing the sulfonated fine cellulose fibers in a water-soluble solvent so that the solid concentration becomes 0.1% by mass to 20% by mass.

If the haze value of the dispersion liquid is 20% or less, it can be regarded that the sulfonated fine cellulose fibers have transparency. On the contrary, if the haze value of the dispersion liquid prepared to have a solid concentration within the above range is more than 20%, the sulfonated fine cellulose fibers can be regarded more difficult to appropriately ensure the transparency. More specifically, if the solid concentration of the dispersion liquid in which the sulfonated fine cellulose fibers are dispersed is adjusted to 0.2% by mass to 0.5% by mass, the sulfonated fine cellulose fibers appropriately ensure superior transparency insofar as the haze value of the dispersion liquid is 20% or less, more preferably 15% or less, and further preferably 10% or less.

Therefore, in view of transparency, the sulfonated fine cellulose fibers are preferably prepared such that the haze value of a dispersion liquid prepared to have a solid concentration of 0.1% by mass to 20% by mass is 20% or less; more preferably, the sulfonated fine cellulose fibers are prepared such that the haze value of the dispersion liquid prepared to have a solids content of 0.2% by mass to 0.5% by mass falls within the above range.

The solvent of the dispersion liquid is not particularly limited insofar as it is a solvent soluble in water (water-soluble solvent) such as the above-described aqueous solvent. For example, the water-soluble solvent may be water alone, alcohol, ketone, amine, carboxylic acid, ether, amide, and the like, which may be used solely or in combination of two or more kinds.

Method for Measuring Haze Value

The haze value can be measured as follows.

The sulfonated fine cellulose fibers are dispersed in the dispersion liquid described above at a predetermined solid concentration. Then, by measuring the dispersion liquid using a spectrophotometer in accordance with JIS K 7105, the haze value, which is the transparency of the sulfonated fine cellulose fibers, can be determined.

Method for Measuring Total Light Transmittance

The sulfonated fine cellulose fibers are preferably prepared so that the total light transmittance is 90% or more, more preferably 95% or more, within the above range of haze value of the dispersion liquid.

The total light transmittance can be measured as follows.

The sulfonated fine cellulose fibers are dispersed in the dispersion liquid described above at a predetermined solid concentration. Then the total light transmittance of the sulfonated fine cellulose fibers can be determined by measuring the dispersion liquid using a spectrophotometer in accordance with JIS K 7105.

In the present specification, "transparency" includes both or either of transparency and turbidity of a liquid. Regarding the transparency evaluation, the turbidity of the liquid can be more appropriately evaluated by the haze value, and the transparency can be more appropriately evaluated by the total light transmittance.

As described above, when the average fiber length and the average fiber width of the sulfonated fine cellulose fibers are adjusted to fall within the above ranges, the sulfonated fine cellulose fibers can ensure excellent transparency and can be easily entangled with each other. Therefore, when a composite material or the like is prepared by using the sulfonated fine cellulose fibers, it is possible to exhibit excellent transparency and high strength of the composite material or the like.

Viscosity

When the sulfonated fine cellulose fibers have the properties described above, the sulfonated fine cellulose fibers have a predetermined viscosity. More specifically, when the sulfonated fine cellulose fibers are prepared to have a predetermined solid concentration (for example, 0.5% by mass), the viscosity of the liquid is 10,000 mPa·s or more.

The viscosity can be measured using a Brookfield viscometer. For example, the viscosity of the sulfonated fine cellulose fibers can be measured by measuring a liquid prepared so that the solid concentration of the sulfonated fine cellulose fibers becomes 0.5% by mass using a Brookfield viscometer at a rotation speed of 6 rpm, 25° C., for 3 minutes.

Method for Producing Sulfonated Fine Cellulose Fibers and Sulfonated Pulp Fibers The sulfonated pulp fibers, the derivative pulp and the sulfonated fine cellulose fibers can be produced by the following sulfonated pulp fiber production method and sulfonated fine cellulose fiber production method.

The sulfonated pulp fiber production method can roughly be defined as a method for producing sulfonated pulp fibers by subjecting pulp to a chemical treatment step wherein, in the chemical treatment step, the supplied pulp is subjected to a contact step and then subjected to a reaction step.

The sulfonated fine cellulose fiber production method can roughly be defined as a method comprising subjecting pulp to a chemical treatment step and then subjecting the resulting pulp to a fibrillation step in this order.

In the sulfonated fine cellulose fiber production method, pulp fibers produced by the sulfonated pulp fiber production method can be used as the pulp to be subjected to the fibrillation step. The following describes, as a representative case, a case of using sulfonated pulp fibers produced by the sulfonated pulp fiber production method.

The sulfonated fine cellulose fibers may be produced by directly supplying a fiber raw material to the fibrillation step of the sulfonated fine cellulose fiber production method to thereby obtain fine cellulose fibers and substituting at least a part of the hydroxyl groups of the cellulose constituting the fine cellulose fibers with sulfo groups, or by supplying sulfonated pulp fibers obtained by the production method described below, i.e., the sulfonated pulp fiber production method, to the fibrillation step of the sulfonated fine cellulose fiber production method to thereby fibrillate the sulfonated pulp fibers. When the latter method is performed, by supplying sulfonated pulp fibers in which a part of the hydroxyl groups of the cellulose fiber is already substituted with sulfo groups to the fibrillation step, it is possible to advantageously obtain desired sulfonated fine cellulose fibers.

As described above, the derivative pulp can be prepared by producing an aggregate of a plurality of sulfonated pulp fibers produced by the sulfonated pulp fiber production method; thus, the production method thereof is omitted.

The production method described below is merely an example. The production method is not limited to the following method and may be any method capable of producing the sulfonated pulp fibers and the sulfonated fine cellulose fibers having the properties described above.

First, the sulfonated pulp fiber production method is described, and then the sulfonated fine cellulose fiber production method is described.

Method for Producing Sulfonated Pulp Fibers

As shown in FIG. 1, the sulfonated pulp fiber production method comprises a chemical treatment step in which a fiber raw material containing cellulose is chemically treated by the following method.

Chemical Treatment Step

The chemical treatment step in the sulfonated pulp fiber production method performs a contact step of bringing a fiber raw material containing cellulose into contact with a sulfonating agent having a sulfo group and urea and/or a derivative thereof, and a reaction step of introducing sulfo groups into at least a part of the hydroxyl groups of the cellulose fibers contained in the fiber raw material resulting from the contact step.

More specifically, the sulfonated pulp fiber production method is characterized by using urea and/or a derivative thereof in the method of introducing sulfo groups into cellulose fibers contained in the fiber raw material. Therefore, the method provides the following excellent effects, which cannot be obtained by the prior art production method.

In general, a method of performing a heat treatment in a state where only a sulfonating agent is in contact with the fiber raw material is assumed as the method for introducing sulfo groups into cellulose fibers contained in a fiber raw material.

However, when the reaction is carried out in the presence of only a sulfonating agent, there are some problems including the following problems: (1) a long period of time is required to introducing sulfo groups; (2) the fiber length tends to decrease due to the influence of the acid of the sulfonating agent; and (3) the fibers obtained after the reaction are colored due to the influence of the acid of the sulfonating agent, and various chemical treatments are required to remove the color, which requires labor and cost.

In contrast, as described above, the sulfonated pulp fiber production method performs the method of bringing a fiber raw material into contact with the sulfonating agent and also urea and/or a derivative thereof. Therefore, it is possible to solve drawbacks including the above-mentioned problems (1) to (3) in the prior art method in which the reaction is carried out using only a sulfonating agent.

Specifically, (A) the amount of the sulfo groups introduced can be increased by contacting the sulfonating agent and urea and/or a derivative thereof at a predetermined ratio, and then performing the reaction. More specifically, as the urea functions as a catalyst, the reaction time can be reduced. (B) The urea also suppresses the decrease in fiber length due to the acid. That is, the decrease in fiber length due to the acid can be prevented (see FIG. 4), and (C) the coloring of fibers due to the acid can also be suppressed by the urea. The method is thus characterized by an effect of producing fibers with insignificant fiber coloring even though the fibers are treated with an acid (see Table 4). This effect was not obtained in the prior art method. In addition, the method also ensures an effect that (D) the obtained sulfonated pulp fibers can be adjusted to have the water retention value described above.

Furthermore, in the sulfonated pulp fiber production method, since urea and/or a derivative thereof is used as a reaction solution together with a sulfonating agent, water can be used as a solvent of the reaction solution.

When the fiber raw material is reacted with a sulfonating agent for esterification, an organic solvent such as DMF is usually used as the solvent of the reaction solution.

Water is an excellent solvent in terms of handling and cost; on the other hand, water is unsuitable for the esterification reaction using a sulfonating agent for the following reason. When the fiber raw material and the sulfonating agent are reacted in an aqueous solvent, the hydroxyl groups in the water become rich, so that the reactivity of the sulfonating agent with respect to the hydroxyl groups present on the surfaces of the fiber raw material decreases, thereby decreasing the reactivity of the sulfonating agent with the hydroxyl groups in the fiber raw material. That is, when the fiber raw material and the sulfonating agent are reacted in an aqueous solvent, there is a problem that the reaction efficiency of esterification decreases.

Further, the sulfonating agent more easily generates protons in an aqueous solvent. The generated protons cause a cleavage reaction of glycoside bond in the fiber raw material (for example, pulp fiber), thereby decreasing the fiber length of the fiber raw material.

Further, there also is a concern that the sulfonating agent itself reacts with water and is decomposed, which further decreases the reactivity.

Therefore, an organic solvent is generally used in the esterification reaction using a sulfonating agent. With the organic solvent, the reaction can be carried out in a state where the protons of the sulfonating agent are not easily dissociated. Therefore, by reacting the sulfonating agent and the fiber raw material in an organic solvent, the esterification reaction of the sulfonating agent and the fiber raw material can proceed more preferentially, compared with the case of using an aqueous solvent.

In addition, in contrast to the aqueous solvent, the sulfonating agent does not easily generate protons; therefore, the cleavage reaction of glycoside bond in the fiber raw material (for example, pulp fiber) does not easily occur. It is thus believed that the decrease in fiber length of the fiber raw material can be suppressed by using an organic solvent in the reaction.

However, in the sulfonated pulp fiber production method, the hydroxyl groups in the fiber raw material can be appropriately esterified by the sulfonating agent since this method uses, in addition to the sulfonating agent, urea and/or a derivative thereof, in the reaction solution with an aqueous solvent. This is presumably because the following reaction proceeds in the aqueous solvent.

When protons are generated in the sulfonating agent in an aqueous solvent, it is assumed that the protons are received by urea to form a kind of salt of sulfonating agent. Therefore, it is possible to suppress the cleavage reaction of the glycoside bond by the sulfonating agent in the aqueous solvent.

Moreover, the fibers of the fiber raw material are swollen by urea, so that the urea and the salt of the sulfonating agent are infiltrated into the inner portions of the fibers of the fiber raw material. Then, when the fibers are heated in the reaction step of the sulfonated pulp fiber production method, which is described later, esterification can proceed also inside the infiltrated fibers. Specifically, the esterification reaction can proceed not only with respect to the hydroxyl groups in the fibers on the surface of the fiber raw material but also with respect to the hydroxyl groups present inside the fibers. More specifically, since esterification with the sulfonating agent can be made even in the inner portion of the fiber raw material and on the surface of the microfibrils, it is possible to form fibers having a very small fiber width after the fibrillation treatment. Since the protons generated in the sulfonating agent are suppressed by urea as described above, it is possible to suppress the decrease in fiber length of the fiber raw material.

Therefore, after the fibrillation treatment, fibers having a long fiber length and a very small fiber width can be formed.

The fibers having a very small fiber width obtained after the fibrillation treatment correspond to the sulfonated fine cellulose. The coloring of the fibers can be represented by the whiteness of the fibers.

In the sulfonated pulp fiber production method, by controlling the water retention value of the sulfonated pulp fibers, further advantages in the production method can be obtained in addition to the advantages described above with regard to the water retention value of the sulfonated pulp fibers. This is more specifically described below.

When fine fibers such as nanofibers are produced by fibrillating fibers such as pulp using a fibrillation device or the like, fibrillation efficiency is important both economically and environmentally.

In general, a method of reducing the polymerization degree of the fibers before fibrillation (that is, reduce the fiber length of the fibers supplied to the fibrillation device or the like) so as to reduce the load on the fibrillation or the like upon the supply of fibers to a fibrillation device or the like is performed as a method of improving efficiency in the fibrillation step.

However, although the fibrillation efficiency can be improved, this prior art method has a problem that the average fiber length of the obtained fine fibers is short.

On the other hand, to increase the average fiber length of the obtained fine fibers, it is necessary to supply fibers in which a high polymerization degree of the fibers to be fibrillated is maintained (that is, the fibers to be supplied to the fibrillation device or the like have a long fiber length) to the fibrillation device or the like.

However, although this prior art method enables the fiber length of the fine fibers to increase to some extent, since these fibers have a significantly hard state (for example, a state in which the fine fibers constituting the fibers are strongly bonded to each other), easy production of fine fibers with a fibrillation device or the like cannot be attained.

Therefore, a large amount of energy (for example, when a high-pressure homogenizer is used, the pressure is set to 200 MPa or more) and a long period of time (for example, about 30 minutes when a shearing device (CLEARMIX, manufactured by M Technique Co., Ltd.) having a high-speed cutter is used) are required for fibrillation. This causes problems including a decrease in working efficiency as well as a significant decrease in fibrillation efficiency. In addition, there have been difficulties in obtaining fine fibers having a uniform fiber length.

In contrast, as described above, the sulfonated pulp fiber production method performs the preparation while adjusting the water retention value of the sulfonated pulp fibers to a predetermined level, the above-described problems of prior art can be solved.

Advantages of Increasing Water Retention Value

For example, by increasing the water retention value of the sulfonated pulp fibers produced by the sulfonated pulp fiber production method (e.g., the water retention value is increased to be more than 180%, more preferably 200% or more, further preferably 250% or more), as described above, the bonding strength between the fine fibers constituting the sulfonated pulp fibers can be weakened; as a result, the surface of the sulfonated pulp fibers and inner portions close to the surface are more easily fibrillated.

Consequently, the fibers constituting the sulfonated pulp fibers can easily come apart, and the energy required for the fibrillation treatment can be reduced. For example, when the fibrillation treatment is performed using a high-pressure homogenizer, the pressure thereof can be lowered or the number of times of treatment (the number of passes) can be reduced. Therefore, it is possible to reduce the energy, thereby reducing the environmental load.

In addition, since the fibrillation treatment can be smoothly performed, the time required for the fibrillation treatment can be reduced, thereby improving the productivity. In other words, since the productivity can be improved, the manufacturing costs (production costs) can be reduced as compared with the case of manufacturing of prior art techniques.

Advantages of Decreasing Water Retention Value

On the other hand, by decreasing the water retention value of the sulfonated pulp fibers produced by the sulfonated pulp fiber production method, the following advantages are obtained.

When the sulfonated pulp fibers are produced so that they have a low water retention value, the amount of water in the fibers can be reduced, and thus the dehydration property can be improved. In this case, since the dehydration becomes easy, sulfonated pulp fibers having a high solid concentration can be produced. This makes it possible to reduce the transportation cost in transporting the produced sulfonated pulp fibers.

In addition, when the production steps include a step of washing the sulfonated pulp fibers, dehydration after the washing step becomes easy; as a result, operability and workability can be improved. Therefore, when the sulfonated pulp fibers are produced for the above purpose, productivity can be improved. In other words, since the productivity can be improved, the manufacturing costs (production costs) can be reduced as compared with the case of manufacturing of prior art techniques.

As described above, by adjusting the water retention value of the produced sulfonated pulp fibers, the sulfonated pulp fiber production method enables production of sulfonated pulp fibers while appropriately adjusting the state of the sulfonated pulp fibers according to the demand from the buyer.

In summary, by using the sulfonated pulp fiber production method, sulfonated pulp fibers ensuring the effects (A) to (D) described above can be produced; and therefore, it becomes possible to produce sulfonated pulp fibers excellent in quality stability and handling property while ensuring a high recovery rate (for example, a recovery rate of 70% or more).

In addition, since high quality sulfonated pulp fibers can be stably produced, sulfonated pulp fibers suitable for intended use and applications can be efficiently produced. Further, the production costs can be reduced.

Hereinbelow, each step of the chemical treatment step is described in more detail.

Contact Step

The contact step in the chemical treatment step of the sulfonated pulp fiber production method is a step of bringing a cellulose-containing fiber raw material into contact with a sulfonating agent and urea and/or a derivative thereof. The contact step is not particularly limited insofar as the method is capable of causing the above contact.

For example, a method of impregnating the fiber raw material with a reaction solution in which a sulfonating agent and urea and/or a derivative thereof coexist by immersing the fiber raw material in the reaction solution, a method of applying the reaction solution onto the fiber raw material, or a method of applying a sulfonating agent and urea and/or a derivative thereof separately to the fiber raw material or impregnating the fiber raw material separately with a sulfonating agent and urea and/or a derivative thereof may be used.

Among these methods, the method of impregnating the fiber raw material with the reaction solution by immersing the fiber raw material in the reaction solution is preferable because this method enables the sulfonating agent and urea and/or a derivative thereof to be uniformly brought into contact with the fiber raw material.

Mixing Ratio of Reaction Solution

When the method of impregnating the fiber raw material with the reaction solution by immersing the fiber raw material in the reaction solution is employed, the mixing ratio of the sulfonating agent and urea and/or a derivative thereof contained in the reaction solution is not particularly limited.

For example, it is possible to adjust the amounts of the sulfonating agent and urea and/or a derivative thereof to have a concentration ratio (g/L) of 4:1 (1:0.25), 2:1 (1:0.5), 1:1, or 1:2.5.

By dissolving the sulfonating agent and urea in water so that their concentrations are adjusted to 200 g/L and 100 g/L, respectively, a reaction solution containing a sulfonating agent and urea at a concentration ratio (g/L) of 2:1 can be prepared. In other words, by adjusting the amount of urea to 50 parts by weight with respect to 100 parts by weight of sulfamic acid, a reaction solution containing a sulfonating agent and urea at a proportion of 2:1 can be prepared.

Further, by dissolving the sulfonating agent and urea in water so that their concentrations are adjusted to 200 g/L and 500 g/L, respectively, a reaction solution containing a sulfonating agent and urea at a concentration ratio (g/L) of 1:2.5 can be prepared.

Contact Amount of Reaction Solution

The amount of the reaction solution to be brought into contact with the fiber raw material is also not particularly limited.

For example, the amount may be adjusted so that the amount of the sulfonating agent contained in the reaction solution is 1 parts by weight to 20,000 parts by weight with respect to 100 parts by dry weight of the fiber raw material, and the amount of the urea and/or the derivative thereof contained in the reaction solution is 1 parts by weight to 100,000 parts by weight with respect to 100 parts by dry weight of the fiber raw material, in a state in which the reaction solution and the fiber raw material are in contact with each other.

The water retention value can be determined by a general test method described above (for example, a method according to JAPAN TAPPI paper pulp test No. 26:2000).

Reaction Step

The reaction step in the chemical treatment step of the sulfonated pulp fiber production method is a step of substituting the hydroxyl groups of the cellulose fibers contained in the fiber raw material with the sulfo groups of the contacted sulfonating agent as described above so as to introduce the sulfo groups into the cellulose fibers contained in the fiber raw material.

This reaction step is not particularly limited insofar as the method can cause a sulfonation reaction that substitutes hydroxyl groups of the cellulose fibers with sulfo groups.

For example, by heating the fiber raw material impregnated with the reaction solution at a predetermined temperature, sulfo groups can be appropriately introduced into the cellulose fibers contained in the fiber raw material.

Specifically, by performing heating in the reaction step of the chemical treatment step of the sulfonated pulp fiber production method, the sulfonation reaction can proceed while supplying heat to the supplied fiber raw material. More specifically, by performing heating in the reaction step, the sulfonation reaction for introducing sulfo groups with respect to the hydroxyl groups of the cellulose fibers contained in the fiber raw material can be performed while drying the fiber raw material in which the reaction solution sink and/or adhered. In this case, since the amount of water in the sulfonation reaction (the amount of water in the reaction solution adhered to the fiber raw material or the like) can be reduced, the sulfonation reaction can be performed with less influence of the water (for example, reaction failure, hydrolysis, or the like).

Therefore, by performing the reaction of the reaction step while performing heating at a predetermined temperature, it is possible to improve the efficiency of the introduction of sulfo groups with respect to the hydroxyl groups of the cellulose fibers while suppressing damage to the cellulose fibers contained in the supplied fiber raw material. In addition, as described later, sulfo groups can be appropriately introduced with respect to predetermined hydroxyl groups of the cellulose fibers in a short time.

Reaction Temperature in Reaction Step

The reaction temperature in the reaction step is not particularly limited insofar as it enables sulfo groups to be introduced into the cellulose fibers constituting the fiber raw material while suppressing thermal decomposition or hydrolysis reaction of the fibers.

More specifically, any temperature to directly or indirectly heat the fiber raw material after the contact step while satisfying the above requirements can be used. Examples of the methods for such heating include, for example, those using a known dryer, a vacuum-dryer, a microwave heating apparatus, an autoclave, an infrared heating apparatus, a hot press method using a hot press machine (for example, AH 2003C manufactured by AS ONE Corporation), and the like.

In particular, since a gas may be generated in the reaction step, it is preferable to use a circulation air dryer.

The shape of the fiber raw material after the contact step is not particularly limited. However, the reaction can be easily and uniformly advanced by heating the fiber raw material, for example, in a sheet shape or in a relatively disaggregated state using the above-mentioned device or the like.

The reaction temperature in the reaction step is not particularly limited insofar as the above requirements are satisfied.

For example, the atmosphere temperature is preferably 250° C. or less, more preferably 200° C. or less, and further preferably 180° C. or less.

If the atmosphere temperature during the heating is higher than 250° C., thermal decomposition occurs as described above, or the discoloration of fibers is accelerated. On the other hand, if the reaction temperature is lower than 100° C., the reaction time tends to increase.

Therefore, in view of workability, the reaction temperature (specifically, the atmosphere temperature) during the heating is adjusted to not less than 100° C. and not more than 250° C., more preferably not less than 100° C. and not more than 200° C., and further preferably not less than 100° C. and not more than 180° C.

Reaction Time in Reaction Step

The heating time (i.e., the reaction time) when the heating method described above is used as the reaction step is not particularly limited insofar as sulfo groups can be appropriately introduced into the cellulose fiber as described above.

For example, the reaction time in the reaction step is adjusted to 1 minute or more if the reaction temperature is adjusted within the above range. More specifically, the reaction time is preferably 5 minutes or more, more preferably 10 minutes or more, and further preferably 20 minutes or more.

If the reaction time is less than 1 minute, it is assumed that the reaction to cause the substitution of the sulfo groups with respect to the hydroxyl groups of the cellulose fibers hardly proceeds. On the other hand, if the heating time is excessively long, improvement in the introduction amount of sulfo groups tends to be less significant.

More specifically, the reaction time in the reaction step is set so that a reaction solution is brought into contact with the fiber raw material and a part of the hydroxyl groups of the cellulose fibers in the fiber raw material can be substituted with sulfo groups. By reacting the sulfonated pulp fibers prepared through this reaction step with the reaction solution described above, the sulfonated pulp fibers maintain a high fiber length retention rate (%) before and after the reaction (see FIGS. 4 and 6).

Therefore, when the heating method described above is used as the reaction step, the reaction time is preferably, but not particularly limited to, not less than 5 minutes and not more than 300 minutes, and more preferably not less than 5 minutes and not more than 120 minutes in view of reaction time and operability.

Sulfonating Agent

The sulfonating agent in the reaction step is not particularly limited insofar as it is a compound having sulfo groups.

Examples thereof include sulfamic acid, sulfamic acid salts, and sulfuryl compounds with sulfonyl group having two oxygen atoms bonded to sulfur via a covalent bond. These compounds may be used alone or in combination of 2 or more as the sulfonating agent.

The sulfonating agent is not particularly limited insofar as it is a compound described above. However, it is preferable to use sulfamic acid in view of the handling property because sulfamic acid has a lower acidity than sulfuric acid or the like, ensures high sulfo group introduction efficiency, and is inexpensive and highly safe.

Urea and Derivatives Thereof

Among urea and its derivatives used in the reaction step, the derivative of urea is not particularly limited insofar as it is a compound containing urea.

Examples thereof include carboxylic acid amides, composite compounds of isocyanate and amine, and thiamides. The urea and a derivative thereof may be used individually or in combination of both. As the derivatives of urea, the compounds described above may be used individually or in combination of 2 or more kinds.

The urea and the derivative thereof are not particularly limited insofar as they are compounds described above. However, it is preferable to use urea in view of the handling property as urea is inexpensive, has low influence of environmental burden, and ensures high safety.

Fiber Raw Material

The fiber raw material used in the sulfonated pulp fiber production method is not particularly limited insofar as it contains cellulose.

For example, wood-based pulp (hereinafter simply referred to as wooden pulp), dissolving pulp, cotton-based pulp such as cotton linter, wheat straw, bagasse, paper mulberry, paper birch, hemp, kenaf, non-wood-based pulp such as fruit-based pulp, cellulose isolated from ascidian or seaweed, and waste-paper-based pulp produced from waste newspapers, waste magazines, or waste cardboards can be used as the fiber raw material. In view of availability, wooden pulp is preferably used.

There are various kinds of wooden pulp. However, there is no particular limitation of use. Examples thereof include paper-making pulps such as Needle Bleached Kraft Pulp (NBKP), Leaf Bleached Kraft Pulp (LBKP), thermomechanical pulp (TMP), and the like.

When the pulps described above are used as the fiber raw material, the pulps described above may be used individually or in combination of 2 or more kinds.

The Drying Step

The chemical treatment step of the sulfonated pulp fiber production method may include the drying step between the contact step and the reaction step.

This drying step functions as a pretreatment step before the reaction step, and performs drying so that the moisture content of the fiber raw material after the contact step is in an equilibrium state. The fiber raw material after the contact step may be supplied to the reaction step and heated in a wet state. However, there is a concern that a part of sulfamic acid, urea, or the like is subjected to hydrolysis, which results in decrease in reaction efficiency. Moreover, a reaction not desired in the preparation of pulps subjected to fibrillation may occur.

Therefore, to allow the sulfonation reaction in the reaction step to appropriately proceed, it is preferable to perform the drying step before the reaction step. More specifically, by performing the drying step before the reaction step, the reaction time of the esterification reaction can be reduced and the operability can be improved in the next reaction step. In other words, the purpose of this drying step is to accelerate the esterification reaction between the hydroxyl groups in the fiber raw material and sulfamic acid in the next reaction step by increasing the concentration of sulfamic acid after appropriately removing the moisture in the reaction solution adhering to the fiber raw material after the contact step.

The equilibrium state refers to a state in which the moisture content of the fiber raw material after the contact step is 15% or less.

The drying step is a step of removing the solvent of the reaction solution to some extent by drying the fiber raw material in a state of being in contact with the reaction solution at a temperature lower than the reaction temperature in the reaction step.

For example, if the solvent is water, it is preferable to remove the solvent, i.e., perform drying until the moisture content calculated by the following formula becomes 15% or less, more preferably 10% or less, and further preferably 5% or less. The equilibrium state in the examples refers to this state after drying.

Moisture content (%)=100−(pulp weight (g) after drying)/(pulp weight (g) before drying)×100

The devices and the like used in the drying step are not particularly limited, and a dryer or the like used in the above-described reaction step can be used.

The drying temperature in this drying step is not particularly limited. For example, the reaction temperature is preferably 100° C. or less, more preferably not less than 20° C. and not more than 100° C., further preferably not less than 50° C. and not more than 100° C. If the atmosphere temperature during the heating exceeds 100° C., the sulfonating agent and the like may be decomposed. On the other hand, if the atmosphere temperature during the heating is less than 20° C., the drying time increases.

Therefore, in order to appropriately perform the above-described reaction, the atmosphere temperature during the heating is preferably 100° C. or less, and in view of operability, the atmosphere temperature during the heating is preferably 20° C. or more.

Washing Step

The sulfonated pulp fiber production method may include, after the reaction step in the chemical treatment step, a washing step for washing the fiber raw material in which sulfo groups are introduced.

The surface of the fiber raw material after the introduction of sulfo groups is acidic by the influence of the sulfonating agent. In addition, an unreacted reaction solution is also present. Therefore, by performing a washing step which reliably terminates the reaction and removes the excess reaction solution to ensure a neutral state, the handling property can be improved.

The washing step is not particularly limited insofar as the fiber raw material after the introduction of sulfo groups can be substantially neutralized.

For example, a method of washing the fiber raw material obtained after the introduction of sulfo groups with pure water or the like until the fiber raw material becomes neutral can be employed.

Further, neutralization washing using an alkali or the like may also be performed. In the neutralization washing, examples of the alkali compound contained in the alkali solution include inorganic alkali compounds, organic alkali compounds and the like. Examples of inorganic alkali compound include hydroxides, carbonates, phosphates, and the like of alkali metals. Examples of organic alkali compound include ammonia, aliphatic amines, aromatic amines, aliphatic ammonium, aromatic ammonium, heterocyclic compounds, and hydroxides of heterocyclic compounds.

Method for Producing Sulfonated Fine Cellulose Fibers

As shown in FIG. 1, the sulfonated fine cellulose fibers are obtained by supplying the sulfonated pulp fibers, which are prepared by the sulfonated pulp fiber production method thus described above, to the fibrillation step of the sulfonated fine cellulose fiber production method and to thereby fibrillate the sulfonated pulp fibers.

Fibrillation Step

The fibrillation step in the sulfonated fine cellulose fiber production method is a step of fibrillating the sulfonated pulp fibers into fine fibers having a predetermined size (for example, nano-level size).

The processing device used in the fibrillation step is not particularly limited insofar as it has the above-described function.

Examples of processing device include, but not limited to, a low-pressure homogenizer, a high-pressure homogenizer, a grinder (stone mill type pulverizer), a ball mill, a cutter mill, a jet mill, a short-screw extruder, a twin-screw extruder, an ultrasonic stirrer, a household mixer, and the like.

Among these, it is preferable to use a high-pressure homogenizer, which is capable of uniformly applying a force to the material and is also capable of excellent homogenization; however, the processing device is not limited to high-pressure homogenizers.

When a high-pressure homogenizer is used in the fibrillation step, the sulfonated pulp fibers obtained by the above-described production method are supplied in a state of being dispersed in a water-soluble solvent, such as water. Hereinafter, the solution in which the sulfonated pulp fibers are dispersed is referred to as a slurry.

The solid concentration of the sulfonated pulp fibers in the slurry is not particularly limited. For example, a solution obtained by adjusting the solid concentration of the sulfonated pulp fibers in the slurry to 0.1% by mass to 20% by mass may be supplied to a treatment device, such as a high-pressure homogenizer.

For example, when a slurry in which the solid concentration of the sulfonated pulp fibers is adjusted to 0.5% by mass is supplied to a treatment device, such as a high-pressure homogenizer, a dispersion liquid in which the sulfonated fine cellulose fibers of the same solid concentration are dispersed in a water-soluble solvent can be obtained. That is, in this case, a dispersion liquid in which the solid concentration of the sulfonated fine cellulose fibers is adjusted to 0.5% by mass can be obtained.

Relationship between Fibrillation Treatment and Water Retention Value

The water retention value of the sulfonated pulp fibers supplied in the fibrillation step is not particularly limited insofar as the water retention value is adjusted to enable the sulfonated pulp fibers to be easily fibrillated by the above-described device or the like.

For example, in view of the efficiency of the fibrillation treatment and the reduction of energy consumption, it is preferable to use sulfonated pulp fibers prepared to have a high water retention value. From these viewpoints, the water retention value of the sulfonated pulp fibers is preferably adjusted to 150% or more. In particular, it is preferable to use sulfonated pulp fibers prepared to have a water retention value of more than 200%, more preferably 220% or more, further preferably 250%, further more preferably 300% or more, and still more preferably 500%. On the other hand, when the water retention value is higher than 10,000%, the recovery rate of the sulfonated pulp fibers after the sulfonation treatment tends to decrease.

Therefore, in view of the fibrillation efficiency as well as the recovery rate, the water retention value of the sulfonated pulp fibers when they are supplied to the fibrillation step is preferably 150% to 10,000%, more preferably 200% to 10,000%, further preferably 220% to 10,000%, further more preferably 250% to 5,000%, and even more preferably 250% to 2,000%.

When the sulfonated pulp fibers to be subjected to the fibrillation step have a high water retention value, the following advantages can also be obtained.

The higher the water retention value of the sulfonated pulp fibers to be subjected to the fibrillation step, fibers more easily come apart because the fibers are expanded.

Therefore, as described above, it is possible to obtain an advantage that it is possible not only to improve the fibrillation efficiency of the fibrillation device or the like used in the fibrillation step, but also to suppress problems including fiber clogging in the fibrillation device or the like. As a result, the pulp fibers can be smoothly fibrillated (fibrillated), and thus pulp fibers having a higher concentration can be processed by a fibrillation device or the like.

In addition, since a smooth fibrillation (fibrillation) can be performed, the time required for the fibrillation step can be further reduced. For example, in the case of using a fibrillation device, it is possible to perform the fibrillation with a small number of passes.

Heretofore, when a high-pressure homogenizer is used as a fibrillation device in a fibrillation treatment, there has been a problem that the processing capacity greatly decreases as the fibrillation pressure of the high-pressure homogenizer increases. For example, when a versatile device that performs a fibrillation treatment at a fibrillation pressure of 100 MPa or more is used to produce fibers having a desired size, the processing amount per hour is several 100 liters; that is, the production efficiency is very low. In contrast, when the fibrillation is performed at a fibrillation pressure of several 10 MPa, the processing amount becomes several 1000 liters per hour, which is significantly higher than the above case. However, since the fibrillation pressure is set to a low level in this case, there is a problem that the fibers cannot be fibrillated to a desired size. That is, heretofore, there has been a demand for pulp fibrillation that can be performed at a lower fibrillation pressure with smaller number of treatments.

With the sulfonated pulp fibers of the present embodiment, it is possible to improve the fibrillation property by adjusting the water retention value. Further, with the method for producing sulfonated pulp fibers of the present embodiment, sulfonated pulp fibers having excellent fibrillation property can be produced by adjusting the water retention value. They thus can appropriately solve the above-described problems in the fibrillation treatment.

Examples

It was confirmed that the sulfonated pulp fiber of the present invention and the derivative pulp of the present invention can be produced by using the method for producing sulfonated pulp fibers of the present invention, and that the sulfonated fine cellulose fibers of the present invention can be produced by using the method for producing sulfonated fine cellulose fibers of the present invention. Further, it was also confirmed that the prepared sulfonated pulp fibers of the present invention and the sulfonated fine cellulose fibers of the present invention had predetermined characteristics.

Experiment 1

In Experiment 1, Needle Bleached Kraft Pulp (NBKP) (average fiber length=2.6 mm) was used as a fiber raw material. Hereinbelow, NBKP used in the experiment is simply referred to as a pulp.

The pulp was washed with a large amount of pure water, the water was removed using a 200-mesh sieve, then the solid concentration was measured, and the pulp was subjected to the experiment without being dried.

Chemical Treatment Step

The pulp was added to a reaction solution prepared as follows and the mixture was stirred to form a slurry.

The step of adding the pulp to the reaction solution to form a slurry corresponds to the contact step in the chemical treatment step of the method for producing sulfonated pulp fibers of the present embodiment.

Preparation of Reaction Solution

The sulfonating agent and urea and/or a derivative thereof were prepared to have the following concentrations.

In Experiment 1, sulfamic acid (having a purity of 98.5%, manufactured by Fuso Chemical Co., Ltd.) was used as the sulfonating agent.

As urea or a derivative thereof, a urea solution (having a purity of 99%, manufactured by Wako Pure Chemical Industries, Ltd., Model No.: special grade reagent) was used.

They were mixed at a mixing ratio (a concentration ratio (g/L)) of 4:1 (1:0.25), 2:1 (1:0.5), 1:1, 1:2.5, thereby preparing an aqueous solution. More specifically, the sulfamic acid and the urea were mixed as follows.

Ratio of Sulfamic acid/Urea ((g/L)/(g/L))=200/50, 200/100, 200/200, 200/500, 50/25, 100/50, 200/100

An example of the preparation of the reaction solution is shown below. 100 ml of water was added to a container. Then, 20 g of sulfamic acid and 10 g of urea were added to the container to prepare a reaction solution having a ratio of sulfamic acid/urea ((g/L)/(g/L)) of 200/100 (1:0.5). More specifically, urea was added in an amount of 50 parts by weight with respect to 100 parts by weight of sulfamic acid.

2 g (dry weight) of pulp was added to the prepared reaction solution. For example, in the case of a reaction liquid having a sulfamic acid/urea ratio ((g/L)/(g/L)) of 200/100 (1:0.5), the sulfamic acid was adjusted to 1000 parts by weight with respect to 100 parts by weight of the pulp. Further, the urea was adjusted to 500 parts by weight.

As Comparative Examples A and A2, comparative samples in which the sulfamic acid concentration of reaction solution is adjusted to 200 g/L and urea is not added (sulfamic acid/urea ratio ((g/L)/(g/L))=200/0) were prepared. Comparative Examples A and A2 were treated in the same manner as in the other Experiment Examples, except that urea was not added.

As a blank pulp, NBKP that had not been brought into contact with the reaction solution was used.

A slurry prepared by adding pulp to the reaction solution was stirred for 10 minutes using a stirrer. After the stirring, the slurry was subjected to suction filtration using a filter paper (No. 2). The suction filtration was carried out until the solution stopped dripping.

After the suction filtration, the pulp was peeled off from the filter paper, and the filtered pulp was placed in a dryer (Model No.: VTR 115, manufactured by Isuzu Seisakusho) with a constant-temperature bath set to 50° C., and dried until the moisture content fell to an equilibrium state. That is, the pulp dried before the heating reaction was supplied to the next heating reaction step. Hereinafter, the condition in which the drying is performed is simply referred to as "condition with the drying step".

As a method for evaluating the equilibrium state of the moisture content, a method of calculating a moisture content using the following formula and determining a pulp having a moisture content of 15% or less to be in an equilibrium state was performed. In this experiment, the moisture content of the pulp after the drying step was 2 to 5%.

Moisture content (%)=100−(pulp weight (g) after drying)/(pulp weight (g) before drying)×100

The step of drying the filtered pulp corresponds to the drying step in the chemical treatment step of the method for producing sulfonated pulp fibers of the present embodiment.

Then, the dried pulp was heated by being subjected to a heating reaction in the next step.

In the heating reaction, a dryer (Model No.: VTR 115, manufactured by Isuzu Seisakusho) was used.

The reaction conditions in the heating reaction were as follows. Temperature of constant-temperature bath: 100° C., 120° C., 140° C. Heating time: 5 minutes, 25 minutes, 60 minutes, 120 minutes.

This heating reaction corresponds to the reaction step in the chemical treatment step of the method for producing sulfonated pulp fibers of the present embodiment. The temperature of the reaction condition in the heating reaction corresponds to the reaction temperature in the reaction step in the chemical treatment step of the method for producing sulfonated pulp fibers of the present embodiment, and the heating time of the reaction condition in the heating reaction corresponds to the reaction time in the reaction step in the chemical treatment step of the method for producing sulfonated pulp fibers of the present embodiment.

After the heating reaction, the reacted pulp was washed with pure water until it became neutral, thereby preparing a sulfamic acid/urea-treated pulp.

The step of washing the reacted pulp with pure water until it becomes neutral corresponds to the washing step in the chemical treatment step of the method for producing sulfonated pulp fibers of the present embodiment.

The sulfamic acid/urea-treated pulp thus prepared corresponds to the derivative pulp of the present embodiment, and the reacted pulp fibers constituting the sulfamic acid/urea-treated pulp correspond to the sulfonated pulp fibers of the present embodiment. More specifically, the sulfamic acid/urea-treated pulp corresponding to the derivative pulp of the present embodiment is an aggregate of only sulfamic acid/urea-treated pulp fibers, which are reacted pulp fibers corresponding to the sulfonated pulp fibers of the present embodiment.

When the drying step was omitted, the pulp was removed from the filter paper after the suction filtration, and then was directly subjected to the heating reaction. That is, the pulp was not subjected to the above-described drying before the heating reaction and was directly supplied to the heating reaction of the next step. The reaction conditions in the heating reaction in the next step were the same as those described above. Hereinafter, the condition in which the drying is not performed is simply referred to as "condition without the drying step".

Fibrillation Step

Subsequently, the sulfamic acid/urea-treated pulp thus prepared was subjected to nanosizing (fibrillation) using a high-pressure homogenizer (Model No.: Panda Plus 200, manufactured by GEA Niro Soavi), thereby preparing nanocellulose.

The treatment conditions of the high-pressure homogenizer were as follows.

The solid concentration of the sulfamic acid/urea-treated pulp in the slurry supplied to the high-pressure homogenizer was adjusted to 0.5% by mass. The fibrillation pressure of the high-pressure homogenizers was 120 to 140 MPa.

Each sulfamic acid/urea-treated pulp was treated with a high-pressure homogenizer with 3 times (3 passes) of fibrillation to prepare nanocellulose fibers.

The fibrillation operation using the high-pressure homogenizer corresponds to the fibrillation step in the method for producing sulfonated fine cellulose fibers of the present embodiment. The prepared nanocellulose fibers corresponds to the sulfonated fine cellulose fibers of the present embodiment.

Yield of Pulp

The yield of pulp before and after the chemical treatment was determined from the following equation.

After the chemical treatment, the pulp was collected using a 300-mesh wire.

Yield=solids content weight of pulp collected after the chemical treatment step/solids content weight of pulp supplied before the chemical treatment step Elemental Analysis (Sulfur)

The sulfur content in the pulp after the chemical treatment was determined by combustion-ion chromatography. The measurement was performed in accordance with the measurement conditions of IEC 62321.

Combustion device: Model No. AQF-2100 H, manufactured by Mitsubishi Chemical Analytech Ion chromatography: Model No. ICS-1600, manufactured by Thermo Fisher Scientific Measurement of Water Retention Value The water retention value of the fibers after the chemical treatment was measured in accordance with TAPPI No. 26 as follows.

The water retention value is a value obtained by dehydrating a pulp slurry as a measurement target in a container called a centrifugal cup, placing the container containing the pulp slurry in a centrifugal sedimentation tube, followed by centrifugation at a centrifugal force of 3000 G for 15 minutes, and measuring the amount of water remaining in the pulp as a ratio with respect to the weight of the sample after drying.

In this experiment, a polyvinyl chloride tube cup with 300 mesh wire (outer diameter: 3.4 cm, inner diameter: 2.6 cm, height: 7.5 cm; the mesh is attached to the inside of the cup to the height of 1.8 cm from the bottom) was used as the centrifugal cup. The centrifugal treatment was performed using a KUBOTA KR/702 centrifugal separator manufactured by Kubota Corporation.

First, the washed pulp obtained after the sulfonation treatment (sulfamic acid/urea-treated pulp) is dehydrated using a 300-mesh wire mesh sieve until the solid concentration of the pulp fell to the range of 1 to 10%; then, pulp solid content of 0.5 g was weighed and obtained. The pulp obtained was placed in a centrifugal cup, followed by suction filtration, and the suction was stopped when the moisture disappeared from the pulp surface. Thereafter, the pulp was subjected to centrifugal dehydration (3000 G, 15 minutes), and the water retention value was calculated from the ratio of the wet pulp weight on the mesh in the centrifugal cup with respect to the pulp weight after drying using the following equation. The centrifugation was performed at an internal temperature of 20° C.±5° C.

Water retention value (%)=100×(wet pulp weight (g) after centrifugation−dry pulp weight (g))/dry pulp weight (g)

Observation of Fiber Form Using FE-SEM

The surface of the pulp obtained after the chemical treatment was observed with an FE-SEM (manufactured by JEOL Ltd., Model No.: JSM-7610). The sample to be observed was prepared by replacing the solvent of the fine fiber dispersion liquid with t-butyl alcohol, freeze-drying the dispersion liquid, and coating it with osmium.

Measurement of Fiber Orientation

The FE-SEM image of the pulp was analyzed to evaluate the fiber orientation.

FiberOri8s03 was used as image analysis software. The software is also used to scientifically evaluate the fiber orientation on the paper surface.

Measurement of Whiteness

The whiteness was measured in accordance with JIS P 8148:2001 (paper, board, and pulps—ISO brightness (Diffuse Blue Reflectance Factor).

The sample used for the measurement was obtained by washing the pulp obtained after the chemical treatment with water and freeze-drying the washed pulp.

The whiteness was measured by placing the prepared sample pulp in an ISO whiteness meter (PF-10, manufactured by Nippon Denshoku Industries Co., Ltd.).

Observation of Fiber Form and Measurement of Fiber Width Using SPM

The nanocellulose fibers obtained after the high-pressure homogenizer treatment were adjusted to have a solid concentration of 0.001 to 0.005% by mass using pure water, followed by spin-coating onto a silica substrate coated with PEI (polyethyleneimine).

The nanocellulose fibers on the silica substrate were observed using a scanning probe microscope (manufactured by Shimadzu Corporation, Model No.: SPM-9700).

The fiber width was measured by randomly selecting 20 fibers in the observation image.

Measurement of Haze Value and Measurement of Total Light Transmittance

The measurement of haze value and the measurement of total light transmittance were performed using a measurement solution, which was prepared by adjusting the solid concentration of nanocellulose fibers to 0.5% by mass with pure water.

If the solid concentration of the sulfamic acid/urea-treated pulp (the solids content of treated pulp) in the slurry supplied to the high-pressure homogenizer is adjusted to 0.5% by mass in the fibrillation step, the solid concentration of the nanocellulose fibers in the dispersion liquid obtained after the fibrillation step is also 0.5% by mass. Therefore, this dispersion liquid was not adjusted and used directly for the measurement with the solid concentration of the nanocellulose fiber of 0.5% by mass.

A predetermined amount was separated from the prepared measurement solution, and an integrating sphere (ISN-470, manufactured by JASCO Corporation) was attached to a spectrophotometer (Model No.: V-570 manufactured by JASCO Corporation) to measure the haze value and the total light transmittance as follows. The measurement was performed in accordance with the method of JIS K 7105.

A quartz cell containing pure water was used as a blank measurement value, and the light transmittance of a nanocellulose dispersion liquid of 0.5% by mass was measured. The measurement wavelength range was 380 to 780 nm.

The total light transmittance (%) and the haze value (%) were calculated from the numerical values obtained by the spectrophotometer using the bundled calculation software.

The measurement solution supplied to the spectrophotometer corresponds to the dispersion liquid in the method for producing a sulfonated fine cellulose fiber of the present embodiment.

Measurement of Polymerization Degree

The limiting viscosity (intrinsic viscosity) of the nanocellulose fibers was measured in accordance with JIS P 8215 (1998). Then, the polymerization degree (DP) of the nanocellulose fiber was calculated from each intrinsic viscosity ($\eta$) according to the following equation. Since the polymerization degree is an average polymerization degree measured by a viscosity method, it may be referred to as "viscosity average polymerization degree".

$$DP = 1.75 \times [\eta]$$

Results of Experiment 1

Experimental Results for Sulfamic Acid/Urea-Treated Pulp

Tables 1 and 2 are characteristic tables showing characteristics of sulfamic acid/urea-treated pulp fibers.

TABLE 1

Characteristics of Sulfamic Acid/Urea-treated Pulp Fibers Condition with Drying Step

| | Treatment Time (minutes) | Treatment Temperature (°C.) | Chemicals | Amount of Sulfur Introduced (mmol/g) | Yield (%) | Pulp Fiber Length After Chemical Treatment (mm) | Fiber Length Retention Rate Before and After Chemical Treatment (%) |
|---|---|---|---|---|---|---|---|
| NBKP | — | — | — | 0.01 | — | 2.6 | 100 |
| Influence of Treatment Time | 5 | 100 | Sulfamic Acid/Urea (200 g/L)/(100 g/L) | 0.15 | 100 | 2.6 | 100 |
| | | 120 | | 0.18 | 98.3 | 2.6 | 100 |
| | | 140 | | 0.26 | 88.8 | 2.7 | 104 |
| Influence of Temperature | 25 | 100 | | 0.44 | 100 | 2.7 | 104 |
| | | 120 | | 0.84 | 90.8 | 2.4 | 92.3 |
| | | 140 | | 0.77 | 86.9 | 2.0 | 76.9 |
| | 60 | 100 | | 0.70 | 91.7 | 2.7 | 104 |
| | | 120 | | 0.97 | 84.6 | 2.1 | 80.8 |
| | | 140 | | 0.86 | 79.6 | 1.9 | 73.1 |
| | 120 | 100 | | 0.70 | 92.9 | 2.4 | 92.3 |
| | | 120 | | 1.08 | 83.8 | 1.9 | 73.1 |
| | | 140 | | 0.78 | 81.3 | 1.9 | 73.1 |
| Comparative Example A | 25 | 120 | Sulfamic Acid (200 g/L) | 0.42 | 90.8 | 0.9 | 34.6 |

| | Treatment Time (minutes) | Treatment Temperature (°C.) | Ratio of Sulfamic acid/Urea | Amount of Sulfur Introduced (mmol/g) | Yield (%) | Pulp Fiber Length After Chemical Treatment (mm) | Fiber Length Retention Rate Before and After Chemical Treatment (%) | Water Retention Value of Pulp After Chemical Treatment (%) |
|---|---|---|---|---|---|---|---|---|
| NBKP | — | — | — | 0.01 | — | 2.6 | 100 | 110 |
| Comparative Example A | 25 | 120 | (200 g/L)/(0 g/L) | 0.42 | 90.8 | 0.9 | 34.6 | 180 |

TABLE 1-continued

Characteristics of Sulfamic Acid/Urea-treated Pulp Fibers Condition with Drying Step

| | | | | | | | | |
|---|---|---|---|---|---|---|---|---|
| Influence of Reagent Mixing Ratio | 25 | 120 | (200 g/L)/(50 g/L) | 0.56 | 92.4 | 2.5 | 96.2 | 980 |
| | | | (200 g/L)/(100 g/L) | 0.84 | 90.8 | 2.4 | 92.3 | 1920 |
| | | | (200 g/L)/(200 g/L) | 0.97 | 100 | 2.4 | 92.3 | 1120 |
| | | | (200 g/L)/(500 g/L) | 0.65 | 98.8 | 2.6 | 100 | 250 |

TABLE 2

Characteristics of Sulfamic Acid/Urea-treated Pulp Fibers Condition without Drying Step

| | Treatment Time (minutes) | Treatment Temperature (° C.) | Ratio of Sulfamic acid/Urea | Yield (%) | Water Retention Value of Pulp After Chemical Treatment (%) |
|---|---|---|---|---|---|
| NBKP | — | — | — | — | 110 |
| Comparative Example A | 25 | 120 | (200 g/L)/(0 g/L) | | 150 |
| Influence of Reagent Mixing Ratio | 25 | 120 | (200 g/L)/(50 g/L) | 97.0 | 510 |
| | | | (200 g/L)/(100 g/L) | 100 | 620 |
| | | | (200 g/L)/(200 g/L) | 100 | 350 |
| | | | (200 g/L)/(500 g/L) | 100 | 290 |
| | 120 | 120 | (200 g/L)/(100 g/L) | 84.3 | 4600 |
| | | 140 | | 82.4 | 3650 |

Table 1 is a characteristic table of the sulfamic acid/urea-treated pulp fibers under the condition in which drying was performed before the heating reaction (condition with the drying step). Table 2 is a characteristic table of the sulfamic acid/urea-treated pulp fibers under the condition in which drying was not performed before the heating reaction (condition without the drying step).

FIGS. 2 to 6 specifically show characteristics of sulfamic acid/urea-treated pulp fibers.

FIG. 2 is a graph showing the relationship between the amount of sulfur introduced (mmol/g) and the water retention value (%) of sulfamic acid/urea-treated pulp fibers obtained under the condition with the drying step and the ratio of sulfamic acid/urea ((g/L)/(g/L)) of the reaction solution.

FIG. 3 is a graph showing the relationship between the ratio of sulfamic acid/urea ((g/L)/(g/L)) of the reaction solution and the water retention value (%) of the sulfamic acid/urea-treated pulp fibers obtained under the condition without the drying step.

FIG. 4 (A) is a graph showing the relationship between the ratio of sulfamic acid/urea ((g/L)/(g/L)) of the reaction solution and the pulp fiber length (mm) of the sulfamic acid/urea-treated pulp fibers obtained under the condition with the drying step, and FIG. 4 (B) is a graph showing the relationship between the ratio of sulfamic acid/urea ((g/L)/(g/L)) of the reaction solution and the fiber length retention rate (%) of the sulfamic acid/urea-treated pulp fibers before and after the chemical treatment obtained under the condition with the drying step.

Figure 5:
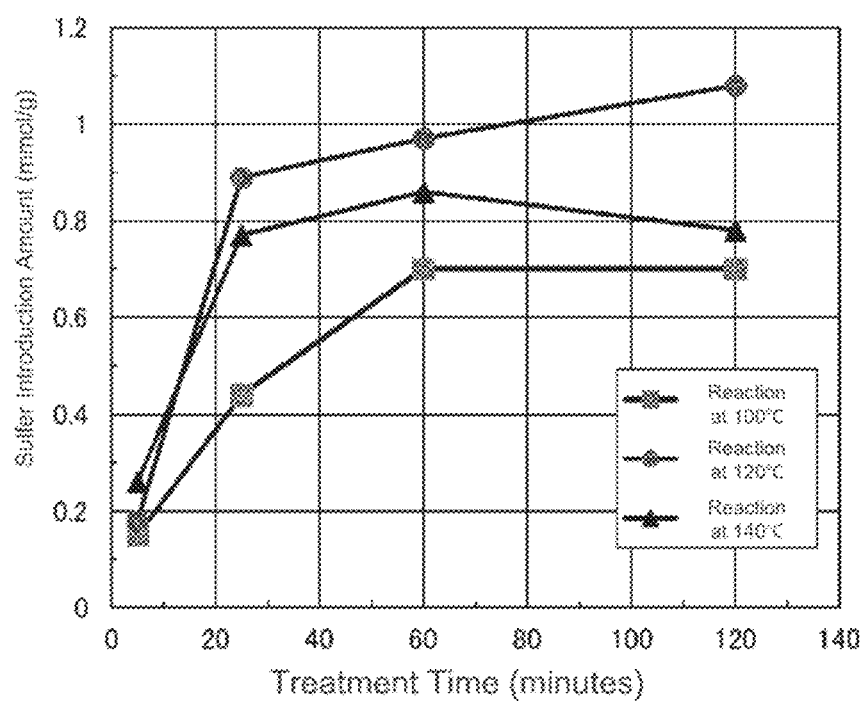
FIG. 5 is a graph showing experimental results with regard to reaction conditions (temperature and time).

FIG. 5 is a graph showing the relationship between the amount of sulfur introduced (mmol/g) and the reaction temperature of sulfamic acid/urea-treated pulp fibers obtained under the condition with the drying step.

Figure 6:
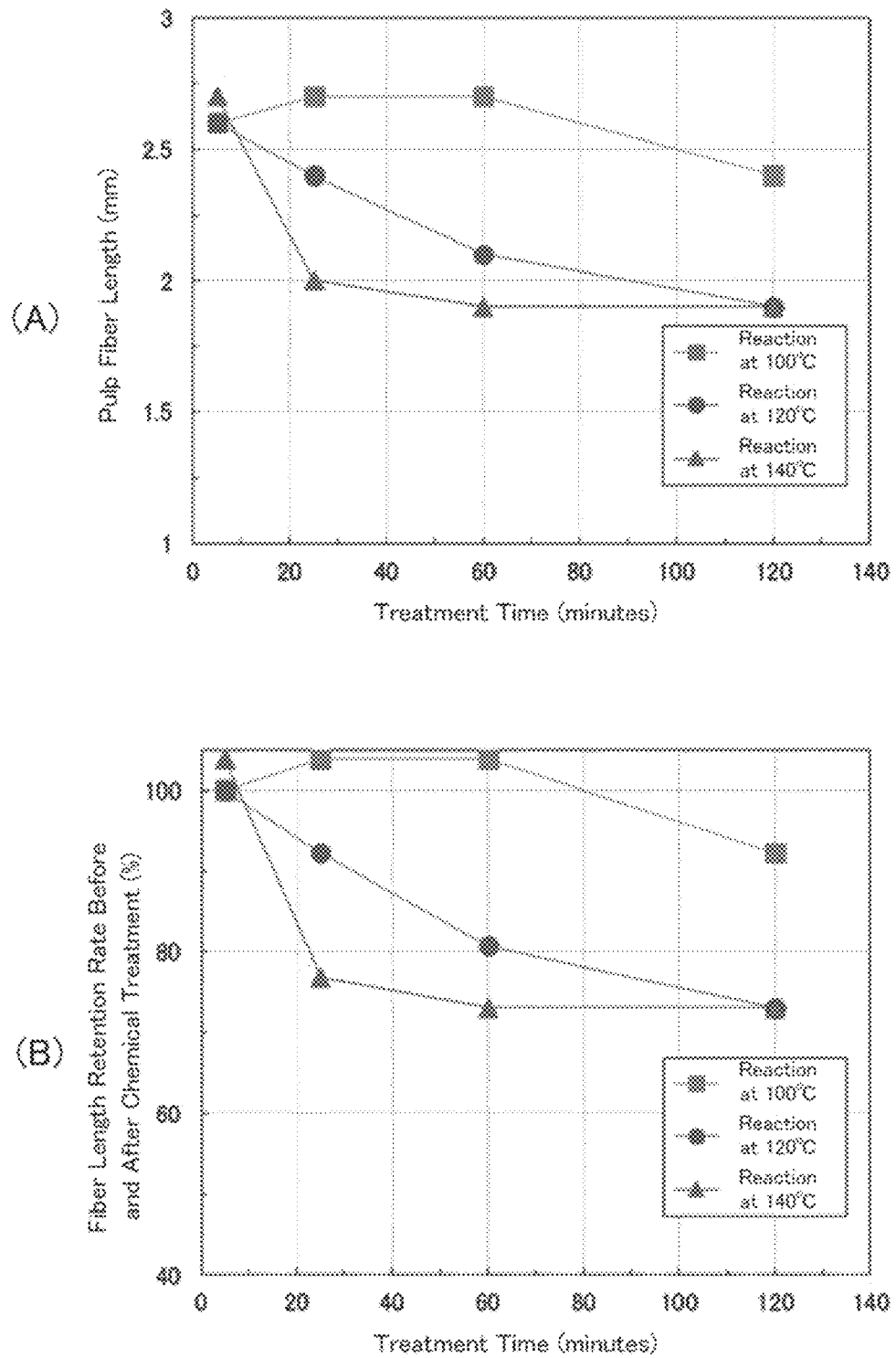
FIG. 6 is a graph showing experimental results with regard to reaction conditions (temperature and time).

FIG. 6 (A) is a graph showing the relationship between the fiber length (mm), the reaction temperature, and the treatment time of the sulfamic acid/urea-treated pulp fibers obtained under the condition with the drying step, and FIG. 6 (B) is a graph showing the relationship between the fiber length retention rate (%), the reaction temperature, and the treatment time of the sulfamic acid/urea-treated pulp fibers obtained under the condition with the drying step before and after the chemical treatment.

With the experimental results, it was confirmed that sulfamic acid/urea-treated pulp fibers (for example, see FIG. 2) in which the sulfur introduction amount (mmol/g) is adjusted to 0.56 mmol/g to 0.97 mmol/g can be prepared by adjusting the proportion of urea in the concentration ratio of sulfamic acid and urea.

As shown in FIG. 2 or 3, it was confirmed that sulfamic acid/urea-treated pulp fibers in which a water retention value is controlled within the range of 250% to 4600% can be prepared by adjusting the proportion of urea in the concentration ratio of sulfamic acid and urea. That is, it was confirmed that sulfamic acid/urea-treated pulp fibers in which the sulfur introduction amount and the water retention value are controlled can be prepared by adjusting the concentration ratio of sulfamic acid and urea.

FIGS. 2 and 3 also infer that the sulfur introduction amount and the water retention value of the sulfamic acid/urea-treated pulp fibers had similar tendencies, and that, therefore, they are somehow related.

As shown in FIG. 4, it was confirmed that sulfamic acid/urea-treated pulp fibers having a fiber length longer than that of Comparative Example A in which urea was not added were prepared. That is, it was confirmed that sulfamic acid/urea-treated pulp fibers were prepared while preventing a decrease in fiber length by sulfamic acid by adding urea in the production step.

Moreover, it was confirmed that sulfamic acid/urea-treated pulp fibers in which the fiber length was substantially retained even after the reaction compared with the fiber length before the reaction were prepared.

As shown in FIGS. 5 and 6, it was confirmed that sulfamic acid/urea-treated pulp fibers having a controlled sulfur introduction amount and fiber length were prepared by adjusting the reaction temperature and the heating time.

As shown in FIG. 5, it was confirmed that the sulfur introduction amount of the sulfamic acid/urea-treated pulp fiber of 0.5 mmol/g or more can be achieved by a reaction of 15 minutes or more under 120° C. or 140° C., and that, if the reaction is performed under 100° C., i.e., a temperature lower than these, the reaction time of 35 minutes or more is necessary.

Furthermore, as shown in FIG. 6, it was also confirmed that, to increase the fiber length of the sulfamic acid/urea-treated pulp fibers, a low temperature condition is preferable.

FIG. 7 is a surface-enlarged image (50,000-fold magnification) of the sulfamic acid/urea-treated pulp fiber (the drying step was performed, reaction temperature=120° C., reaction time=25 minutes).

FIGS. 7(A) to 7(D) are surface-enlarged images of the samples in which the ratios of sulfamic acid/urea are 200/50 (1:0.25), 200/100 (1:0.5), 200/200 (1:1), and 200/500 (1:2.5), respectively.

FIG. 7(E) is a surface-enlarged image of NBKP shown as a comparative example.

The sulfur introduction amounts of the sulfamic acid/urea-treated pulp fibers shown in FIGS. 7(A) to 7(D) were (A) 0.56 mmol/g, (B) 0.84 mmol/g, (C) 0.97 mmol/g, and (D) 0.65 mmol/g, respectively.

The water retention value of the sulfamic acid/urea-treated pulp fibers shown in FIGS. 7 (A) to (D) were (A) 980%, (B) 1920%, (C) 1120%, and (D) 250%, respectively.

Figure 8:
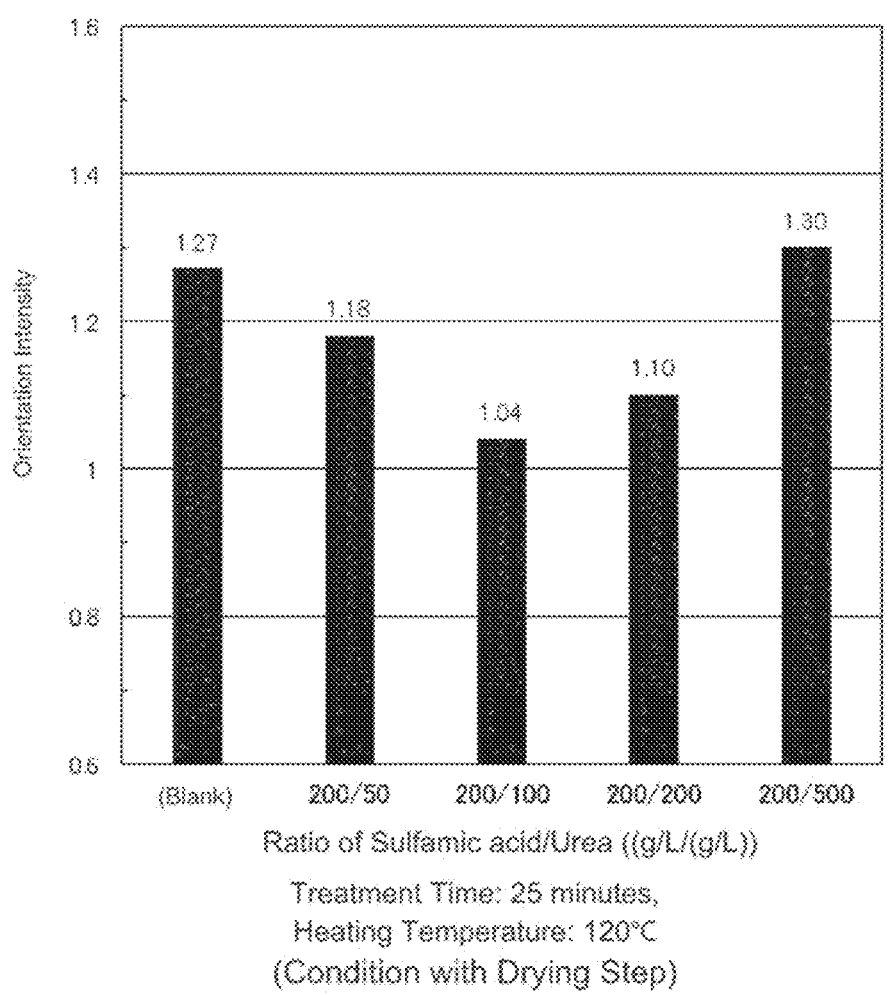
FIG. 8 is a graph showing experimental results with regard to the orientation intensity of sulfamic acid/urea-treated pulp fiber, which corresponds to the sulfonated pulp fiber of the present embodiment.

Table 3 and FIGS. 8 and 9 show the relationship between the sulfamic acid/urea-treated pulp fibers and the degree of orientation of the surface fibers.

Table 3 shows the relationship between the sulfamic acid/urea-treated pulp fibers and the degree of orientation of the surface fibers, and FIG. 8 is a graph showing the relationship between sulfamic acid/urea and the degree of orientation of the surface fibers of the sulfamic acid/urea-treated pulp fibers.

With these experimental results, it was confirmed that sulfamic acid/urea-treated pulp fibers with the surface fibers having a random orientation state were prepared by lowering the proportion of urea in the concentration ratio of sulfamic acid and urea in the reaction liquid. It was also confirmed that, conversely, sulfamic acid/urea-treated pulp fibers with the surface fibers having a uniform orientation state were prepared by increasing the proportion of urea. More specifically, it was confirmed that sulfamic acid/urea-treated pulp fibers with controlled fiber orientation on the surface were prepared by adjusting the concentration ratio of sulfamic acid and urea.

Furthermore, it was confirmed from the experimental results that the degree of orientation of the surface fibers of the sulfamic acid/urea-treated pulp fibers can be used as an indicator of the degree of fibrillation of the sulfamic acid/urea-treated pulp fibers. In addition, it was confirmed that, since the degree of orientation and the water retention value had a specific tendency at a sulfamic acid/urea ratio of around 200/100 (for example, see FIGS. 2 and 8), the fibrillation of the sulfamic acid/urea treated pulp fibers can be controlled by adjusting the water retention value.

Figure 10:
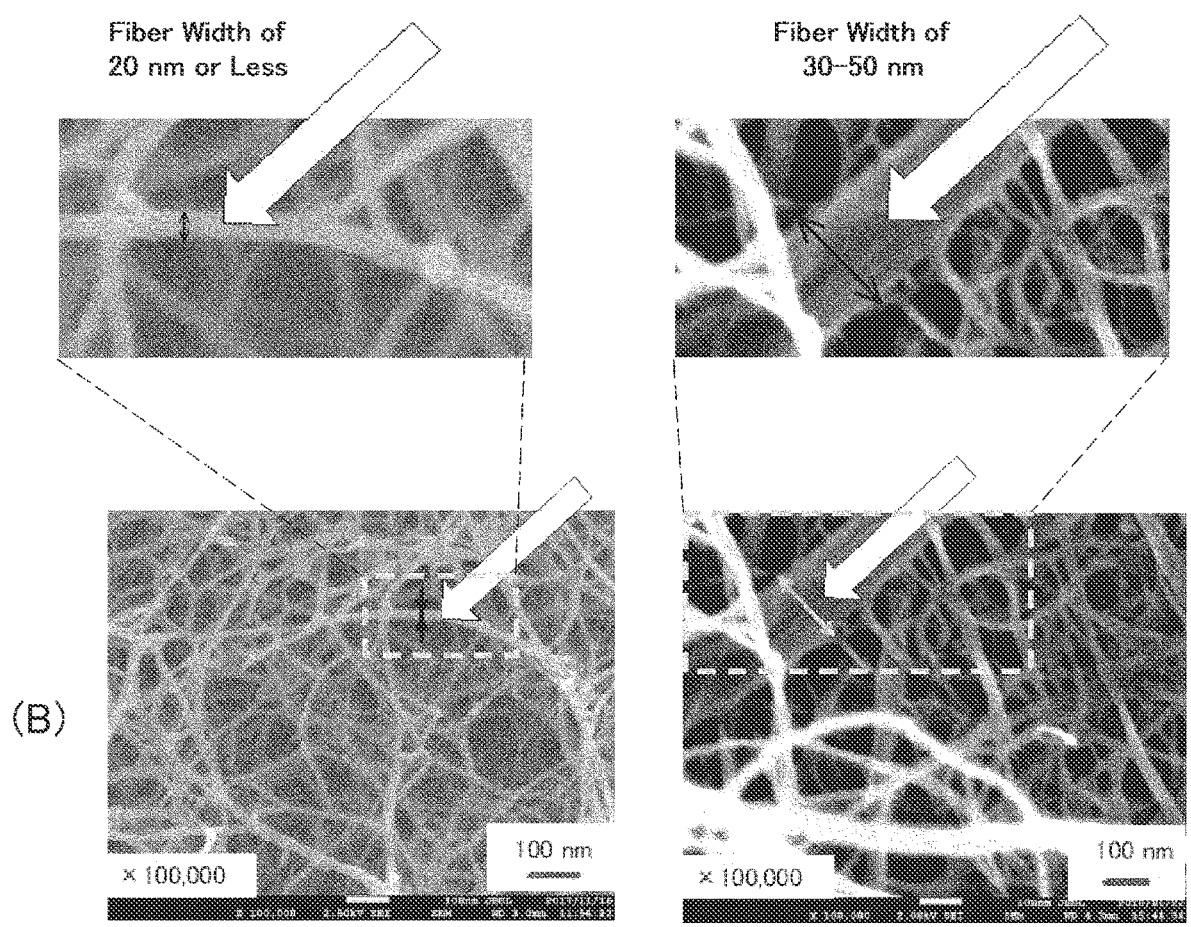
FIG. 10 is a diagram showing experimental results, showing a fibrillation state.

FIG. 10 is a diagram by which the ease of fibrillation treatment of sulfamic acid/urea-treated pulp fibers can be confirmed.

It was confirmed that sulfamic acid/urea-treated pulp fibers having an average fiber width of 20 nm or less were obtained by 3 times (3 passes) of fibrillation. On the other hand, fine fibers not subjected to a chemical treatment (i.e., blank pulp NBKP) had an average fiber width of 30 nm to 50 nm even after 20 times (20 passes) of fibrillation, and fine fibers having an average fiber width of 20 nm or less could not be obtained.

TABLE 3

|  | Treatment Time (minutes) | Treatment Temperature (° C.) | Ratio of Sulfamic acid/Urea | Water Retention Value of Pulp After Chemical Treatment (%) | Orientation Intensity |
|---|---|---|---|---|---|
| NBKP | — | — | — | 110 | 1.27 |
| Influence of Reagent Mixing Ratio | 25 | 120 | (200 g/L)/(50 g/L) | 980 | 1.18 |
|  |  |  | (200 g/L)/(100 g/L) | 1920 | 1.04 |
|  |  |  | (200 g/L)/(200 g/L) | 1120 | 1.10 |
|  |  |  | (200 g/L)/(500 g/L) | 250 | 1.30 |

FIG. 9 is a surface-enlarged image (100,000-fold magnification) of the sulfamic acid/urea-treated pulp fiber (the drying step was performed, reaction temperature=120° C., reaction time=25 minutes).

FIGS. 9(A) to (D) are surface-enlarged images of the samples in which the ratios of sulfamic acid/urea are 200/50 (1:0.25), 200/100 (1:0.5), 200/200 (1:1), and 200/500 (1:2.5), respectively.

FIG. 9(E) is a surface-enlarged image of NBKP shown as a comparative example.

The degrees of orientation of the sulfamic acid/urea-treated pulp fibers shown in FIGS. 9(A) to 9(D) were (A) 1.18, (B) 1.04, (C) 1.10, and (D) 1.30, respectively.

In this measurement method, it was determined that a degree of orientation (orientation strength) of 1.1 or less indicates absence of orientation, 1.1 to 1.2 indicates slight orientation, and 1.2 or more indicates significant orientation.

FIG. 10 is an image showing the state of measurement of fiber width in an observation image obtained by observing the fine fibers after the fibrillation with FE-SEM. The measurement of fiber width was performed using an image magnified 100,000-fold. The measurement of fiber width in an image (for example, the fiber width indicated by a white arrow in FIG. 10) was performed by a method of drawing 2 diagonal lines in the observation image, drawing 2 arbitrary straight lines passing through the intersection of the diagonal lines, and measuring the width of a fiber crossing these straight lines by visual inspection. The average fiber width was determined from the average value of 50 fibers.

Figure 11:
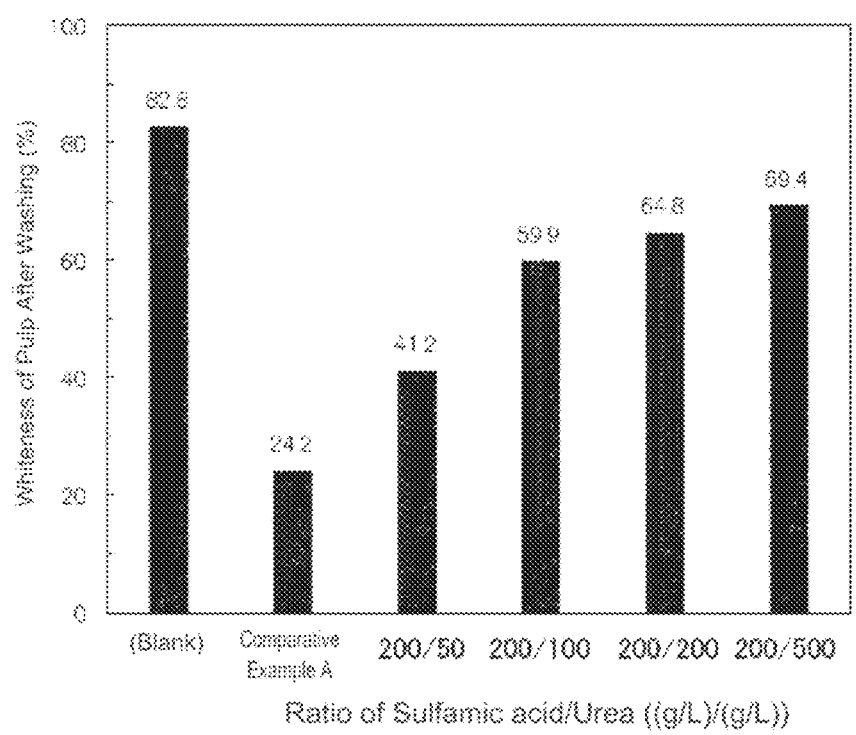
FIG. 11 is a diagram showing experimental results, showing a whiteness.

Table 4 shows the relationship between sulfamic acid/urea-treated pulp fibers and whiteness. FIG. 11 is a graph showing the relationship between the ratio of sulfamic acid/urea and whiteness.

TABLE 4

| | Treatment Time (minutes) | Treatment Temperature (° C.) | Ratio of Sulfamic acid/Urea | Whiteness of Pulp Washed After Chemical Treatment (%) |
|---|---|---|---|---|
| NBKP | — | — | — | 82.8 |
| Comparative Example A | 25 | 120 | (200 g/L)/(0 g/L) | 24.2 |
| Influence of Reagent Mixing Ratio | 25 | 120 | (200 g/L)/(50 g/L) | 41.2 |
| | | | (200 g/L)/(100 g/L) | 59.9 |
| | | | (200 g/L)/(200 g/L) | 64.8 |
| | | | (200 g/L)/(500 g/L) | 69.4 |

Table 4 and FIG. 11 reveal that sulfamic acid/urea-treated pulp fibers in which coloring of fibers by sulfamic acid was suppressed were prepared by adding urea to the reaction solution.

It was also confirmed that sulfamic acid/urea-treated pulp fibers with controlled whiteness were prepared by adjusting the proportion of urea in the concentration ratio of sulfamic acid and urea.

Experimental Results for Nanocellulose Fibers

Tables 5 and 6 are characteristic tables showing characteristics of nanocellulose fibers.

TABLE 5

Characteristics of Nanocellulose Fibers Condition with Drying Step

| | Treatment Time (minutes) | Treatment Temperature (° C.) | Chemicals | Total Light Transmittance (%) | Haze Value (%) | Fiber Width (nm) | Amount of Sulfur Introduced (mmol/g) |
|---|---|---|---|---|---|---|---|
| NBKP | — | — | — | Fibrillation Failed | | | 0.01 |
| Influence of Treatment Time | 5 | 100 | Sulfamic Acid/Urea (200 g/L)/(100 g/L) | Fibrillation Failed | | | 0.15 |
| | | 120 | | | | | 0.18 |
| | | 140 | | | | | 0.28 |
| Influence of Temperature | 25 | 100 | | 91.9 | 42.7 | 20 nm or Less | 0.44 |
| | | 120 | | 97.7 | 5.5 | | 0.84 |
| | | 140 | | 98.1 | 5.2 | | 0.77 |
| | 60 | 100 | | 96.3 | 14.0 | 20 nm or Less | 0.70 |
| | | 120 | | 99.6 | 3.3 | | 0.97 |
| | | 140 | | 99.1 | 4.1 | | 0.86 |
| | 120 | 100 | | 97.4 | 5.0 | 20 nm or Less | 0.70 |
| | | 120 | | 96.8 | 4.7 | | 1.08 |
| | | 140 | | 93.8 | 5.0 | | 0.78 |
| Comparative Example B | 25 | 120 | Sulfamic Acid (200 g/L) | 79.9 | 65.0 | 20 nm or More | 0.42 |

| | Treatment Time (minutes) | Treatment Temperature (° C.) | Ratio of Sulfamic acid/Urea | Total Light Transmittance (%) | Haze Value (%) | Fiber Width (nm) | Amount of Sulfur Introduced (mmol/g) | Polymerization Degree |
|---|---|---|---|---|---|---|---|---|
| NBKP | — | — | — | Fibrillation Failed | | | 0.01 | — |
| Comparative Example B | 25 | 120 | (200 g/L)/(0 g/L) | 79.9 | 65.0 | 20 nm or More | 0.42 | 275 |
| Influence of Reagent Mixing Ratio | 25 | 120 | (200 g/L)/(50 g/L) | 95.9 | 7.1 | 20 nm or Less | 0.56 | 408 |
| | | | (200 g/L)/(100 g/L) | 97.7 | 5.5 | | 0.84 | 386 |
| | | | (200 g/L)/(200 g/L) | 98.1 | 2.7 | | 0.97 | 404 |
| | | | (200 g/L)/(500 g/L) | 97.9 | 4.8 | | 0.85 | 478 |
| | | | (100 g/L)/(50 g/L) | 93.9 | 23.9 | | 0.64 | |
| | | | (200 g/L)/(100 g/L) | 97.7 | 5.5 | | 0.84 | |

TABLE 6

Characteristics of Nanocellulose Fibers Condition without Drying Step

| | Treatment Time (minutes) | Treatment Temperature (° C.) | Chemicals | Total Light Transmittance (%) | Haze Value (%) |
|---|---|---|---|---|---|
| Influence of Treatment Time | 5 | 100 | Sulfamic Acid/Urea (200 g/L)/(100 g/L) | Fibrillation Failed | |
| | | 120 | | | |
| | | 140 | | | |
| Influence of Temperature | 25 | 100 | | Fibrillation Failed | |
| | | 120 | | 95.3 | 14.0 |
| | | 140 | | 96.1 | 9.3 |

TABLE 6-continued

| Characteristics of Nanocellulose Fibers Condition without Drying Step | | | | |
|---|---|---|---|---|
| | 60 | 100 | 92.9 | 16.5 |
| | | 120 | 97.1 | 6.2 |
| | | 140 | 96.9 | 3.9 |
| | 120 | 100 | 97.3 | 5.4 |
| | | 120 | 96.9 | 4.9 |
| | | 140 | 95.6 | 5.9 |

| | Treatment Time (minutes) | Treatment Temperature (° C.) | Ratio of Sulfamic acid/Urea | Total Light Transmittance (%) | Haze Value (%) |
|---|---|---|---|---|---|
| Comparative Example C | 25 | 120 | (200 g/L)/(0 g/L) | 54.9 | 94.6 |
| Influence of Reagent Mixing Ratio | 25 | 120 | (200 g/L)/(50 g/L) | 96.3 | 6.9 |
| | | | (200 g/L)/(100 g/L) | 95.3 | 14.0 |
| | | | (200 g/L)/(200 g/L) | 98.1 | 5.3 |
| | | | (200 g/L)/(500 g/L) | 96.2 | 12.4 |

Table 5 is a characteristic table showing characteristics of nanocellulose fibers obtained under a condition in which drying was performed (condition with the drying step). Table 6 is a characteristic table showing characteristics of nanocellulose fibers obtained under a condition in which drying was not performed (condition without the drying step).

Figure 14:
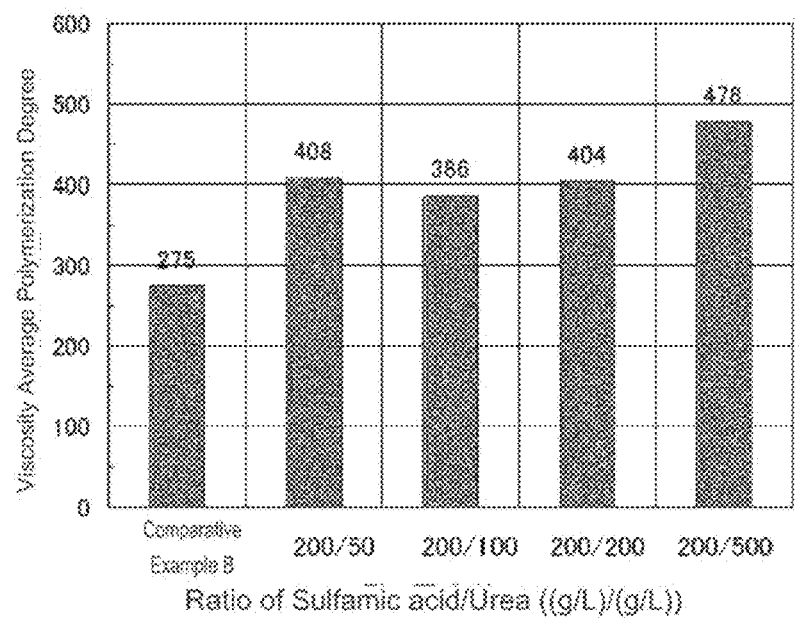
FIG. 14 is a graph showing experimental results, showing a polymerization degree

FIGS. 12 to 14 specifically show the characteristics of nanocellulose.

FIG. 12 is a graph showing the relationship between the ratio of sulfamic acid/urea ((g/L)/(g/L)) of the reaction solution and the total light transmittance (%) and the haze value (%) of the nanocellulose fiber obtained under a condition with the drying step.

FIG. 13 is a graph showing the relationship between the ratio of sulfamic acid/urea ((g/L)/(g/L)) of the reaction solution and the total light transmittance (%) and the haze value (%) of the nanocellulose fiber obtained under a condition without the drying step.

FIG. 14 is a diagram showing the relationship between the ratio of sulfamic acid/urea ((g/L)/(g/L)) of the reaction solution and the polymerization degree (corresponding to the average fiber length of the nanocellulose fibers) of nanocellulose fibers obtained under a condition without the drying step.

As Comparative Examples B and C, comparative samples in which the sulfamic acid concentration of reaction solution is adjusted to 200 g/L and urea is not added (sulfamic acid/urea ratio ((g/L)/(g/L))=200/0) were prepared. Comparative Examples B and C were treated in the same manner as in the other Experiment Examples, except that urea was not added.

As shown in Table 5, it was confirmed from the experimental results that the all average fiber widths of the nanocellulose fibers were adjusted to 20 nm or less.

As shown in Tables 5 and 6 and FIGS. 12 and 13, when the solid concentration of the nanocellulose fibers in the measurement solution (i.e., dispersion liquid) was adjusted to 0.5% by mass, the total light transmittance (%) was 90% or more in all cases; further, the haze value (%) was 20% or less in most of the cases, except for some cases with 42.7% and 23.9%. It was thus confirmed that nanocellulose fibers of 15% or less were prepared in most cases. That is, it was confirmed that nanocellulose fibers having improved dispersibility in a dispersion liquid were prepared while ensuring significantly high transparency of the nanocellulose fibers.

Among commercially-available resin films that are required to have transparency, the total light transmittance (%) of a methacrylic film having high transparency is about 90%, and the haze value (%) of a polyethylene film, which is a general-purpose resin, is about 20%. Therefore, it was confirmed that the nanocellulose fibers obtained in the experiment shown above had a quality equal to or higher than those of previously-known commercially-available products.

As shown in FIG. 14, it was confirmed that production of the nanocellulose fibers having a polymerization degree of 386 to 478 was possible. It was also confirmed that the value was higher than that of the nanocellulose fibers (Comparative Example B) obtained under a condition using only sulfamic acid. That is, it was confirmed that production of nanocellulose fibers having an improved polymerization degree (i.e., fiber length) was possible by adding urea to the reaction solution. In other words, it was confirmed that it is possible to prepare nanocellulose fibers in which entanglement between fibers was facilitated.

It was confirmed that nanocellulose fibers having a fiber length of about 200 nm were obtained when the polymerization degree was 400 and the length of a single glucose molecule in the axis-wise direction was about 5 Å (about 0.5 nm).

Table 7 shows experimental results in the case of using a compound similar to sulfamic acid as a reaction solution.

TABLE 7

| | Treatment Time (minutes) | Treatment Temperature (° C.) | Chemicals | Total Light Transmittance (%) | Haze Value (%) |
|---|---|---|---|---|---|
| NBKP | — | — | — | Fibrillation Failed | |
| Influence of Chemicals Used | 25 | 120 | Sulfamic Acid/Urea (200 g/L)/(100 g/L) | 95.3 | 14.0 |
| | | | Ammonium Hydrogensulfate/Urea (200 g/L)/(100 g/L) | Fibrillation Failed | |

In this experiment, a sulfate (ammonium hydrogen sulfate) was used as a compound similar to sulfamic acid. The experiment was carried out in the same manner, except that ammonium hydrogen sulfate was used instead of sulfamic acid.

As shown in Table 7, the sulfate (ammonium hydrogen sulfate)/urea-based pulp fibers could not be fibrillated with 3 times (3 passes) of fibrillation.

The experimental results reveal that urea did not exhibit the same function (for example, a function as a catalyst) as that of the sulfamic acid/urea system in the sulfonation using a sulfate (ammonium hydrogen sulfate), or, even when it exhibited the function, it was insufficient.

Therefore, it was confirmed that the fibrillation efficiency and the degree of sulfonation can be improved in the sulfamic acid/urea system, as compared with the sulfonation using a sulfate (ammonium hydrogen sulfate).

Experiment 2

In Experiment 2, it was confirmed that sulfamic acid/urea-treated pulp fibers that can be easily fibrillated can be prepared by adjusting the water retention value of sulfamic acid/urea-treated pulp fibers.

The ease of fibrillation was evaluated by supplying a slurry prepared by adjusting the solid concentration of the sulfamic acid/urea-treated pulp obtained in Experiment 1 to 0.2% by mass to a high-pressure homogenizer, and evaluating the ease of fibrillation based on the fiber residual ratio of the fibers contained in a dispersion liquid in which the prepared nanocellulose fibers were dispersed.

In addition, the total light transmittance (%) and the haze value (%) at the same solid concentration were also inspected.

The conditions of the high-pressure homogenizer were as follows. First, preliminary fibrillation was carried out using a high-pressure homogenizer (Model No. N2000-2C-045, manufactured by KOS21 Co., Ltd.). The preliminary fibrillation was performed at a fibrillation pressure of 10 MPa with 2 times of fibrillation, and at a fibrillation pressure of 50 MPa with 1 time of fibrillation. Then, the slurry resulting from the preliminary fibrillation was supplied to a high-pressure homogenizer to prepare nanocellulose fibers. The fibrillation pressure at this time was 60 MPa, which was about a half of that in Experiment 1.

The devices other than the high-pressure homogenizer were the same as those in Experiment 1.

In the description of the measurement method of Experiment 2, explanations same as those in Experiment 1 are omitted.

Fiber Residual Ratio (%)

The fiber residual ratio (%) of the unfibrillated fibers contained in the dispersion liquid containing the prepared nanocellulose fibers was calculated based on the measured fibers in solids content of 0.05 g before and after the fibrillation treatment.

A fiber tester (manufactured by Lorentzen Wettre K. K.) was used.

First, the number of measurable fibers in 0.05 g solids content was counted using a slurry prepared by adjusting the solid concentration of sulfamic acid/urea-treated pulp before fibrillation to 0.2% by mass using the above fiber tester.

Next, the number of measurable fibers in solids content of 0.05 g was counted using a dispersion liquid of nanocellulose fibers after the fibrillation using the above fiber tester.

Then, the fiber residual ratio (%) was calculated according to the following equation.

Fiber residual ratio (%)=(counted value after fibrillation treatment/counted value before fibrillation treatment)×100

Results of Experiment 2

Figure 15:
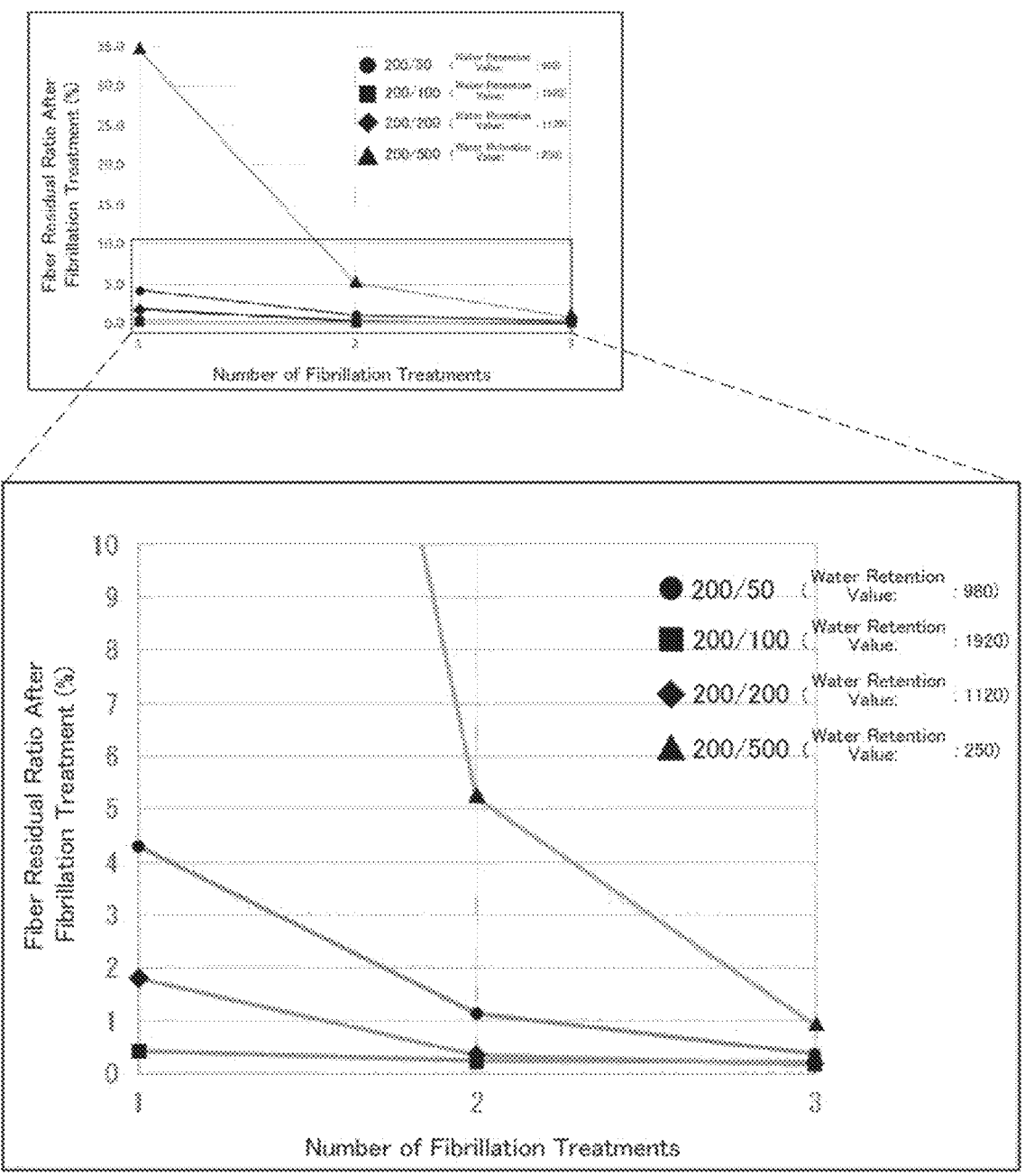
FIG. 15 is a graph showing experimental results, showing a relationship between water retention value and fibrillation.

Table 8 and FIG. 15 show the relationship between the water retention value (%) and the fiber residual ratio (%) of the sulfamic acid/urea-treated pulp fiber and the number of passes of the high-pressure homogenizer.

When the fiber residual ratio (%) was 1% or less, the fibers contained in the dispersion liquid could not be confirmed by visual inspection.

TABLE 8

|  | Treatment Time (minutes) | Treatment Temperature (° C.) | Ratio of Sulfamic acid/Urea | Fiber Residual Ratio After Fibrillation | | | Water Retention Value (%) | Introduction Amount (mmol/g) |
| --- | --- | --- | --- | --- | --- | --- | --- | --- |
|  |  |  |  | 1 pass | 2 passes | 3 passes |  |  |
| Water Retention Value and Easiness Of Fibrillation | 25 | 120 | (200 g/L)/(50 g/L) | 4.3 | 1.1 | 0.4 | 980 | 0.56 |
|  |  |  | (200 g/L)/(100 g/L) | 0.4 | 0.3 | 0.2 | 1920 | 0.84 |
|  |  |  | (200 g/L)/(200 g/L) | 1.8 | 0.3 | 0.2 | 1120 | 0.97 |
|  |  |  | (200 g/L)/(500 g/L) | 34.6 | 5.2 | 0.9 | 250 | 0.65 |

As shown in Table 8 and FIG. 15, it was confirmed that the higher the water retention value (%) of the sulfamic acid/urea-treated pulp fiber, the lower the fiber residual ratio (%).

It was confirmed that, with the sulfamic acid/urea-treated pulps as aggregates of sulfamic acid/urea-treated pulp fibers having water retention value (%) of 980%, 1120%, and 1920%, highly transparent nanocellulose fibers were obtained by performing a treatment with a fibrillation pressure of 60 MPa or less with 1 time (1 pass) of fibrillation.

In addition, it was also confirmed that, nanocellulose fibers having high transparency were prepared even with the sulfamic acid/urea-treated pulp as an aggregate of sulfamic acid/urea-treated pulp fibers having a water retention value (%) of 250% by performing the treatment with 2 times (2 passes) of fibrillation.

Figure 16:
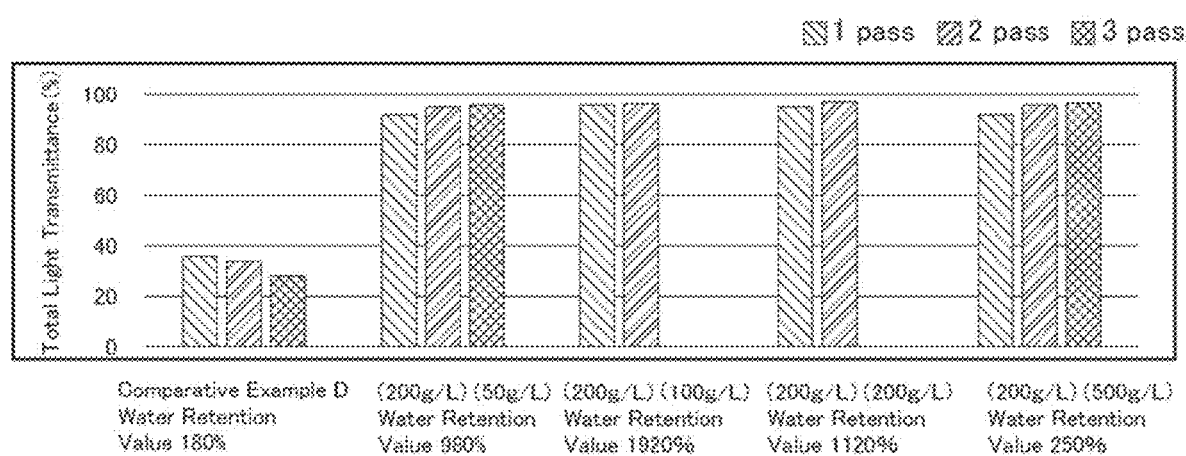
FIG. 16 is a graph showing experimental results, showing a relationship between water retention value and fibrillation.

Further, as shown in Table 9 and FIG. 16, it was also confirmed that, when the water retention value (%) of the sulfamic acid/urea-treated pulp fibers was higher than that of Comparative Example D (water retention value=180%), nanocellulose fibers having a high total light transmittance (%) were prepared by performing a treatment with 1 time (1 pass) of fibrillation.

TABLE 9

| | Treatment Time (minutes) | Treatment Temperature (° C.) | Ratio of Sulfamic acid/Urea | Concetration of Sample Upon Fibrillation (wt %) | Total Light Transmittance (%) for Each Count of Treatment | | | Haze Value (%) for Each Count of Treatment | | | Amount of Sulfur Introduced (mmol/g) | Pulp Water Retention Value (%) |
|---|---|---|---|---|---|---|---|---|---|---|---|---|
| | | | | | 1 pass | 2 passes | 3 passes | 1 pass | 2 passes | 3 passes | | |
| Comparative Example D | 25 | 120 | (200 g/L)/ (0 g/L) | 0.2 | 35.7 | 33.7 | 28.3 | 100 | 100 | 99.5 | 0.42 | 180 |
| Influence of Concentration Upon Fibrillation | 25 | 120 | (200 g/L)/ (50 g/L) | 0.2 | 92.1 | 94.9 | 96.2 | 23.8 | 11.7 | 5.5 | 0.56 | 980 |
| | | | (200 g/L)/ (100 g/L) | | 96.1 | 96.5 | — | 3.5 | 1.8 | — | 0.84 | 1920 |
| | | | (200 g/L)/ (200 g/L) | | 94.8 | 97.2 | — | 2.8 | 1.1 | — | 0.97 | 1120 |
| | | | (200 g/L)/ (500 g/L) | | 92.1 | 96.3 | 96.6 | 32.2 | 6.3 | 2.5 | 0.65 | 250 |

Figure 17:
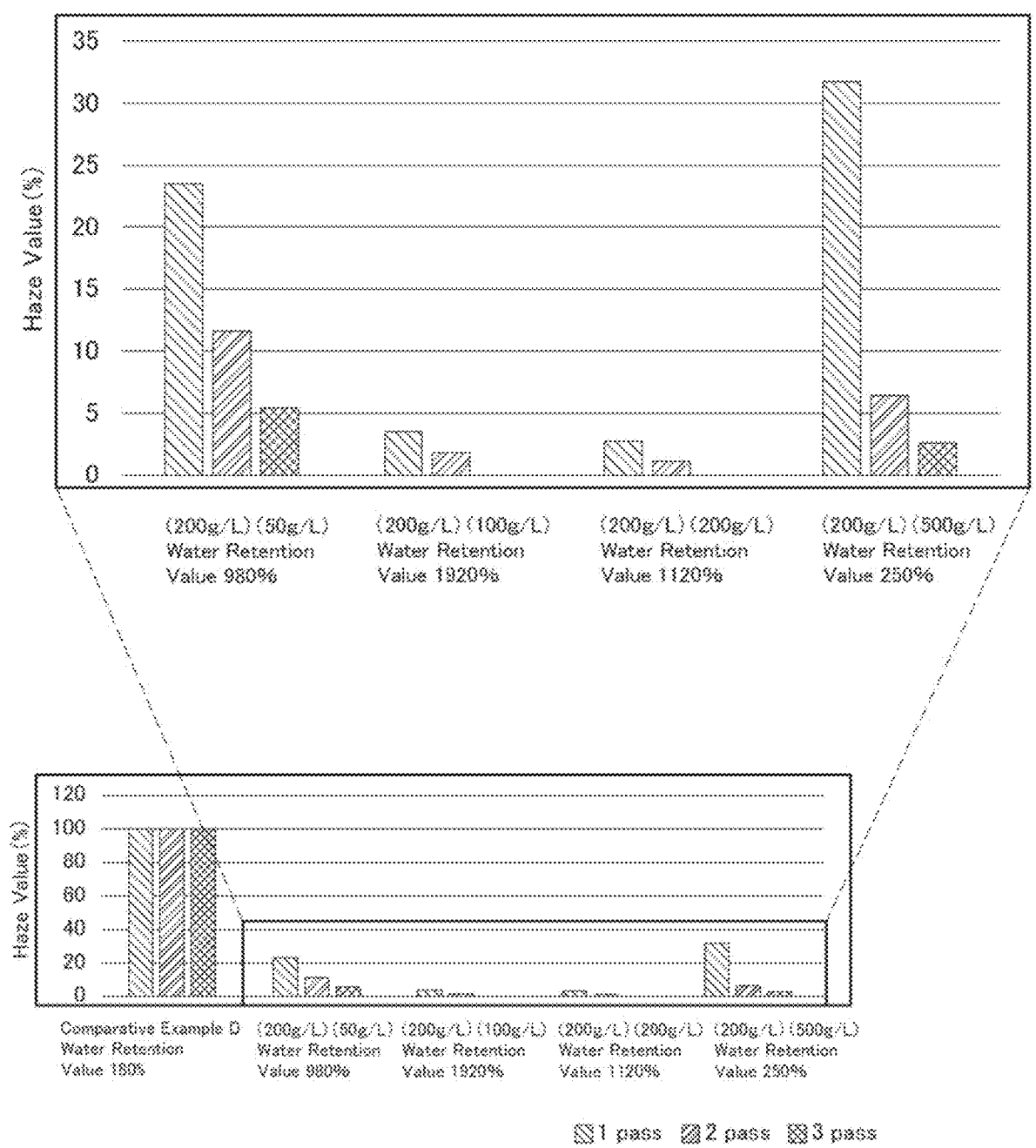
FIG. 17 is a graph showing experimental results, showing a relationship between water retention value and fibrillation.

As shown in FIG. 17, it was confirmed that nanocellulose fibers having a haze value (%) of 15% or less were prepared by performing a treatment with 2 times (2 passes) of fibrillation. In particular, it was confirmed that, when the water retention value (%) of the sulfamic acid/urea-treated pulp fibers was 1000% or more, nanocellulose fibers having a haze value (%) of 5% or less were prepared by performing a treatment with 1 time (1 pass) of fibrillation.

In Comparative Example D, the dispersion liquid obtained after the fibrillation treatment contained a large amount of precipitates and was in a turbid state. As shown in FIGS. 16 and 17, it was confirmed that, since the haze value (%) of Comparative Example D was approximately 100% and the total light transmittance (%) was 40% or less, Comparative Example D was not appropriately fibrillated by the fibrillation with the present condition. Further, even when fibrillation was performed by increasing the number of fibrillations (the number of passes), sufficient fibrillation results were not obtained in Comparative Example D.

With the experimental results of Experiment 2, it was confirmed that sulfamic acid/urea-treated pulp fibers that can be easily fibrillated even at a low fibrillation pressure (a low pressure not even assumed in the prior art) were prepared by performing the production method in which urea was added to the reaction solution.

Moreover, it was also confirmed that highly transparent nanocellulose fibers can be easily prepared by adjusting the water retention value (%) of the sulfamic acid/urea-treated pulp fibers to be higher than that of Comparative Example D (water retention value=180%) and adjusting the sulfur introduction amount of the sulfamic acid/urea-treated pulp fibers to be higher than 0.42 mmol/g of Comparative Example.

In particular, it was confirmed that, by adjusting the water retention value (%) of the sulfamic acid/urea-treated pulp fibers to 1000% or more, it is possible to easily prepare nanocellulose fibers having significantly excellent transparency with a haze value (%) of 5% or less by performing a treatment with 1 time (1 pass) of fibrillation and a fibrillation pressure of 60 MPa or less.

Experiment 3

In Experiment 3, the influence of the solid concentration of the sulfamic acid/urea-treated pulp fibers on the fibrillation treatment of the prepared nanocellulose fiber was inspected.

In this experiment, slurries that were prepared by adjusting the solid concentrations of the sulfamic acid/urea-treated pulp fibers prepared by the above-described production method (condition with the drying step, reaction temperature=120° C., reaction time=25 minutes, water retention value=1920%) to 0.5% by mass and 0.2% by mass, respectively, using a reaction solution having a sulfamic acid/urea ratio ((g/L)/(g/L)) of 200/100 (1:0.5) were supplied to a high-pressure homogenizer. The quality of the obtained nanocellulose fibers was evaluated according to the total light transmittance (%), the haze value (%), and the number of unfibrillated fibers after the fibrillation.

The total light transmittance (%) and the haze value (%) were measured in the same manner as in Experiment 1.

The number of unfibrillated fibers was determined by measuring the unfibrillated fibers in solids content of 0.05 g after the fibrillation treatment using a fiber tester (manufactured by Lorentzen Wettre K. K.) to determine the number of measurable fibers in solids content of 0.05 g.

Table 10 and FIG. 18 show the results of Experiment 3.

Table 10 and FIG. 18 show inspections of the solid concentration of the sulfamic acid/urea-treated pulp fibers in the slurry supplied to the high-pressure homogenizer, as well as the influence thereof on the obtained nanocellulose fibers.

TABLE 10

Relationship Between Solids Concentration Upon Fibrillation and Easiness of Fibrillation

| | Treatment Time (minutes) | Treatment Temperature (° C.) | Ratio of Sulfamic acid/Urea | Concentration of Sample Upon Fibrillation (wt %) | Total Light Transmittance (%) for Each Count of Treatment (%) | | Haze Value (%) for Each Count of Treatment (%) | | Number of Unfibrillated Fibers After Each Treatment (Number/Solids Content 0.05 g) | | |
|---|---|---|---|---|---|---|---|---|---|---|---|
| | | | | | 1 pass | 2 passes | 1 pass | 2 passes | 1 pass | 2 passes | 3 passes |
| Influence of Concentration Upon Fibrillation | 25 | 120 | (200 g/L)/ (100 g/L) | 0.2 | 96.1 | 96.5 | 3.5 | 1.8 | 20 | 12 | 10 |
| | | | | 0.5 | 97.8 | 99.2 | 3.3 | 2.8 | 27 | 21 | 22 |

As shown in Table 10 and FIG. 18, both of them had a total light transmittance (%) of about 100% and a haze value (%) of 5% or less. Further, the number of unfibrillated fibers was 30 or less in both cases if the fibrillation was performed with 1 time (1 pass) of fibrillation; that is, no significant difference due to difference in solid concentration (0.5% by mass and 0.2% by mass) was observed.

Therefore, it was confirmed that the solid concentration of the sulfamic acid/urea-treated pulp fibers in the slurry supplied to the high-pressure homogenizer did not affect the easiness of fibrillation insofar as the solid concentration falls within the range of 0.2% to 0.5% by mass. In addition, it was also confirmed that there was no influence on the quality of the nanocellulose fibers prepared at these solid concentrations insofar as the solid concentration falls within this range.

Experiment 4

In Experiment 4, it was confirmed that sulfur in the sulfamic acid/urea-treated pulp fibers and in the nanocellulose fibers is derived from a sulfo group.

In Experiment 4, the state of sulfur in the sulfamic acid/urea-treated pulp fibers prepared in the same manner as in Experiment 1 was inspected using a Fourier transform infrared spectroscopy (FT-IR, manufactured by JASCO Corporation, Model No.: FT/IR-4200) and the combustion-ion chromatography described above.

Further, the prepared sulfamic acid/urea-treated pulp fibers were subjected to a fibrillation treatment using the method of Experiment 1 to prepare nanocellulose fibers, and the state of sulfur in the prepared nanocellulose fibers was confirmed using an electrical conductivity meter (DKK CORPORATION, CONDUCTIVITY METER, Model No. AOL-10).

In Experiment 4, as in Experiment 1, sulfamic acid/urea-treated pulp was prepared under the following conditions.

Reaction solution Ratio of sulfamic acid/urea ((g/L)/(g/L))=200/200

The pulp was brought into contact with a reaction solution and was dried at 50° C. Thereafter, a heating reaction was performed at 120° C. for 25 minutes. After the heating reaction, the reacted pulp was washed well until it became neutral, thereby preparing sulfamic acid/urea-treated pulp fibers. In Experiment 4, the pulp after the heating reaction was washed by the following method so that the reaction solution physically adsorbed to the pulp fibers after the heating reaction disappeared.

First, the pulp after the heating reaction was placed in a saturated aqueous sodium hydrogencarbonate solution until the pulp became neutral, and was stirred for 10 minutes to be neutralized. Thereafter, the neutralized pulp was washed with a large amount of pure water and dried to prepare sulfamic acid/urea-treated pulp fibers. The resulting aggregate of the sulfamic acid/urea-treated pulp fibers corresponds to sulfamic acid/urea-treated pulp.

In contrast, Comparative Example E was prepared in the same manner as in the experiment example of Experiment 4, including the washing method, except that the heating reaction step was not performed.

FT-IR Measurement

The FT-IR measurement was performed by the ATR method.

The measurement was performed under a condition in which a measurement wave number ranges from 600 to 4000 cm$^{-1}$ and cumulative frequencies of 100. After the sulfonation treatment, the sample was washed and dried at 105° C.

Measurement of Electrical Conductivity

In the treatment with an ion-exchange resin, a strongly acidic ion-exchange resin (Amberjet 1024 (conditioned), manufactured by Organo Corporation) at a volume ratio of 1/10 was added to a 0.2% by mass of a nanocellulose fiber-containing slurry, and the mixture was subjected to a shaking treatment for 1 hour. Thereafter, the mixture was poured to a 200 μm-opening mesh, thereby separating the resin from the slurry.

In the titration using an alkali, while adding 0.5N aqueous sodium hydroxide solution to the ion-exchanged nanocellulose fiber-containing slurry, changes in electrical conductivity of the mixed solution of the nanocellulose fiber-containing slurry and the aqueous sodium hydroxide solution were measured.

Nuclear Magnetic Resonance (NMR) Measurement

The NMR measurement of the sulfamic acid/urea-treated pulp was performed.

The sulfamic acid/urea-treated pulp ((200 g/L)/(200 g/L), sulfur introduction amount=0.97 mmol/g) prepared in Experiment 1 was used for the measurement.

The NMR measurement conditions are as follows.

With a NMR device (manufactured by Agilent Technologies, Model No.: Agilent 400 DD2, resonance frequency=400 MHz), measurement was performed by an HSQC method using heat-insulation pulp. The cumulated number was 480. Deuterated DMSO was used as an internal standard, and the central peaks were set to F1 axis (13C): 39.5 ppm and F2 axis (1H): 2.49 ppm. Analysis software (Vnmrj 4.2) manufactured by Agilent Technologies was used for data analysis.

After the sulfonation treatment, the washed and dried sulfamic acid/urea-treated pulp was pulverized by a ball mill to prepare pulverized pulp. The ball milling conditions were as follows. The pulverization was performed three times at 600 rpm for 20 minutes using a small planetary ball mill (P-7, manufactured by Fritsch).

The pulverized pulp (30 g) was dispersed in a deuterated DMSO solvent (0.7 ml), followed by a ultrasonic treatment for 30 minutes, thereby preparing a sample for NMR measurement.

As an internal standard, deuterated DMSO (manufactured by Wako Pure Chemical Industries, Ltd., Model No.: dimethylsulfoxide-d6) was used. A filter paper (manufactured by ADVANTEC, qualitative circular filter paper, Model No.: No. 2) as cotton cellulose was used as a blank. The filter paper was treated in the same manner as that for the sulfamic acid/urea-treated pulp described above, and subjected to NMR measurement.

Results of Experiment 4

Table 11 shows the results of measurement of the amount of sulfur introduced into the sulfamic acid/urea-treated pulp fibers measured by the combustion-ion chromatography.

TABLE 11

|  | Treatment Time (minutes) | Treatment Temperature (° C.) | Ratio of Sulfamic acid/Urea | Amount of Sulfur Introduced (mmol/g) |
| --- | --- | --- | --- | --- |
|  | 25 | 120 | (200 g/L)/(200 g/L) | 0.97 |
| Comparative Example E | — | — | (200 g/L)/(200 g/L) | 0.01 |

As shown in Table 11, the sulfur introduction amount of the sulfamic acid/urea-treated pulp fibers was 0.97 mmol/g, and the sulfur introduction amount of Comparative Example E was 0.01 mmol/g.

It was confirmed from the experimental results that, as shown in Comparative Example E, sulfamic acid physically adsorbed to the pulp fibers was washed off substantially completely by washing. In other words, it was confirmed that the sulfamic acid/urea-treated pulp fibers were substantially free of sulfur that was physically adsorbed due to the adsorption of the reaction solution, incomplete washing, and the like.

Further, since the sulfamic acid/urea-treated pulp fibers had a sulfur introduction amount of 0.97 mmol/g even after the washing, it was assumed that the sulfur contained in the sulfamic acid/urea-treated pulp fibers was not physically adsorbed but was present as a sulfur content that cannot be washed off or removed. This sulfur content was generated as the sulfamic acid in the reaction solution was chemically reacted with the hydroxyl groups of the cellulose fibers constituting the sulfamic acid/urea-treated pulp fibers.

FIG. 19 shows the results of FT-IR measurement.

FIG. 19 shows that, in the sulfamic acid/urea-treated pulp fibers, peaks derived from S=O and S—O, which are considered to be derived from sulfo groups, are observed in the vicinity of 1200 cm$^{-1}$ and 800 cm$^{-1}$; in contrast, these peaks were not confirmed in Comparative Example E.

According to the experimental results, it was assumed that, in the sulfamic acid/urea-treated pulp fibers, sulfo groups were introduced with respect to the hydroxyl groups of the cellulose fibers constituting the sulfamic acid/urea-treated pulp fibers, and that, therefore, the sulfur content was confirmed by FT-IR or combustion-ion chromatography measurement.

Figure 20:
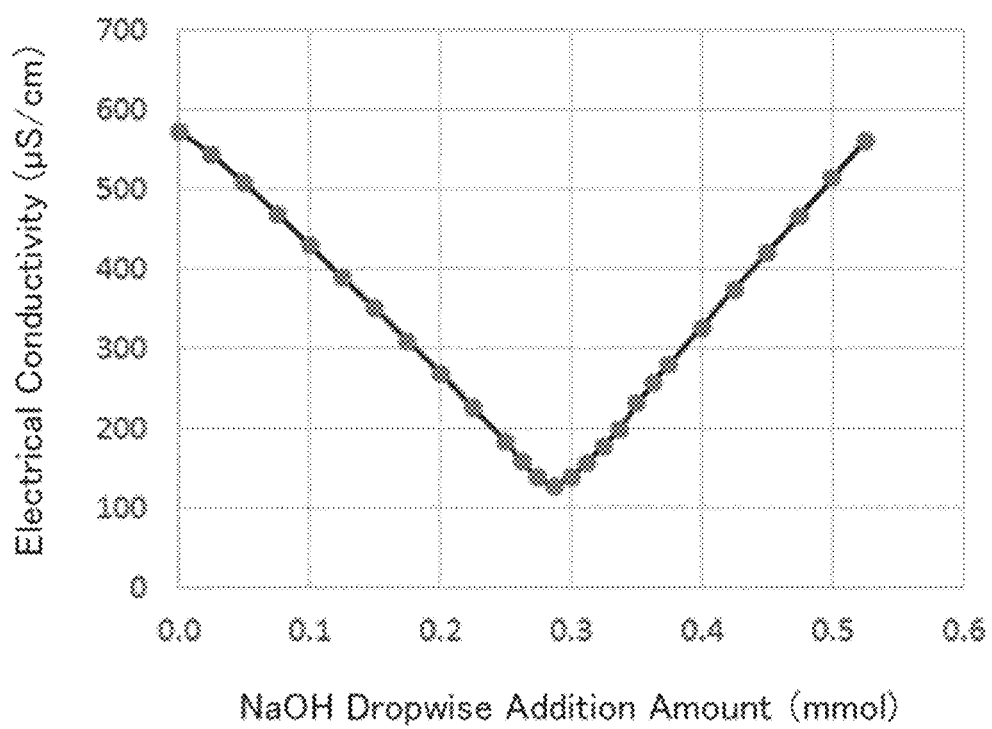
FIG. 20 is a diagram showing experimental results, showing the results of electrical conductivity measurement of nanocellulose fiber, which corresponds to the sulfonated fine cellulose fiber of the present embodiment.

FIG. 20 shows the results of electrical conductivity measurement. It was confirmed from FIG. 20 that the ion-exchanged nanocellulose fiber-containing slurry was able to be subjected to neutralization titration by using an aqueous sodium hydroxide solution. The titration curve was also similar to that obtained when a strong acid was neutralized with a strong base.

This experimental results suggested that a bond of strong acid group is introduced into the nanocellulose fibers. Further, according to the results of electrical conductivity measurement, it was confirmed that the amount of sulfo groups introduced into the nanocellulose fibers was 1 mmol/g (The sulfo group concentration was calculated by division of the sulfo group content, which was estimated from the inflection points of the titration curve shown in FIG. 20, in the fine cellulose fibers by the solid content of the fine fibers subjected to the experiment.), and that this amount was substantially the same as that in the measurement results (0.97 mmol/g) obtained by the combustion-ion chromatography.

Figure 21:
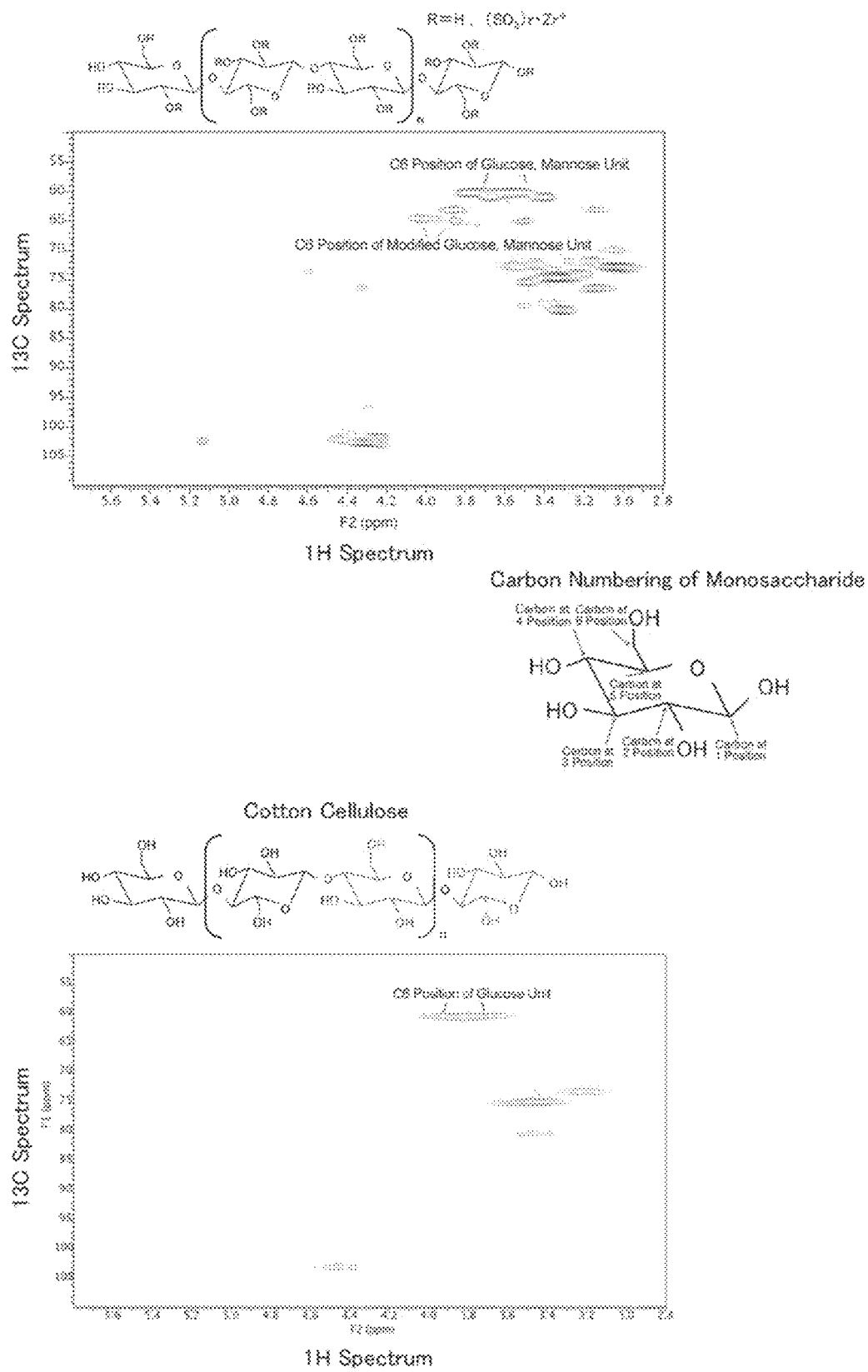
FIG. 21 is a diagram showing experimental results, showing the results of NMR measurement of sulfamic acid/urea-treated pulp fiber, which corresponds to the sulfonated pulp fiber of the present embodiment.

FIG. 21 shows the results of NMR measurement for sulfamic acid/urea-treated pulp fibers.

As shown in FIG. 21, the peaks of hydrogen and the carbon at C6 position of the cellulose of the cellulose fibers constituting the sulfamic acid/urea-treated pulp fiber are shifted to lower magnetic field. This suggests sulfonation of the hydroxyl group at C6 position.

Further, the nanocellulose fibers obtained by fibrillating the sulfamic acid/urea-treated pulp fibers prepared by the present production method had high transparency, and the fiber width was 20 nm or less. This is presumably because, in the sulfamic acid/urea-treated pulp fibers prepared by the present production method, a high-density charge repulsion effect is expressed due to the predominant sulfonation of the hydroxyl group at C6 position exposed to the microfibril. Therefore, it is assumed that nanocellulose fibers having high transparency and high dispersibility were prepared even when the sulfamic acid/urea-treated pulp fibers prepared by the present production method were subjected to a simple fibrillation treatment.

According to the experimental results of Experiment 4, it was confirmed that only sulfur resulting from chemical bond of sulfur in the reaction solution is present in the sulfamic acid/urea-treated pulp fibers. It was also confirmed that this sulfur is a highly acidic group derived from S=O and S—O. In other words, it was confirmed that the measured sulfur is attributable to the sulfo group chemically bonded to the hydroxyl group of the cellulose fibers constituting the sulfamic acid/urea-treated pulp fiber.

Therefore, it was confirmed that, sulfo groups were introduced into the sulfamic acid/urea-treated pulp fibers prepared by the present production method in a state of being chemically bonded to the hydroxyl groups of the cellulose fibers constituting the sulfamic acid/urea-treated pulp fibers.

Moreover, it was also confirmed that, in the sulfamic acid/urea-treated pulp fibers prepared by the present production method, the hydroxyl group at C6 position among the hydroxyl groups of the cellulose fibers constituting the sulfamic acid/urea-treated pulp fiber is sulfonated. That is, by using the present production method, it is possible to introduce a sulfo group more preferentially into the hydroxyl group at C6 position than the hydroxyl groups at C2 position or C3 position in the cellulose fibers. For this reason, it was confirmed that the present production method enables preparation of pulp fibers with suppressed dissolution or cleavage of cellulose fibers compared with the pulp fibers in which sulfo groups are introduced into the hydroxyl group at C2 position or C3 position in the cellulose fiber, and that, moreover, the production method also enables preparation of pulp fibers that enable production of nanocellulose fibers having high transparency by performing a fibrillation treatment.

Experiment 5

In Experiment 5, it was confirmed that a urethane bond based on urea in the reaction solution was not generated in the sulfamic acid/urea-treated pulp fibers.

In Experiment 5, sulfamic acid/urea-treated pulp fibers were prepared in the same manner as in Experiment 4.

The nitrogen content in the prepared sulfamic acid/urea-treated pulp fiber was measured using an elemental analyzer (PerkinElmer Co., Ltd., 240011 CHNS/O).

As a comparative example, the nitrogen content in untreated NBKP was measured using the same elemental analyzer.

Results of Experiment 5

Table 12 shows the measurement results of the nitrogen content in the sulfamic acid/urea-treated pulp fiber and NBKP.

TABLE 12

|  | Treatment Time (minutes) | Treatment Temperature (° C.) | Ratio of Sulfamic acid/Urea | Nitrogen Content (mmol/g) |
| --- | --- | --- | --- | --- |
|  | 25 | 120 | (200 g/L)/(200 g/L) | 0.0 |
| NBKP | — | — | — | 0.0 |

As shown in Table 12, an increase in nitrogen content compared with NBKP was not confirmed in the prepared sulfamic acid/urea-treated pulp fibers.

With the results of Experiment 5, it was confirmed that a urethane bond was not introduced into the sulfamic acid/ urea-treated pulp fibers prepared by the present production method even when urea was used in the reaction solution in the chemical treatment step.

In prior arts, there are reports that, when urea is used in chemical modification of pulp, a urethane bond such as carbamate is formed in the pulp after the chemical modification. It has also been reported that the formation of this urethane bond improves the dispersibility of cellulose fibers and improves the transparency of the nanocellulose dispersion liquid obtained after fibrillation.

However, since the introduction of urethane bond was not confirmed in the sulfamic acid/urea-treated pulp fiber, it is assumed that urea in the reaction solution in the present production method acted on the sulfamic acid/urea-treated pulp fiber by a different mechanism from that of the prior art technology.

In other words, the urea used in the reaction solution in the chemical treatment step of the present production method is assumed to have no contribution to cellulose fibrillation in the sulfamic acid/urea-treated pulp fiber or improvement in transparency of nanocellulose fibers.

Experiment 6

In Experiment 6, it was confirmed, from the viewpoint of crystal form, that damages to the fibers due to the chemical treatment were suppressed in the sulfamic acid/urea-treated pulp fibers.

In Experiment 1, it was confirmed that damages to the fibers due to the chemical treatment were suppressed from the viewpoint of retention of fiber length.

In Experiment 6, sulfamic acid/urea-treated pulp fibers were prepared under the following conditions as in Experiment 1.

Reaction solution: Ratio of sulfamic acid/urea ((g/L)/(g/L))=200/50
Reaction solution: Ratio of sulfamic acid/urea ((g/L)/(g/L))=200/100
Reaction solution: Ratio of sulfamic acid/urea ((g/L)/(g/L))=200/200
Reaction solution: Ratio of sulfamic acid/urea ((g/L)/(g/L))=200/500

The pulp was brought into contact with a reaction solution, followed by drying at 50° C. Thereafter, a heating reaction was performed at 120° C. for 25 minutes. The pulp after the heating reaction was placed in a saturated aqueous sodium hydrogencarbonate solution and stirred for 10 minutes until the pulp became neutral. After the neutralization, the neutralized pulp was washed with a large amount of pure water. Thereafter, the pulp was dried using a freeze dryer (manufactured by EYELA, Model No.: FDU-1200) to prepare sulfamic acid/urea-treated pulp fibers.

In Experiment 6, a freeze dryer was used considering a possibility that the crystal portion was damaged by heat, and may result in loss of the original crystallinity.

The crystal structure of the prepared sulfamic acid/urea-treated pulp fiber was measured using an X-ray diffractometer (manufactured by Rigaku Corporation, Model No.: UltimaIV). The crystallinity was determined by the Segal method.

As a comparative example, the crystal structure of NBKP fibers prepared by freeze-drying untreated NBKP was measured by the same method as described above.

X-ray source: copper
Tube voltage: 40 kV
Tube current: 40 mA
Measurement range: diffraction angle 2θ=10° to 30°
X-ray scanning speed: 2°/min Results of Experiment 6

Table 13 shows crystallinity and crystal structure of the sulfamic acid/urea-treated pulp fiber.

Figure 22:
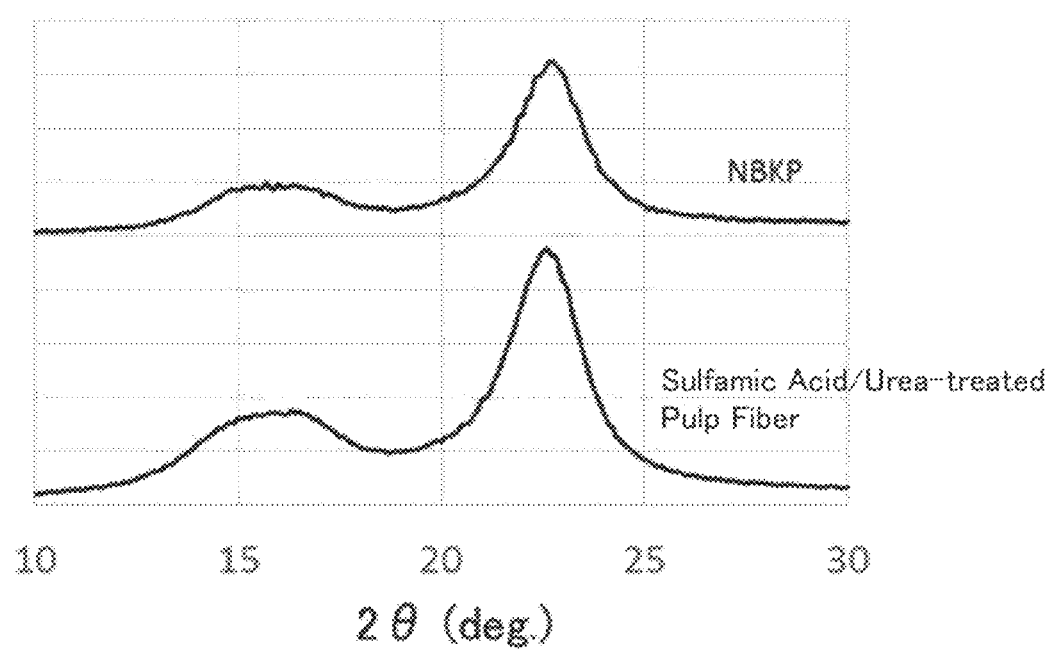
FIG. 22 is a diagram showing experimental results, showing the results of X-ray diffraction of NBKP and sulfamic acid/urea-treated pulp fiber, which corresponds to the sulfonated pulp fiber of the present embodiment.

FIG. 22 shows a representative example of X-ray diffraction result of sulfamic acid/urea-treated pulp fiber (treated with a reaction solution: sulfamic acid/urea ratio ((g/L)/(g/L))=200/100).

TABLE 13

| | Treatment Time (minutes) | Treatment Temperature (° C.) | Ratio of Sulfamic acid/Urea | Crystallinity | Crystal Structure |
|---|---|---|---|---|---|
| | 25 | 120 | (200 g/L)/(50 g/L) | 79.7 | Type I |
| | | | (200 g/L)/(100 g/L) | 77.4 | |
| | | | (200 g/L)/(200 g/L) | 72.9 | |
| | | | (200 g/L)/(500 g/L) | 71.1 | |
| NBKP | — | — | (200 g/L)/(500 g/L) | 83.0 | Type I |

As shown in Table 13, it was confirmed that the crystallinity was high, i.e., 60% or more, in all sulfamic acid/urea-treated pulp preparation processes using various kinds of reaction solutions.

Further, according to the X-ray diffraction results of FIG. 22, it was confirmed that the sulfamic acid/urea-treated pulp retained the Type I crystal structure, which is the same structure as that of untreated NBKP.

According to the experimental results of Experiment 6, it was confirmed that, even when a chemical treatment was performed, the influence thereof on the crystal structure and the degree of crystallinity was suppressed in the sulfamic acid/urea-treated pulp prepared by the present production method. More specifically, from the viewpoints of both fiber length and crystal form, it was confirmed that, even when a chemical treatment was performed, sulfamic acid/urea-treated pulp with suppressed damages to the fibers was prepared.

Therefore, it was confirmed that, in the sulfamic acid/urea-treated pulp fiber prepared by the present production method, it is possible to introduce sulfo groups into the hydroxyl groups of the cellulose fibers constituting the sulfamic acid/urea-treated pulp fiber by a chemical treatment, and that, therefore, damages to the fibers due to the chemical treatment can be appropriately suppressed.

Experiment 7

In Experiment 7, the relationship between the polymerization degree and the crystallinity before and after the fibrillation of the sulfamic acid/urea-treated pulp fibers and nanocellulose fibers prepared by the present production method was confirmed.

The sulfamic acid/urea-treated pulp fibers and nanocellulose fibers were prepared by the same production method as in Experiment 1.

The polymerization degree was measured by the same method as in Experiment 1. The crystallinity was measured by the same method as in Experiment 6.

In the X-ray diffraction measurement of the sulfamic acid/urea-treated pulp fibers, those having a crystallinity of 77.4% obtained before fibrillation shown in Table 15 were used. Further, in the X-ray-diffraction measurement of the nanocellulose fibers, those having a crystallinity of 52.0% obtained after fibrillation shown in Table 15 were used.

Figure 23:
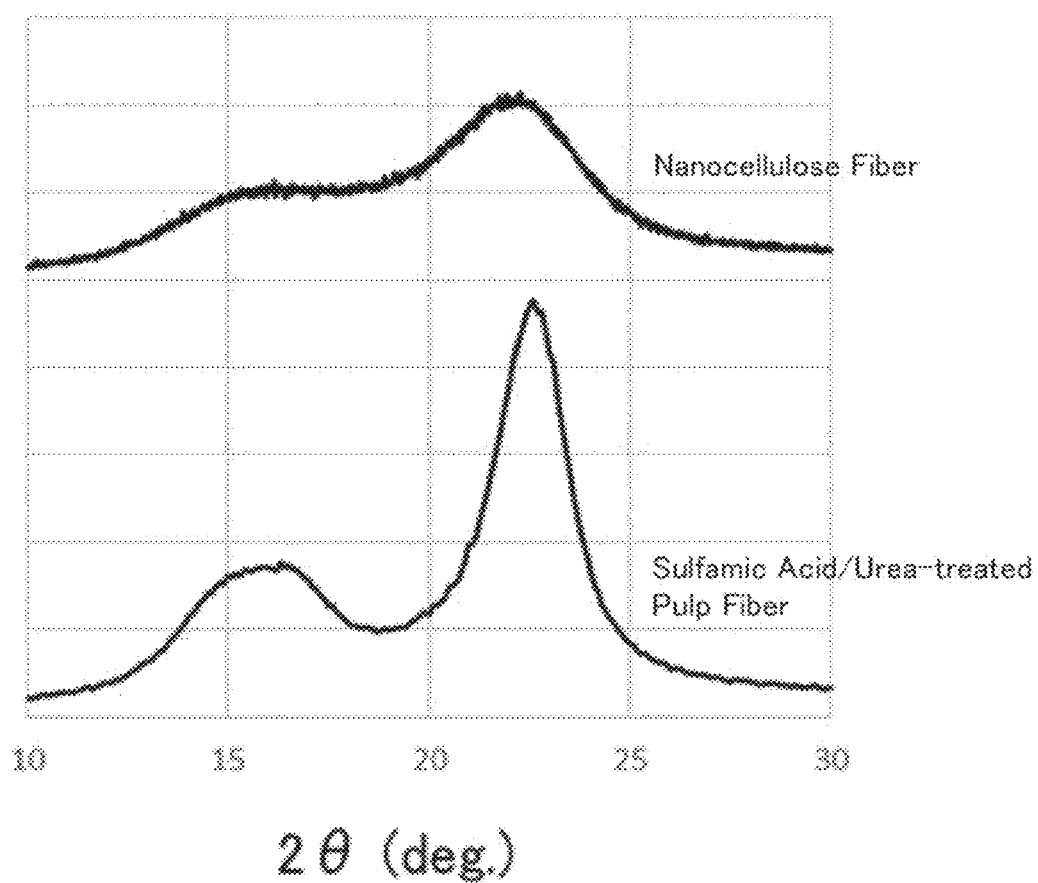
FIG. 23 is a diagram showing experimental results, showing the results of X-ray diffraction of sulfamic acid/urea-treated pulp fiber, which corresponds to the sulfonated pulp fiber of the present embodiment, and of nanocellulose fiber, which corresponds to the sulfonated fine cellulose fiber of the present embodiment.

Table 14 shows the results of measurement of polymerization degree before and after fibrillation. Table 15 shows crystallinity and crystal structure before and after fibrillation, and FIG. 23 shows X-ray diffraction results.

TABLE 14

|  | Treatment Time (minutes) | Treatment Temperature (° C.) | Ratio of Sulfamic acid/Urea | Polymerization Degree Before Fibrillation Treatment | Polymerization Degree After Fibrillation Treatment |
|---|---|---|---|---|---|
| Polymerization Degree Before and After Fibrillation | 25 | 120 | (200 g/L)/(50 g/L) | 498 | 408 |
|  |  |  | (200 g/L)/(100 g/L) | 507 | 386 |
|  |  |  | (200 g/L)/(200 g/L) | 581 | 404 |
|  |  |  | (200 g/L)/(500 g/L) | 880 | 478 |

TABLE 15

|  | Treatment Time (minutes) | Treatment Temperature (° C.) | Ratio of Sulfamic acid/Urea | Crystallinity Before Fibrillation Treatment | Crystallinity After Fibrillation Treatment | Crystal Structure |
|---|---|---|---|---|---|---|
|  | 25 | 120 | (200 g/L)/(50 g/L) | 79.7 | 42.3 | Type I |
|  |  |  | (200 g/L)/(100 g/L) | 77.4 | 42.1 |  |
|  |  |  | (200 g/L)/(200 g/L) | 72.9 | 50.9 |  |
|  |  |  | (200 g/L)/(500 g/L) | 71.1 | 52 |  |
| NBKP | — | — | (200 g/L)/(500 g/L) | 83.0 | — | Type I |

According to the experimental results in Table 14, it was confirmed that the polymerization degree of the fiber was decreased by the fibrillation treatment. However, by using the present production method, the polymerization degree of the nanocellulose fibers after fibrillation was kept as high as 54% to 82%. It is therefore expected that the fiber length of the nanocellulose fiber is longer than the general level.

Further, according to the experimental results in FIG. 23, it was confirmed that the Type I crystal structure retained before and after the fibrillation treatment. Further, according to the experimental results in Table 15, it was confirmed that the crystallinity was decreased from 70% or more (crystallinity before fibrillation) to about 42.1 to 52.0% (crystallinity after fibrillation).

Therefore, it was confirmed that, by using the fibrillation treatment of the present production method, the crystallinity of the fiber was changed while the crystal structure was retained before and after the fibrillation.

Experiment 8

In Experiment 8, the relationship between the total light transmittance (%), haze value (%), viscosity, and TI value of the nanocellulose fibers prepared by the present production method was confirmed.

In Experiment 8, a slurry prepared by adjusting the solids content of sulfamic acid/urea-treated pulp (sulfur introduction amount=0.65 mmol/g, water retention value=250%) prepared by the same production method as that in Experiment 1 to 0.5% by mass was supplied to a high-pressure homogenizer used in Experiment 2, thereby obtaining nanocellulose fibers, and the viscosity of a dispersion liquid of the obtained nanocellulose fibers was measured using a Brookfield viscometer (LVDV-I Prime, manufactured by EKO Instruments Co., Ltd.).

The conditions in the viscosity measurement were as follows.

The rotation speed was 6 rpm, the measurement temperature was 25° C., the measurement time was 3 minutes, and No. 64 spindle was used.

The fibrillation conditions were as follows.

The fibrillation pressure of the high-pressure homogenizer was 30 MPa, and the number of passes (number of fibrillations) in the fibrillation treatment was 5 times (5 passes), 7 times (7 passes), 9 times (9 passes), 11 times (11 passes), 15 times (15 passes), and 20 times (20 passes).

The total light transmittance (%) and the haze value (%) of the nanocellulose fibers obtained for each pass were measured by the same method as that in Experiment 1.

In addition, the thixotropy index (TI value) of the nanocellulose fibers obtained for each pass was measured.

The TI value was calculated by performing measurement using the Brookfield viscometer described above at a rotation speed of 6 rpm and 60 rpm, and determining the respective viscosities according to the following formulas.

TI value=(viscosity at a rotation speed of 6 rpm)/(viscosity at a rotation speed of 60 rpm)

Further, the fiber form of the nanocellulose fibers after the fibrillation was observed using SPM.

The SPM measurement was performed by measuring the fiber form of the nanocellulose fibers for each time of fibrillation by the same method as that used in Experiment 1 using a scanning probe microscope.

Results of Experiment 8

TABLE 16

| | Number of Fibrillations (Number of Passes) | | | | | |
| --- | --- | --- | --- | --- | --- | --- |
| | 5 passes | 7 passes | 9 passes | 11 passes | 15 passes | 20 passes |
| Viscosity (mPa · s) | 14497 | 15349 | 17846 | 15347 | 11748 | 12048 |
| Total Light Transmittance (%) | 89.6 | 97.2 | 97.6 | 97.9 | 98.7 | 97.8 |
| Haze Value (%) | 22.7 | 10.4 | 5.9 | 4.6 | 2.5 | 2.4 |
| TI Value | 6.9 | 6.1 | 7.4 | 7.1 | 6.6 | 7.4 |

Figure 24:
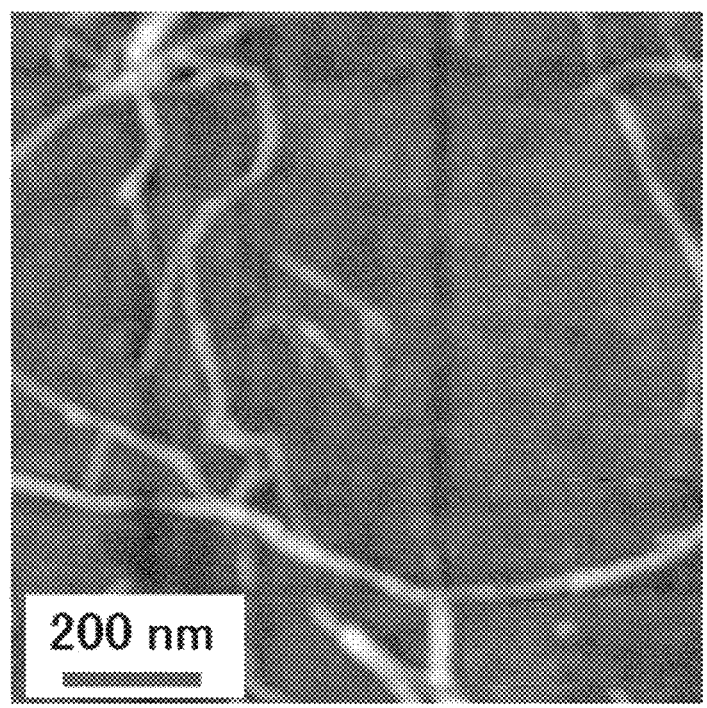
FIG. 24 is a diagram showing experimental results and is an enlarged image of the fiber surface of nanocellulose fiber, which corresponds to the sulfonated fine cellulose fiber of the present embodiment.

Table 16 and FIG. 24 show the results of Experiment 8.

As shown in Table 16, the viscosity measurement range was 11748 to 17846 mPa·s. The TI value was 6 to 8.

Moreover, as shown in FIG. 24, it was confirmed that the nanocellulose fibers after fibrillation had a small fiber width and a certain fiber length.

According to the experimental results, it was confirmed that the prepared nanocellulose fibers had a narrow fiber width while ensuring a certain polymerization degree of the fibers and a certain fiber length. More specifically, it was confirmed that the prepared nanocellulose fibers had a high aspect ratio.

Further, as shown in Table 16, it was confirmed that, even when the fibrillation treatment with a high-pressure homogenizer was performed at a low fibrillation pressure, i.e., 30 MPa, nanocellulose fibers having very high transparency with a haze value of 22.7% or less were prepared.

Therefore, with the results of Experiment 8, it was confirmed that nanocellulose fibers having a narrow fiber width and a long fiber length can be prepared by using the present production method. Moreover, it was further confirmed that such nanocellulose fibers having very high transparency can be prepared at a very low fibrillation pressure, i.e., 30 MPa.

Experiment 9

In Experiment 9, the relationship between the fiber width and transparency of the nanocellulose fibers prepared by the present production method was confirmed.

In Experiment 9, the influence on transparency when the nanocellulose fibers were prepared to have a fiber width of greater than 20 nm and when the nanocellulose fibers were prepared to have a fiber width of 20 nm or less was confirmed by measuring the haze value and the total light transmittance.

The nanocellulose fibers having a fiber width of 20 nm or less were prepared by supplying a slurry prepared by adjusting the solid concentration of sulfamic acid/urea-treated pulp fibers (sulfur introduction amount=0.97 mmol/g, water retention value=1120%) prepared by the same production method as in Experiment 1 to 0.5% by mass to a high-pressure homogenizer (fibrillation pressure=60 Mpa) used in Experiment 2.

The nanocellulose fibers having a fiber width of 30 nm to 50 nm were prepared by supplying a slurry prepared by adjusting the solid concentration of NBKP to 0.5% by mass to the high-pressure homogenizer (20 passes at a fibrillation pressure of 130 MPa) used in Experiment 1.

The fiber width of the nanocellulose fibers was measured using SPM as in Experiment 1. This measurement was performed in the dynamic mode.

The haze value (%) and the total light transmittance (%) were measured by the same method as shown in Experiment 1.

Table 17 shows the results of Experiment 9.

TABLE 17

| | Fiber Width (nm) | Total Light Transmittance (%) | Haze Value (%) |
| --- | --- | --- | --- |
| Fiber Width and Transparency | 20 or Less | 97 | 1.1 |
| | 30 to 50 | 58.9 | 53.2 |

As shown in Table 17, those prepared to have a nanocellulose fiber width of 20 nm or less (see FIG. 24) had a haze value of 20% or less; however, those prepared to have a nanocellulose fiber width of more than 30 nm had a haze value of 50% or more. That is, it was confirmed that the fiber width greatly contributes to the transparency of nanocellulose fiber, and that, accordingly, the haze value (i.e., transparency) starts to greatly vary when the fiber width reached about 30 nm.

Wooden pulp generally has a structure in which cellulose microfibrils of about 3 nm are bundled. Since these cellulose microfibrils are strongly bonded to each other by hydrogen bonds, it is not possible to fibrillate them to the order of cellulose microfibril unit only by a mechanical treatment. Therefore, to fibrillate wooden pulp in the order of cellulose microfibril unit, it is necessary to introduce a functional group to the surface of the cellulose microfibril and use a charge repulsive force. In particular, the hydroxyl group at C6 position of the cellulose microfibril is disposed to protrude three-dimensionally (see FIG. 21).

Therefore, it is assumed that the present production method enabled a sulfo group to be selectively introduced with respect to the hydroxyl group at C6 position that is disposed to project three-dimensionally, thereby producing pulp fibers that are easily fibrillated. It is further assumed that, by fibrillating the pulp fibers by the present production method, nanocellulose fibers having high dispersibility and high transparency were produced due to the charge repulsion.

Experiment 10

In Experiment 10, the influence of the heating method in the heating reaction was inspected.

In Experiment 10, the sulfamic acid/urea-treated pulp fibers were prepared in the same manner as in Experiment 1, except that a hot press method using a hot press machine (Model No. AH-2003C) manufactured by AS ONE Corporation was used for the heating reaction.

The nanocellulose fibers were prepared by a method similar to that of Experiment 1. The haze value (%) and the total light transmittance (%) of the prepared nanocellulose fibers were measured by the same method as shown in Experiment 1.

The conditions of the hot press method were as follows.

100 ml of a sulfonated chemical solution ((200 g/L)/(200 g/L)) is uniformly sprayed to 20 g of NBKP sheet having a basis weight of 15 g/m$^2$, followed by drying at 50° C.

Thereafter, the dried sheet was sandwiched by a hot press machine heated to 120° C., and the heating reaction was allowed to proceed for 5 minutes. After the heating reaction, neutralization and washing were performed in the same manner as in Experiment 1, and then a fibrillation treatment was performed.

In the fibrillation treatment, a preliminary fibrillation was first carried out using a high-pressure homogenizer (Model No. N2000-2C-045, manufactured by KOS21 Co., Ltd.). The preliminary fibrillation was performed at a fibrillation pressure of 10 MPa with 2 times of fibrillation, and at a fibrillation pressure of 50 MPa with 1 time of fibrillation. Then, the slurry resulting from the preliminary fibrillation was supplied to a high-pressure homogenizer to prepare nanocellulose fibers. The fibrillation pressure at this time was 60 MPa, which was about a half of that in Experiment 1.

Table 18 shows the results of Experiment 10.

TABLE 18

| | Treatment Time (minutes) | Treatment Temperature (° C.) | Ratio of Sulfamic acid/Urea | Heating Method | Total Light Transmittance (%) | Haze Value (%) |
|---|---|---|---|---|---|---|
| Influence of Heating Method | 5 | 120 | (200 g/L)/(200 g/L) | Hot Air Method | Fibrillation Failed | |
| | | | | Hot Press Method | 98.6 | 12.5 |

As shown in Table 18, it was confirmed that, when the hot press method was used in the heating reaction of the present production method, the fibrillation was appropriately performed even when the heating time was 5 minutes. In addition, it was confirmed that the prepared nanocellulose fibers had excellent transparency.

Experiment 11

In Experiment 11, the maximum amount of sulfur introduced into the sulfamic acid/urea-treated pulp fibers and nanocellulose fibers when the chemical treatment step in the present production method was performed only once was inspected.

20 g (dry weight) of pulp was added to 700 g of a reaction solution (sulfamic acid (g/L): urea (g/L)=200:200) prepared in the same manner as in Experiment 1. That is, the reaction liquid was prepared to have a solids content of 10 g relative to 1 g (dry weight) of the pulp. The prepared pulp (the reaction solution of 10 g (as a solids content) relative to 1 g (dry weight) of pulp) was dried using the same dryer as that used in Experiment 1 in which the constant-temperature bath was set to 50° C.

Thereafter, the dried pulp was placed in a dryer with a constant-temperature bath set to 160° C. in the same manner as in Experiment 1, followed by a heating reaction for 60 minutes.

After the heating reaction, the pulp taken out from the dryer was placed in a saturated aqueous sodium hydrogencarbonate solution, followed by stirring for 10 minutes; thereafter, the resulting pulp was washed with pure water until it became neutral, thereby preparing sulfamic acid/urea-treated pulp.

Subsequently, a slurry obtained by adjusting the solid concentration of the sulfamic acid/urea-treated pulp to 0.5% by mass was subjected to a fibrillation treatment using the same high-pressure homogenizer as in Experiment 2, thereby preparing nanocellulose fibers.

The sulfur content in the pulp after the chemical treatment was measured in the same manner as in Experiment 1.

The haze value and the total light transmittance were measured in the same manner as in Experiment 1.

Table 19 shows the results of Experiment 11.

TABLE 19

| Treatment Time (minutes) | Treatment Temperature (° C.) | Ratio of Sulfamic acid/Urea | Total Light Transmittance (%) | Haze Value (%) | Amount of Sulfur Introduced (mmol/g) |
|---|---|---|---|---|---|
| 60 | 160 | (200 g/L)/(200 g/L) | 98.3 | 4.3 | 1.7 |

As shown in Table 19, it was confirmed that, by using the present production method, when a reaction solution was contained in an amount (solids content) 10 times relative to 1 g of pulp, 1.7 mmol/g of sulfur was introduced into the sulfamic acid/urea-treated pulp fibers.

According to the results of Experiment 11, it was confirmed that, by using the present production method, the amount of sulfur introduced into the sulfamic acid/urea-treated pulp fibers can be controlled by controlling the amount (solids content) of the reaction solution carried, the reaction temperature, and the reaction time.

In addition, as shown in Table 19, it was confirmed that the nanocellulose fibers obtained by fibrillating the prepared sulfamic acid/urea-treated pulp fibers had high transparency.

Experiment 12

In Experiment 12, an experiment was performed by heating a reaction solution to which pulp was added.

In Experiment 12, 2 g (dry weight) of pulp was added to 100 ml of a reaction solution (sulfamic acid (g/L):urea (g/L)=200:200) prepared in the same manner as in Experiment 1, thereby preparing 100 mL of a slurry having a pulp solid concentration of 2% by mass.

This slurry was heated at 120° C. for 2 hours using an autoclave (manufactured by Tomy Seiko Co., Ltd., Model No.: BS-235).

The pulp in the slurry taken out from the autoclave was grayish according to a visual inspection. Therefore, it was assumed that the pulp had significantly low whiteness and significantly low water retention value.

INDUSTRIAL APPLICABILITY

The sulfonated pulp fiber, the derivative pulp, the sulfonated fine cellulose fiber, the method for producing sulfonated fine cellulose fibers, and the method for producing sulfonated pulp fibers according to the present invention can be suitably used for many usages in various fields, such as industrial fields, food fields, medical fields, and cosmetic fields, and can also be suitably used as a raw material of a composite material used in these fields.

The invention claimed is:

1. A sulfonated fine cellulose fiber, which is a fine cellulose fiber obtained by fibrillating a cellulose fiber,
    a part of hydroxyl groups of the fine cellulose fiber being substituted with sulfo groups,
    an introduction amount of sulfur attributable to the sulfo groups being adjusted to be higher than 0.42 mmol/g,
    the fine cellulose fiber having an average fiber width of 30 nm or less, and
    a haze value of a dispersion liquid in which the fine cellulose fiber is dispersed in a water-soluble solvent so that the solid concentration is 0.2% by mass to 0.5% by mass being 30% or less,
    wherein the fine cellulose fiber has a viscosity of 10,000 mPa·s or more in a state where the fine cellulose fiber is dispersed in a water-soluble solvent so that the solid concentration is 0.5% by mass.

2. The sulfonated fine cellulose fiber according to claim 1, wherein the haze value of the dispersion liquid is 10% or less.

3. The sulfonated fine cellulose fiber according to claim 1, wherein
    the dispersion liquid has a total light transmittance of 90% or more.

4. The sulfonated fine cellulose fiber according to claim 1, wherein
    the fine cellulose fiber has a polymerization degree of 300 or more.

5. The sulfonated fine cellulose fiber according to claim 1, wherein
    the hydroxyl group at C6 position of a glucose unit constituting the cellulose fiber is substituted with the sulfo group.

* * * * *